(12) United States Patent
Miki et al.

(10) Patent No.: US 7,415,582 B2
(45) Date of Patent: Aug. 19, 2008

(54) STORAGE SYSTEM CONSTRUCTION MANAGING DEVICE AND CONSTRUCTION MANAGEMENT METHOD

(75) Inventors: Kenichi Miki, Odawara (JP); Eiichi Sato, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 11/254,783

(22) Filed: Oct. 21, 2005

(65) Prior Publication Data

US 2007/0038819 A1 Feb. 15, 2007

(30) Foreign Application Priority Data

Aug. 9, 2005 (JP) ............................ P2005-230890

(51) Int. Cl.
*G06F 13/00* (2006.01)
(52) U.S. Cl. ..................... 711/154; 711/170; 709/201; 709/203
(58) Field of Classification Search .................. None
See application file for complete search history.

(56) References Cited

U.S. PATENT DOCUMENTS 7,069,400 B2 * 6/2006 Takeda et al. ............... 711/161
7,228,380 B2 * 6/2007 Yamamoto et al. .......... 711/113
2003/0220991 A1 11/2003 Soejima et al.
2006/0282636 A1 * 12/2006 Yamamoto et al. .......... 711/170

FOREIGN PATENT DOCUMENTS

JP 2003-337721 5/2002

* cited by examiner

*Primary Examiner*—Jasmine Song
(74) *Attorney, Agent, or Firm*—Reed Smith LLP; Stanley P. Fisher, Esq.; Juan Carlos A. Marquez, Esq.

(57) ABSTRACT

The device of the present invention manages changes in the construction of a storage system in a unified manner, and optimally disposes resources. The servers are logically divided into a plurality of virtual servers, the switches are logically divided into a plurality of zones, and the storage devices are logically divided into a plurality of virtual storage devices. The respective logical devices are respectively managed by respective managing parts. These respective managing parts are connected to a managing device via a network used for management. The managing device re-disposes resources in application program units on the basis of the load states of the respective resources in the storage system.

15 Claims, 68 Drawing Sheets

FIG. 7

PERFORMANCE MANAGEMENT INFORMATION D11

| MANAGEMENT LOCATION | PERFORMANCE INFORMATION | PERFORMANCE MAXIMUM VALUE | UPPER LIMIT THRESHOLD VALUE | LOWER LIMIT THRESHOLD VALUE | MONITORING PERIOD |
|---|---|---|---|---|---|
| PROCESSOR 1 | 30% | 100% | 80% | 20% | 1sec |
| PROCESSOR 2 | 40% | 100% | 80% | 20% | 1sec |
| ... | - | ... | - | - | - |
| MEMORY 1 | 50% | 200MB | 90% | 5% | 10sec |
| MEMORY 2 | 40% | 200MB | 90% | 5% | 10sec |
| ... | - | ... | - | - | - |
| MEMORY n | - | 200MB | - | - | - |
| DISK I/F 1 | 70% | 100IOPS | 70% | 10% | 1sec |
| DISK I/F 2 | 80% | 100IOPS | 80% | 10% | 1sec |
| ... | ... | ... | ... | ... | ... |
| DISK I/F n | - | 100IOPS | - | - | - |

| RESOURCE MANAGEMENT INFORMATION | |
|---|---|
| MANAGEMENT LOCATION | ASSIGNED INFORMATION |
| PROCESSOR 1 | LPR1 |
| PROCESSOR 2 | LPR2 |
| ... | ... |
| PROCESSOR n | UNASSIGNED |
| MEMORY 1 | LPR1 |
| MEMORY 2 | LPR2 |
| ... | ... |
| MEMORY n | UNASSIGNED |
| DISK I/F 1 | LPR1 |
| DISK I/F 2 | LPR2 |
| ... | ... |
| DISK I/F n | UNASSIGNED |

FIG. 9

APPLICATION MANAGEMENT INFORMATION D13

| APPLICATION NAME | ASSIGNED INFORMATION | PATH NAME | CLUSTER NAME |
|---|---|---|---|
| DB1 | LPR1 | - | - |
| DB2 | LPR2 | - | - |
| ... | ... | ... | ... |
| MAIL SERVER 1 | LPR1 | - | - |
| MAIL SERVER 2 | LPR2 | - | - |
| ... | ... | ... | ... |
| PATH MANAGEMENT SOFTWARE 1 | LPR1 | DISK I/F 1 | - |
| PATH MANAGEMENT SOFTWARE 2 | LPR2 | DISK I/F 2 | - |
| ... | ... | ... | ... |
| CLUSTER SOFTWARE 1 | LPR1 | - | CLUSTER 1 |
| CLUSTER SOFTWARE 2 | LPR2 | - | CLUSTER 2 |
| ... | ... | ... | ... |

FIG. 10

| CONNECTION CONSTRUCTION MANAGEMENT INFORMATION | D14 |
|---|---|
| DISK I/F NAME | CONNECTION DESTINATION |
| DISK I/F 1 | STORAGE DEVICE 1 HOST I/F 1 |
| DISK I/F 2 | STORAGE DEVICE 2 HOST I/F 2 |
| DISK I/F 3 | - |
| DISK I/F 4 | - |
| ... | ... |

| PERFORMANCE MANAGEMENT INFORMATION | | | | | |
|---|---|---|---|---|---|
| MANAGEMENT LOCATION | PERFORMANCE INFORMATION | PERFORMANCE MAXIMUM VALUE | UPPER LIMIT THRESHOLD VALUE | LOWER LIMIT THRESHOLD VALUE | MONITORING PERIOD |
| PROCESSOR 1 | | | | | |
| PROCESSOR 2 | | | | | |
| ... | ... | ... | ... | ... | ... |
| PROCESSOR n | - | - | - | - | - |
| HOST I/F 1 | | | | | |
| HOST I/F 2 | | | | | |
| ... | ... | ... | ... | ... | ... |
| HOST I/F n | - | - | - | - | - |
| SHARED MEMORY 1 | | | | | |
| SHARED MEMORY 2 | | | | | |
| ... | ... | ... | ... | ... | ... |
| SHARED MEMORY n | - | - | - | - | - |
| CACHE MEMORY 1 | | | | | |
| CACHE MEMORY 2 | | | | | |
| ... | ... | ... | ... | ... | ... |
| CACHE MEMORY n | - | - | - | - | - |
| DISK CONTROL PART 1 | | | | | |
| DISK CONTROL PART 2 | | | | | |
| ... | ... | ... | ... | ... | ... |
| DISK CONTROL PART n | - | - | - | - | - |
| PHYSICAL DISK 1 | | | | | |
| PHYSICAL DISK 2 | | | | | |
| ... | ... | ... | ... | ... | ... |
| PHYSICAL DISK n | - | - | - | - | - |

| RESOURCE ASSIGNMENT MANAGEMENT INFORMATION ||
|---|---|
| MANAGEMENT LOCATION | ASSIGNMENT INFORMATION |
| PROCESSOR 1 | LPR1 |
| PROCESSOR 2 | LPR2 |
| ... | ... |
| PROCESSOR n | UNASSIGNED |
| HOST I/F 1 | LPR1 |
| HOST I/F 2 | LPR2 |
| ... | ... |
| HOST I/F n | UNASSIGNED |
| SHARED MEMORY 1 | LPR1 |
| SHARED MEMORY 2 | LPR2 |
| ... | ... |
| SHARED MEMORY n | UNASSIGNED |
| CACHE MEMORY 1 | LPR1 |
| CACHE MEMORY 2 | LPR2 |
| ... | ... |
| CACHE MEMORY n | UNASSIGNED |
| DISK CONTROL PART 1 | LPR1 |
| DISK CONTROL PART 2 | LPR2 |
| ... | ... |
| DISK CONTROL PART n | UNASSIGNED |
| PHYSICAL DISK 1 | LPR1 |
| PHYSICAL DISK 2 | LPR2 |
| ... | ... |
| PHYSICAL DISK n | UNASSIGNED |

| BUSINESS MANAGEMENT TABLE (yyyy/mm/dd hh:mm:ss) | | | | |
|---|---|---|---|---|
| BUSINESS NAME | SERVER NAME | LPR INFORMATION | APPLICATION NAME | BUSINESS PERIOD |
| ACCOUNTING DEPARTMENT PROCESSING 1 | SERVER 1 | LPR1 | DB1 | ONE MONTH |
| PERSONNEL DEPARTMENT PROCESSING 1 | SERVER 2 | LPR2 | DB2 | ONE WEEK |
| IN-HOUSE MAIL PROCESSING | SERVER 2 | LPR1 | MAIL SERVER 1 | ONE MONTH |
| OUTSIDE MAIL PROCESSING | SERVER 2 | LPR2 | MAIL SERVER 2 | ONE MONTH |
| ACCOUNTING DEPARTMENT PROCESSING 1 | SERVER 2 | LPR1 | DB1 | ONE MONTH |
| PERSONNEL DEPARTMENT PROCESSING 1 | SERVER 1 | LPR2 | DB2 | ONE WEEK |
| ... | ... | ... | ... | ... |

D42

D42

| BUSINESS MANAGEMENT TABLE (yyyy/mm/dd hh:mm:ss) | | | | |
|---|---|---|---|---|
| BUSINESS MANAGEMENT TABLE (yyyy/mm/dd hh:mm:ss) | | | | |
| BUSINESS MANAGEMENT TABLE (yyyy/mm/dd hh:mm:ss) | | | | |
| BUSINESS NAME | SERVER NAME | LPR INFORMATION | APPLICATION NAME | BUSINESS PERIOD |
| ACCOUNTING DEPARTMENT PROCESSING 1 | | | | |
| PERSONNEL DEPARTMENT PROCESSING 1 | | | | |
| IN-HOUSE MAIL PROCESSING | | | | |
| ... | ... | ... | ... | ... |

PERFORMANCE INFORMATION SETTING VALUE MANAGEMENT TABLE (SERVER 1) — D43

| MANAGEMENT LOCATION | PERFORMANCE THRESHOLD VALUE | UPPER LIMIT THRESHOLD VALUE | LOWER LIMIT THRESHOLD VALUE | MONITORING PERIOD |
|---|---|---|---|---|
| PROCESSOR 1 | 90% | 80% | 20% | 1sec |
| PROCESSOR 2 | 90% | 80% | 20% | 1sec |
| ... | ... | ... | ... | ... |
| PROCESSOR n | - | - | - | - |
| MEMORY 1 | 90% | 80% | 5% | 10sec |
| MEMORY 2 | 90% | 80% | 5% | 10sec |
| ... | ... | ... | ... | ... |
| MEMORY n | - | - | - | - |
| DISK I/F 1 | 80% | 80% | 10% | 1sec |
| DISK I/F 2 | 80% | 80% | 10% | 1sec |
| ... | ... | ... | ... | ... |
| DISK I/F n | - | - | - | - |

PERFORMANCE INFORMATION SETTING VALUE MANAGEMENT TABLE (SERVER 2) — D43

PERFORMANCE INFORMATION SETTING VALUE MANAGEMENT TABLE (SWITCH 1) — D43

PERFORMANCE INFORMATION SETTING VALUE MANAGEMENT TABLE (STORAGE DEVICE 1) — D43

| MANAGEMENT LOCATION | PERFORMANCE INFORMATION | UPPER LIMIT THRESHOLD VALUE | LOWER LIMIT THRESHOLD VALUE | MONITORING PERIOD |
|---|---|---|---|---|
| PROCESSOR 1 | | | | |
| PROCESSOR 2 | | | | |
| ... | ... | ... | ... | ... |
| PROCESSOR n | - | - | - | - |
| ... | ... | ... | ... | ... |

FIG. 18

APPLICATION MANAGEMENT TABLE (SERVER 1 yyyy/mm/dd hh:mm:ss) — D46

| APPLICATION NAME | ASSIGNMENT INFORMATION | PATH NAME | CLUSTER NAME |
|---|---|---|---|
| DB1 | LPR1 | - | - |
| DB2 | LPR2 | - | - |
| ... | ... | ... | ... |
| MAIL SERVER 1 | LPR1 | - | - |
| MAIL SERVER 2 | LPR2 | - | - |
| ... | ... | ... | ... |
| PATH MANAGEMENT SOFTWARE 1 | LPR1 | DISK I/F 1 | - |
| PATH MANAGEMENT SOFTWARE 2 | LPR2 | DISK I/F 2 | - |
| ... | ... | ... | ... |
| CLUSTER SOFTWARE 1 | LPR1 | - | CLUSTER 1 |
| CLUSTER SOFTWARE 2 | LPR2 | - | CLUSTER 2 |
| ... | ... | ... | ... |

APPLICATION MANAGEMENT TABLE (SERVER 1 yyyy/mm/dd hh:mm:ss) — D46

APPLICATION MANAGEMENT TABLE (SERVER 1 yyyy/mm/dd hh:mm:ss) — D46

APPLICATION MANAGEMENT TABLE (SERVER 2 .yyyy/mm/dd hh:mm:ss)

APPLICATION MANAGEMENT TABLE (SERVER 2 yyyy/mm/dd hh:mm:ss)

| APPLICATION NAME | ASSIGNMENT INFORMATION | PATH NAME | CLUSTER NAME |
|---|---|---|---|
| DB1 | | - | - |
| DB2 | | - | - |
| ... | ... | ... | ... |

| WORK MANAGEMENT TABLE ||||
|---|---|---|---|
| ASSIGNMENT DESTINATION | RESOURCE NAME | TYPE | STATUS |
| SERVER 1 | PROCESSOR 1 | PROCESSOR | RE-DISPOSITION COMPLETED |
| SERVER 1 | PROCESSOR 2 | PROCESSOR | RE-DISPOSITION COMPLETED |
| ... | ... | ... | ... |
| SERVER 1 | DISK I/F 1 | INTERFACE | NOT YET PERFORMED |
| SERVER 1 | DISK I/F 2 | INTERFACE | NOT YET PERFORMED |
| ... | ... | ... | ... |

PERFORMANCE MANAGEMENT INFORMATION D11A

| MANAGEMENT LOCATION | PERFORMANCE INFORMATION | PERFORMANCE MAXIMUM VALUE | UPPER LIMIT THRESHOLD VALUE | LOWER LIMIT THRESHOLD VALUE | MONITORING PERIOD |
|---|---|---|---|---|---|
| PROCESSOR 1 - 40% | 30% | 100% | 80% | 20% | 1sec |
| PROCESSOR 1 - 60% | 40% | 100% | 80% | 20% | 1sec |
| ... | ... | ... | ... | ... | ... |
| PROCESSOR n | - | 100% | - | - | - |
| MEMORY 1 - 40% | 50% | 80MB | 90% | 5% | 10sec |
| MEMORY 1 - 60% | 40% | 120MB | 90% | 5% | 10sec |
| ... | ... | ... | ... | ... | ... |
| MEMORY n | - | 200MB | - | - | - |
| DISK I/F 1 | 70% | 100IOPS | 70% | 10% | 1sec |
| DISK I/F 2 | 80% | 100IOPS | 80% | 10% | 1sec |
| ... | ... | ... | ... | ... | ... |
| DISK I/F n | - | 100IOPS | - | - | - |

| RESOURCE MANAGEMENT INFORMATION ||
|---|---|
| MANAGEMENT LOCATION | ASSIGNED INFORMATION |
| PROCESSOR 1 - 40% | LPR1 |
| PROCESSOR 1 - 60% | LPR2 |
| ... | ... |
| MEMORY 1 - 40% | LPR1 |
| MEMORY 1 - 60% | LPR2 |
| ... | ... |
| DISK I/F 1 | LPR1 |
| DISK I/F 2 | LPR2 |
| ... | ... |

| RE-DISPOSITION POLICY TABLE ||
|---|---|
| TYPE 1 | AUTOMATIC RE-DISPOSITION PERFORMED |
| TYPE 2 | NO AUTOMATIC RE-DISPOSITION |
| TYPE 3 | AUTOMATIC RE-DISPOSITION PERFORMED IN CASE OF CUSTOM DEFINITION |
| TYPE 4 | AUTOMATIC RE-DISPOSITION PERFORMED IN CASES OTHER THAN CSES OF CUSTOM DEFINITION |
| TYPE 5 | AUTOMATIC RE-DISPOSITION PERFORMED, CLUSTER COOPERATION MODE EXISTS |
| TYPE 6 | NO AUTOMATIC RE-DISPOSITION, CLUSTER COOPERATION MODE EXISTS |

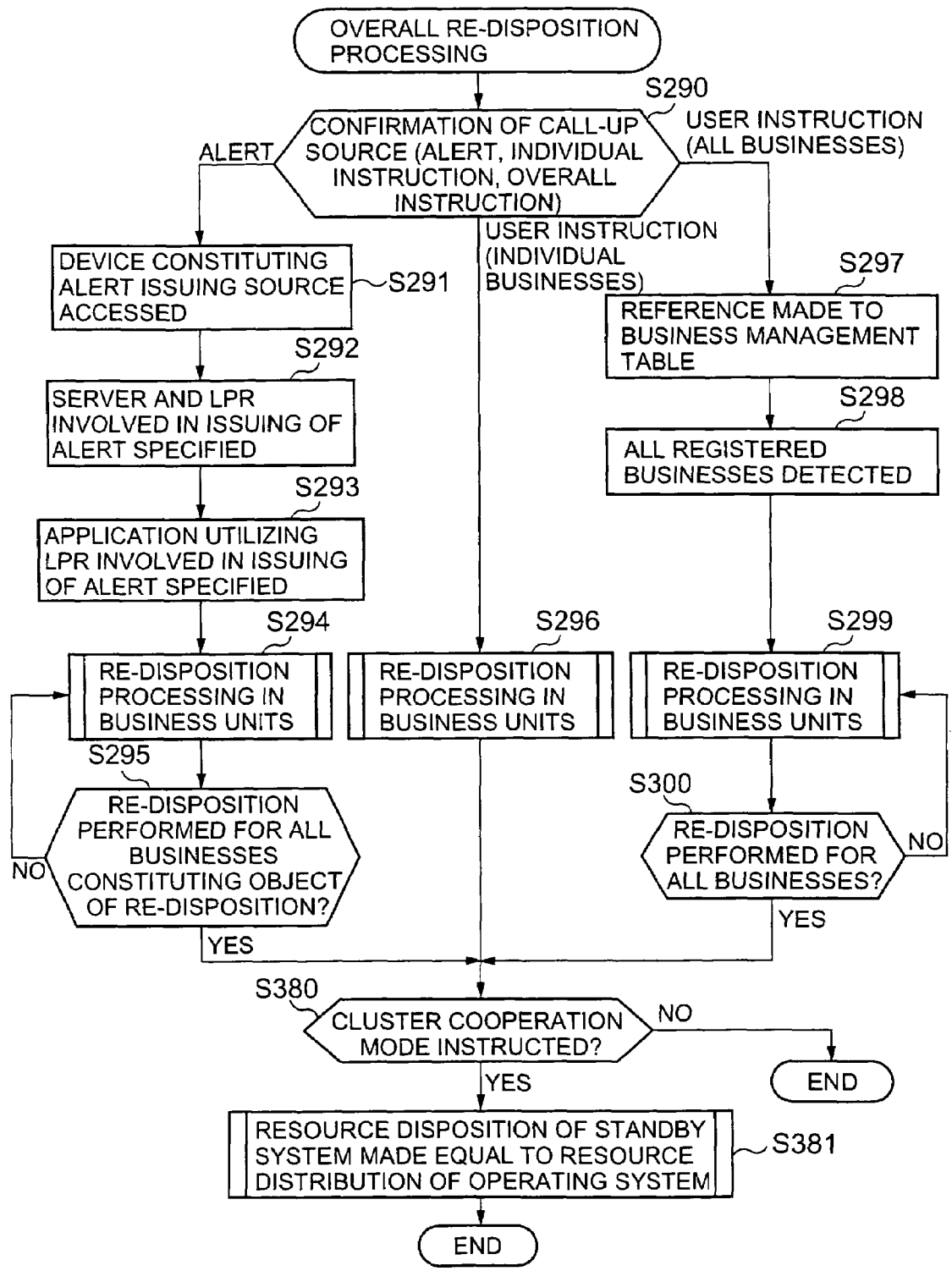

STORAGE SYSTEM CONSTRUCTION MANAGING DEVICE AND CONSTRUCTION MANAGEMENT METHOD

CROSS-REFERENCE TO RELATED APPLICATIONS

This application relates to and claims priority from Japanese Patent Application No. 2005-230890 filed on Aug. 9, 2005, the entire disclosure of which is incorporated herein by reference.

BACKGROUND OF THE INVENTION

1. Field of the Invention

The present invention relates to a storage system construction managing device and construction management method.

2. Description of the Related Art

Storage systems can provide large capacity and high performance storage services to host computers. In a storage system, for example, numerous disk drives are disposed in the form of an array, thus constructing a storage region based on an RAID (redundant array of independent disks). Logical volumes that constitute logical storage regions are formed on the physical storage regions of the respective disk drives. LUNs (logical unit numbers) are assigned beforehand to the logical volumes. The host computers issue write commands and read commands specifying LUNs, block addresses or the like. As a result, the host computers can read and write desired data from and into the storage system.

Since the conditions of use of a storage system vary from hour to hour and minute to minute, techniques for dynamically altering the internal construction of storage devices have also been proposed (Japanese Patent Application Laid-Open No. 2003-337721).

In the technique described in the abovementioned reference, the internal structure of a storage device is varied on the basis of a preset schedule. However, the technique described in the abovementioned reference varies only the construction of the storage device, and does not alter the construction of the storage system as a whole. Furthermore, in the technique described in the abovementioned reference, no consideration is given to a device that is logically divided; accordingly, it is difficult to grasp the logical construction of the storage system. Moreover, since the history of the logical construction cannot be managed, this technique is not convenient for use.

SUMMARY OF THE INVENTION

Accordingly, it is an object of the present invention to provide a storage system construction managing device and construction management system which make it possible to manage the disposition of resources in a device that is logically divided, and to re-dispose these resources. It is another object of the present invention to provide a storage system construction managing device and construction management method which can re-dispose, for each application program, the resources of respective devices that have been logically divided, and which can manage histories. Other objects of the present invention will become clear from the description of embodiments below.

In order to solve the abovementioned problems, the storage system construction managing device according to one aspect of the present invention is a storage system construction managing device which manages the construction of a storage system comprising a host device and a storage device that provides a storage region to the host device, comprising a first managing part which divides the abovementioned host device into a plurality of logical host devices, and which respectively distributes specified resources from among the resources possessed by the abovementioned host device to these respective logical host devices, a second managing part which divides the abovementioned storage device into a plurality of logical storage devices, and which respectively distributes specified resources from among the resources possessed by the abovementioned storage device to these respective logical storage devices, an information collecting part which respectively acquires specified information relating to the abovementioned respective logical host devices and the abovementioned respective logical storage devices via the abovementioned first managing part and the abovementioned second managing part, a disposition managing part which respectively judges, on the basis of the abovementioned respective collected sets of specified information, whether or not an excess or insufficiency has occurred in the abovementioned specified resources used by the respective application programs that are executed by the abovementioned respective logical host devices, and which, in cases where it is judged that the abovementioned excess or insufficiency has occurred, re-disposes the abovementioned specified resources by issuing a construction alteration request to the managing part among the abovementioned respective managing parts that manages the specified resources involved in the abovementioned excess or insufficiency, so that the abovementioned excess or insufficiency is eliminated, a history managing part which respectively stores and manages the histories of the abovementioned respective sets of specified information, and a user interface part which outputs the histories of the abovementioned respective sets of specified information that are managed by the abovementioned history managing part.

The first managing part divides the host device into a plurality of logical host devices, and respectively assigns specified resources to the respective logical host devices. Examples of these specified resources include data processing resources such as CPUs or the like, storage resources such as memories or the like, and communications resources such as communications interfaces or the like. Similarly, the second managing part divides the storage device into a plurality of logical storage devices, and respectively assigns specified resources to these respective logical storage devices. Accordingly, even in cases where the system consists of only a single host device and a single storage device in physical terms, a storage system is constructed which comprises a plurality of logical host devices and a plurality of logical storage devices in logical terms. Furthermore, at least one application program can be executed in the respective logical host devices. For instances, various types of programs such as customer management programs, email management programs, sales management programs and the like may be cited as examples of application programs.

The information collecting part respectively collects and manages specified information from the respective logical devices (the various types of devices that are logically divided are referred to collectively as "logical devices"). For instance, the load states of the logical devices, the disposition of specified resources assigned to the logical devices and the like may be cited as examples of such specified information. On the basis of this specified information, the disposition managing part judges whether or not an excess or insufficiency has occurred in specified resources for each application program. Furthermore, by issuing construction alteration requests, the disposition managing part re-disposes specified resources for each application program. Moreover, the histories of the respective sets of specified information are managed by the history managing part, and these histories can be output from the user interface part. Examples of output methods that can be used include screen output, printed output, voice output and the like.

In one embodiment, the storage system construction managing device of the present invention further comprises a third managing part which divides a relay device for connecting the abovementioned host device and the abovementioned storage device into a plurality of logical relay devices, and which respectively distributes specified resources among the resources possessed by the abovementioned relay device to the respective logical relay devices. Furthermore, specified information relating to the respective logical relay devices is also included in the specified information that is collected by the information collecting part. For instance, switches, routers and the like may be cited as examples of relay devices. As a result, the disposition managing part can respectively control the disposition of resources in the logical host devices, logical relay devices and logical storage devices for each application program.

In one embodiment, the user interface part can output the logical connection construction of the respective logical host devices and respective logical storage devices. In addition, the user interface part can also output the physical connection construction. Furthermore, the user interface part can also output the conditions of resource use for each application program.

In one embodiment, in cases where the disposition of specified resources relating to one of the application programs is altered, the disposition managing part re-disposes specified resources relating to other application programs corresponding to the one application program so that the construction is the same as that of the resource disposition for the one application program. For example, in order to obtain high availability, or in order to obtain load balancing, application programs of the same type may be clustered, and may be operated in respectively different logical host devices. For example, in the case of a cluster used for high availability, one application program provides a data processing service, and another application program waits for the occurrence of trouble. In the case of a cluster used for load balancing, the response characteristics are improved by the sharing of the processing of data processing service requests among respective application programs. In cases where specified resources are re-disposed for one application program, a similar re-disposition is also performed for the other application programs.

In one embodiment, the disposition managing part re-disposes specified resources in which an excess or insufficiency has occurred while taking into account the redundancy of the storage system. For example, the disposition managing part can re-dispose specified resources so that the redundancy is improved. Alternatively, for example, the disposition managing part can re-dispose specified resources so that the redundancy does not drop. Even in cases where the redundancy does drop, if the user gives approval, the re-disposition of resources can also be performed so that the redundancy is lowered. For instance, communications resources such as paths and ports may be cited as examples of specified resources relating to such redundancy.

In one embodiment, the storage system construction managing device of the present invention comprises a resource pool for managing the specified resources that are unused. Here, the disposition managing part returns specified resources that have a utilization rate that is equal to or less than a specified lower limit value among the specified resources mentioned above to this resource pool, and in the case of resources that have a utilization rate that is equal to or greater than a specified upper limit value among the specified resources mentioned above, the disposition managing part selects resources of the same type from the resource pool, and adds these resources. Respective resource pools can be prepared for each type of specified resource, and unused resources can be respectively managed by type. As a result, the disposition managing part can accomplish the disposition of specified resources simply by considering the relationship with the resource pool, so that resources can be managed by means of a relatively simple construction.

In one embodiment, the history managing part manages the histories of respective sets of specified information in specified period units that are set beforehand. For example, the user, such as a system manager or the like, can set this specified period in accordance with the nature of the respective application programs. The history managing part can collect and manage specified information relating to these application programs in the specified period units. In the respective application programs, the period during which a data input-output (I/O) peak occurs respectively differs according to the nature of the data processing involved (the type of application program or the like). In certain application programs, for example, an I/O peak occurs in a period of one month, while in other application programs, for example, an I/O peak occurs in a period of three months. Accordingly, for the detection of the I/O peak, the history of specified information is managed by collecting specified information for a period which is such that the I/O peak occurrence period and specified information collection period are substantially caused to coincide, or for a period which is longer than the I/O peak occurrence period. As a result, specified resources can be re-disposed with the I/O peak taken into account.

The storage system construction management method according to another aspect of the present invention is a construction management method for managing the construction of a storage system comprising a host device and a storage device that provides a storage region to this host device, this method comprising the steps of respectively collecting and managing specified information relating to respective logical host devices from a first managing part which divides the host device into a plurality of such logical host devices and respectively distributes specified resources among the resources possessed by the host device to these respective logical host devices, respectively collecting and managing specified information relating to respective logical storage devices from a second managing part which divides the storage device into a plurality of logical storage devices and respectively distributes specified resources among the resources possessed by the storage device to these respective logical storage devices, judging whether or not the execution of re-disposition has been instructed, specifying an application program relating to the execution instructions of the re-disposition in cases where the execution of the re-disposition has been instructed, judging, on the basis of the respective collected sets of specified information, whether or not an excess or insufficiency has occurred in the specified resources used by the specified application program, re-disposing the specified resources by issuing a construction alteration request to the managing part that manages specified resources involved in the excess or insufficiency among the respective managing parts in cases where it is judged that an excess or insufficiency has occurred, so that this excess or insufficiency is eliminated, respectively storing and managing the histories of the respective sets of specified information, and outputting the histories of the respective sets of specified information.

There are cases in which some or all of the functions, means and steps of the present invention can be realized by reading a computer program into a computer and causing this computer to execute this computer program. For example, this computer program can be fixed and distributed on a recording medium such as an optical disk, hard disk, semi-conductor memory or the like. Furthermore, for example, this computer program can also be distributed via a communications network such as the internet.

BRIEF DESCRIPTION OF THE DRAWINGS

FIG. 7 is an explanatory diagram showing the construction of the performance management information;

FIG. 8 is an explanatory diagram showing the construction of the resource management information;

FIG. 9 is an explanatory diagram showing the construction of the application management information;

FIG. 10 is an explanatory diagram showing the construction of the connection construction management information;

FIG. 11 is an explanatory diagram showing the construction of the performance management information;

FIG. 12 is an explanatory diagram showing the construction of resource assignment management information;

FIG. 14 is an explanatory diagram showing the construction of the business management table;

FIG. 15 is an explanatory diagram showing the construction of the performance information setting value management table;

FIG. 18 is an explanatory diagram showing the construction of the application management table;

FIG. 59 is an explanatory diagram showing the construction of the work management table;

FIG. 60 is an explanatory diagram showing the construction of performance management information that is used in a storage system constituting a second embodiment;

FIG. 61 is an explanatory diagram showing the construction of resource management information that is used in the storage system of the second embodiment;

FIG. 65 is an explanatory diagram showing the construction of a re-disposition policy table that is used in a storage system constituting a sixth embodiment;

FIG. 66 is a flow chart showing re-disposition processing that is executed in the storage system of the sixth embodiment;

DESCRIPTION OF THE PREFERRED EMBODIMENTS

Embodiments of the present invention will be described below with reference to the attached figures. In these embodiments, as will be described later, a storage system that is constructed by connecting a plurality of logical devices is devised so that resources are re-disposed (re-distributed) on the basis of the utilization conditions of these resources in respective application program units. Furthermore, in these embodiments, as will be described later, not only the physical construction of the storage system, but also the logical construction of the storage system and the construction as seen from respective application programs can be analyzed and output.

Figure 1:
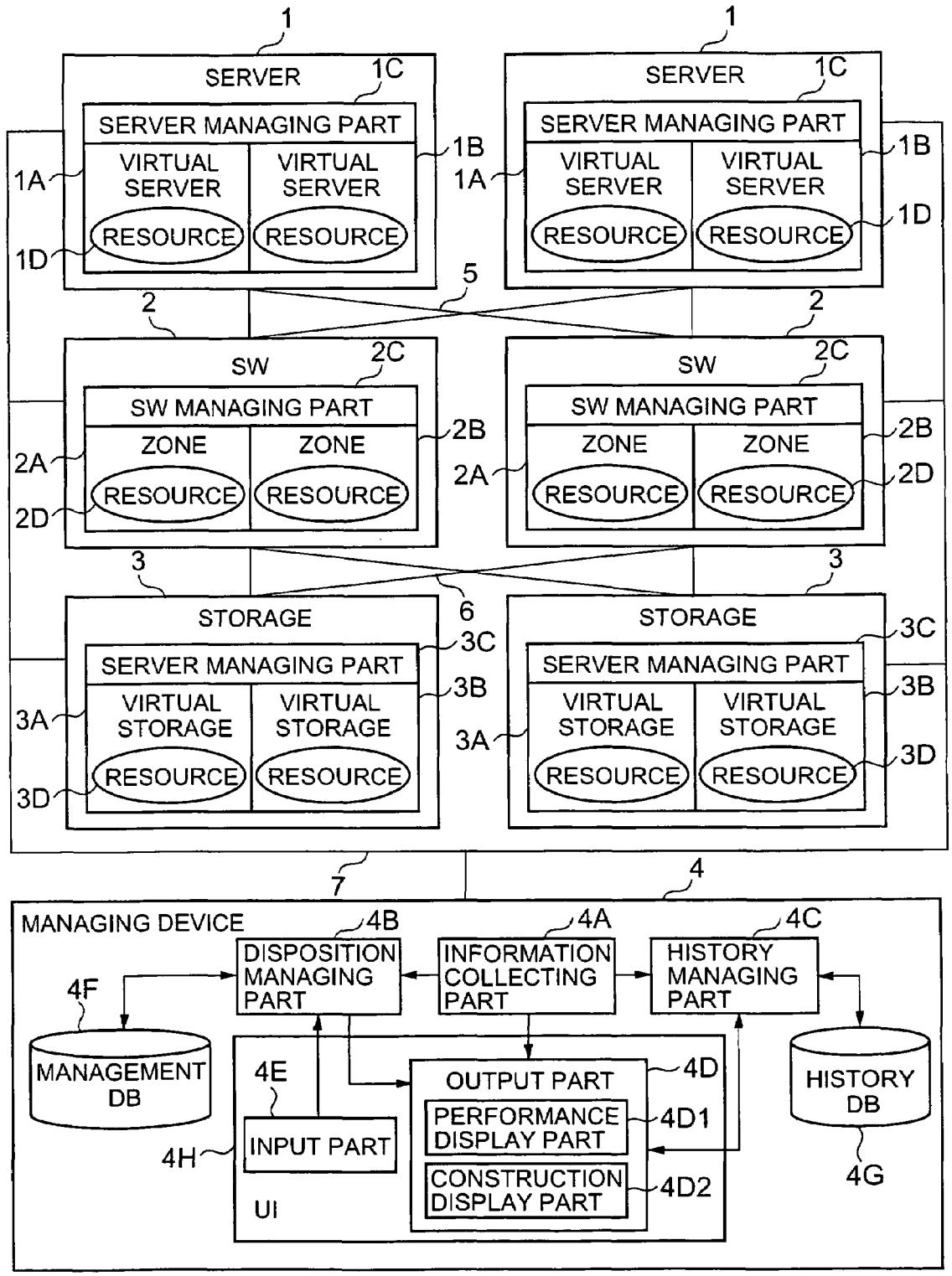
FIG. 1 is an explanatory diagram which shows the overall concept of the present invention.

FIG. 1 is an explanatory diagram showing the overall concept of the present invention. This storage system comprises a plurality of servers 1, a plurality of switches 2, a plurality of storage devices 3, and a single managing device 4. These respective servers 1, switches 2 and storage devices 3 are respectively physical objects. The respective servers 1 and respective switches 2 are connected via a network 5, and the respective switches 2 and respective storage devices 3 are connected via another network 6. Furthermore, the respective servers 1, respective switches 2 and respective storage devices 3 are respectively connected to the managing device 4 via a management network 7. Here, the networks 5 and 6 can be constructed as, for example, fiber channel SANs (storage area networks), and the management network 7 can be constructed as, for example, an LAN (local area network) or WAN (wide area network).

Each server 1 respectively comprises a plurality of virtual servers 1A and 1B, a server managing part 1C, and resources 1D. The virtual servers 1A and 1B are virtual entities that are constructed inside the server 1. The logical servers 1A and 1B can be produced by logically dividing the server 1. The resources 1D possessed by the server 1 are respectively distributed between the virtual servers 1A and 1B. For instance, CPU resources, memory resources, communications interface resources and the like may be cited as examples of resources 1D. Application programs respectively operate on the respective virtual servers 1A and 1B (see FIG. 3). The server managing part 1C manages the constructions (disposition and connection of resources and the like) of the respective virtual servers 1A and 1B that are produced inside the server 1. Furthermore, the server managing part monitors the state (load state and the like) of the respective virtual servers 1A and 1B, and reports to the managing device 4, either positively or negatively.

Each of the switches 2 comprises a plurality of zones 2A and 2B, a switch managing part 2C, and resources 2D. The zones 2A and 2B are virtual entities that are constructed inside the switch 2, and may also be called virtual switches. The resources 2D possessed by the switch 2 are respectively distributed between the respective zones 2A and 2B. Port resources, memory resources, CPU resources and the like may be cited as examples of these resources. The switch managing part 2C manages the constructions of the respective zones 2A and 2B; furthermore, the switch managing part 2C monitors the state of the respective zones 2A and 2B, and reports to the managing device 4, either positively or negatively.

Similarly, each of the storage devices 3 comprises a plurality of virtual storage devices 3A and 3B, a storage managing part 3C, and resources 3D. The virtual storage devices 3A and 3B are virtual entities that are constructed inside the storage device 3. The virtual storage devices 3A and 3B are produced by logically dividing the storage device 3, and the resources 3D are respectively distributed between these virtual storage devices 3A and 3B. For instance, CPU resources, memory resources, disk resources, port resources and the like may be cited as examples of the resources 3D. The storage managing part 3C manages the construction of the respective virtual storage devices 3A and 3B. Furthermore, the storage managing part 3C monitors the states of the respective virtual storage devices 3A and 3B, and reports to the managing device 4, either positively or negatively.

For example, the managing device 4 comprises an information collecting part 4A, a disposition managing part 4B, a history managing part 4C, an output part 4D, an input part 4E, a management data base 4F, and a history data base 4G.

Furthermore, a user interface part 4H is constructed by the output part 4D and input part 4E.

The information collecting part 4A collects information from the respective server managing parts 1C, the respective switch managing parts 2C and the respective storage managing parts 3C, either periodically or aperiodically. For example, information indicating the load state, information indicating the conditions of resource disposition, information indicating the connection relationship of the respective physical or logical elements or the like may be cited as examples of the information that is collected.

The disposition managing part 4B can request re-disposition of respective resources from the respective managing parts 1C, 2C and 3C either automatically or by manual instruction. Resources that are to be deleted (i.e., resources whose assignment is to be canceled), resources that are to be added (i.e., resources that are to be newly assigned) and the like can be determined on the basis of information collected by the information collecting part 4A. Re-disposition policies, various types of resource management tables and the like are stored in the management data base 4F. The disposition managing part 4B can establish a resource re-disposition plan on the basis of the collected information and the storage content of the management data base 4F, and can respectively instruct the respective managing parts 1C, 2C and 3C to execute this plan.

The history managing part 4C respectively manages the histories of the collected information for each type of information. For example, the time at which these histories are manage can be arbitrarily set by instructions from a user such as the system manager or the like. For instance, the user can set the system beforehand so that the histories are managed in accordance with the period in which an I/O peak is generated in the application program. The histories of the respective types of information are respectively stored in the history data base 4G.

The user interface part 4H receives input operations from the user, and provides information to the user. For example, the output part 4D performs performance displays or construction displays via an output device such as display, printer or the like. The performance display part 4D1 is used to output performance information for the respective logical devices (the virtual servers 1A and 1B, the respective zones 2A and 2B, and the respective virtual storage devices 3A and 3B). The term "performance information" refers to information that indicates the degree of performance that is exhibited. For example, this is information that indicates the load state. Furthermore, for example, the construction display part 4D2 is used to respectively output the physical construction and logical construction of the storage system. The input part 4E receives input operations from the user. For example, the user can set conditions (threshold values) that trigger re-disposition, or can designate application programs that are the object of re-disposition.

Next, the overall operation of the storage system will be described. The application programs that operate on the respective virtual servers 1A and 1B access the virtual storage devices whose use is permitted among the respective virtual storage devices 3A and 3B of the respective storage devices 3 via the zones whose use is permitted among the respective zones 2A and 2B of the respective switches 2.

When a read command is issued from the virtual servers 1A and 1B, the virtual storage devices 3A and 3B read out the requested data from the cache memory or disk drive, and transmit this data to the virtual servers 1A and 1B. When a write command is issued from the virtual servers 1A and 1B, the virtual storage devices 3A and 3B store the write data in the cache memory or disk drive.

Data is transmitted and received inside the storage system in accordance with the operation of the application program. The load states of the respective logical devices (1A, 1B, 2A, 2B, 3A, 3B) vary according to the conditions. The variation of these load states is respectively monitored by the respective managing parts 1C, 2C and 3C, and is reported to the managing device 4.

In cases where an alert is received from any of the respective managing parts 1C, 2C or 3C, or in cases where a manual instruction is received from the user, the disposition managing part 4B establishes a resource re-disposition plan, and issues instructions (re-disposition requests) in order to realize this plan. The respective managing parts 1C, 2C and 3C receiving instructions from the disposition managing part 4B re-distribute the resources that are under the management of these managing parts 1C, 2C and 3C. As a result, the constructions of the logical devices vary. Such variation in constructions and variation in the load states are respectively managed by the history managing part 4C. Accordingly, the user can easily check the history of the variation in construction and variation in the load states.

Thus, in the present embodiment, the resource distribution of the storage system as a whole can be comprehensively managed by the managing device 4. Accordingly, even in cases where the construction of the storage system is complicated, a resource disposition that is well-balanced in the system as a whole can be achieved.

In the present embodiment, the resources utilized by the respective application programs can be re-disposed for each application program. Accordingly, even in cases where the construction of the storage system is complicated, resources can be optimally disposed so that there is no deterioration in the performance of the application programs.

In the present embodiment, the logical construction of the storage system can be output to the user interface part. Accordingly, even in cases where the physical construction and logical construction of the storage system are complicated, the user can grasp the construction of the storage system relatively easily, so that the convenience of use is improved.

In the present embodiment, the history of the logical construction, load state and the like of the storage system can be managed. Accordingly, the user can check variations in the load state and variations in the construction of the storage system relatively easily, so that the convenience of use is improved.

The application programs used by the user are various and diversified, and the periods in which I/O peaks are generated also differ. Furthermore, the amount of data possessed by the user increases from year to year, and the devices are reinforced or the like in order to maintain the performance of the storage system. Thus, the construction of the storage system varies dynamically in accordance with requests from the user, and the construction of the storage system becomes complicated. As such a complicated large-scale storage system is constructed, it becomes difficult to obtain a clear understanding of the construction of this storage system. In the case of the physical construction, this construction can be specified from wiring diagrams or the like; however, it is difficult to grasp the invisible logical construction. Furthermore, depending on the types of the respective application programs, there may be respectively different times when more resources are required, and times when fewer resources are sufficient. Inside a complicated storage system, it is difficult to achieve an appropriate understanding of the conditions of resource utilization by the respective application programs, so that corresponding resource disposition becomes difficult.

In the present embodiment, on the other hand, even in the case of a complicated large-scale storage system, resources can be optimally re-disposed, so that the convenience of use is improved. Furthermore, the present embodiment becomes more useful as a larger-scale storage system is constructed, but can also be applied to small-scale storage systems. The present embodiment will be described in greater detail below.

EXAMPLE 1

Figure 2:
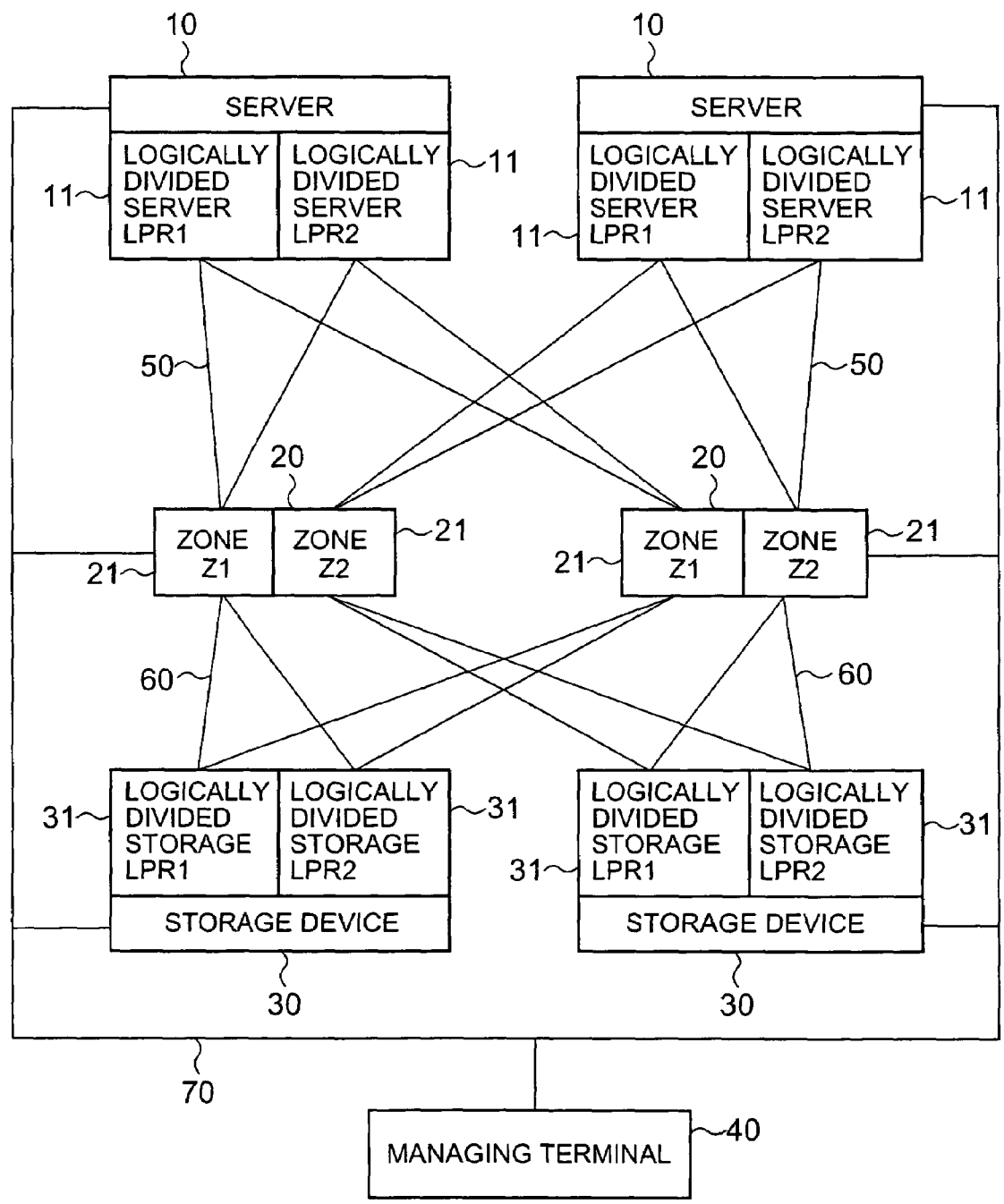
FIG. 2 is an explanatory diagram which shows the schematic construction of the storage system in model form.

FIG. 2 is an explanatory diagram which shows the overall construction of the storage system in model form. This storage system can be constructed so that the storage system contains a plurality of servers 10, a plurality of switches 20, a plurality of storage devices 30, and a managing terminal 40. The respective servers 10 are respectively connected to the respective switches 20 via a network 50. The respective switches 20 are respectively connected to the respective storage devices 30 via another network 60. The managing terminal 40 is respectively connected to the respective servers 10, the respective switches 20 and the respective storage devices 30 via a management network 70. To indicate the correspondence relationship with FIG. 1, the servers 10 correspond to the servers 1 in FIG. 1, the switches 20 correspond to the switches 2 in FIG. 1, the storage devices 30 correspond to the storage device 3 in FIG. 1, the managing terminal 40 corresponds to the managing device 4 in FIG. 1, the network 50 corresponds to the network 5 in FIG. 1, the network 60 corresponds to the network 6 in FIG. 1, and the management network 70 corresponds to the management network 7 in FIG. 1.

A plurality of logically divided servers 11 are respectively disposed in the respective servers 10. These respective logically divided servers 11 correspond to the virtual servers 1A and 1B in FIG. 1, an are formed by dividing the resources possessed by the server 1.

A plurality of zones 21 are respectively disposed in the respective switches 20. The respective zones 21 correspond to the zones 2A and 2B in FIG. 1, and are formed by dividing the resources possessed by the switches 20.

A plurality of logically divided storage devices 31 are respectively disposed in the respective storage devices 30. The respective logically divided storage devices 31 correspond to the virtual storage devices 3A and 3B in FIG. 1. These respective logically divided storage devices 31 are formed by dividing the resources possessed by the storage devices 30. In the following description, the logically divided devices will be referred to as "LPR" in some cases.

Figure 3:
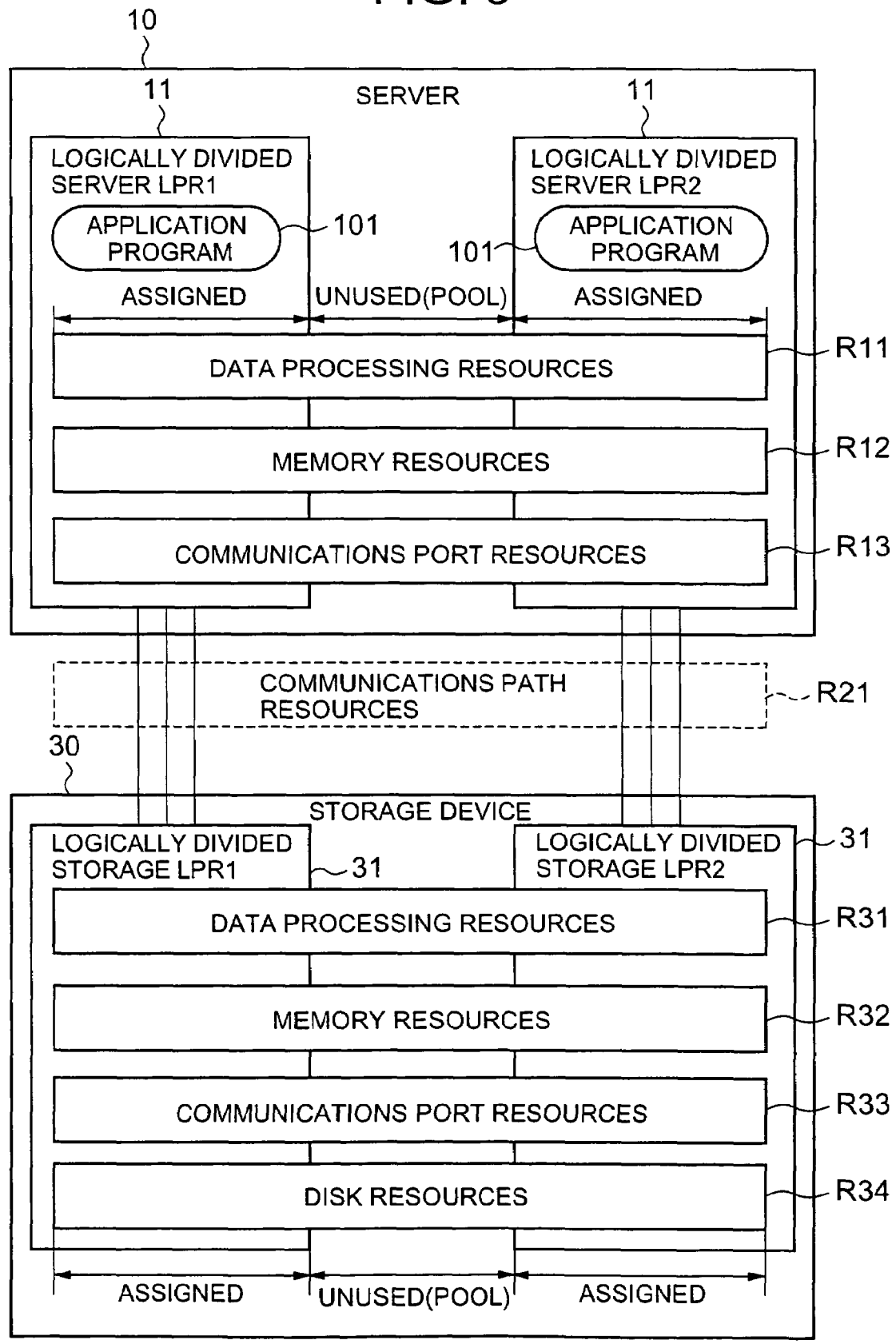
FIG. 3 is an explanatory diagram which shows the relationship of the respective logically divided devices.

FIG. 3 is an explanatory diagram which shows the resource disposition of the storage system in model form. First, noting the servers 10, respective application programs 101 are operated on the respective logically divided servers 11. For instance, customer management programs, sales management programs, email processing programs, payroll accounting programs, account management programs and the like may be cited as examples of application programs 101.

Each server 10 comprises a plurality of different types of resources R11, R12 and R13. The data processing resources R11 are, for example, resources of data processing circuits such as CPUs or the like. The memory resources R12 are (for example) memory circuits such as ROM (read only memory), RAM (random access memory) and the like, and resources such as local disks and the like. The communications port resources R13 are, for example, communications circuit resources such as HBAs (host bus adapters) and the like.

At least a portion of each of these respective types of resources R11, R12 and R13 is assigned to one of the respective logically divided servers 11. Among these respective resources R11, R12 and R13, the resources that are not assigned to any of the logically divide servers 11 are pooled as unused resources. In cases where resources are to be newly added, resources are selected from the pool of unused resources, and are assigned to the logically divide servers 11. Conversely, in the case of resources that have become unnecessary, the assignment of these resources to the logically divided servers 11 is released, and the resources are returned to the pool.

Noting the switches 20, the communications path resources R21 of the switches 20 are respectively assigned to the respective logically divided servers 11. The unused resources R21 are pooled as unused resources.

Noting the storage devices 30, at least some of the resources R31, R32, R33 and R34 of each storage device 30 are respectively assigned to the respective logically divided storage devices 31. The data processing resources R31 are, for example, resources of data processing circuits such as CPUs or the like. The memory resources R32 are resources of memory circuits such as cache memories, shared memories or the like. The communications port resources R33 are, for example, resources of communications circuits such as communications ports or the like. The disk resources R34 are (for example) resources of hard disk drives, optical disk drives, semiconductor memory drives or the like.

By thus dividing the respective resources belonging to the respective servers 10, respective switches 20 and respective storage devices 30, it is possible to construct a plurality of logical devices inside a single housing. Furthermore, the input and output of data required for the execution of application programs 101 can be separately performed according to the connections of the respective logical devices.

Figure 4:
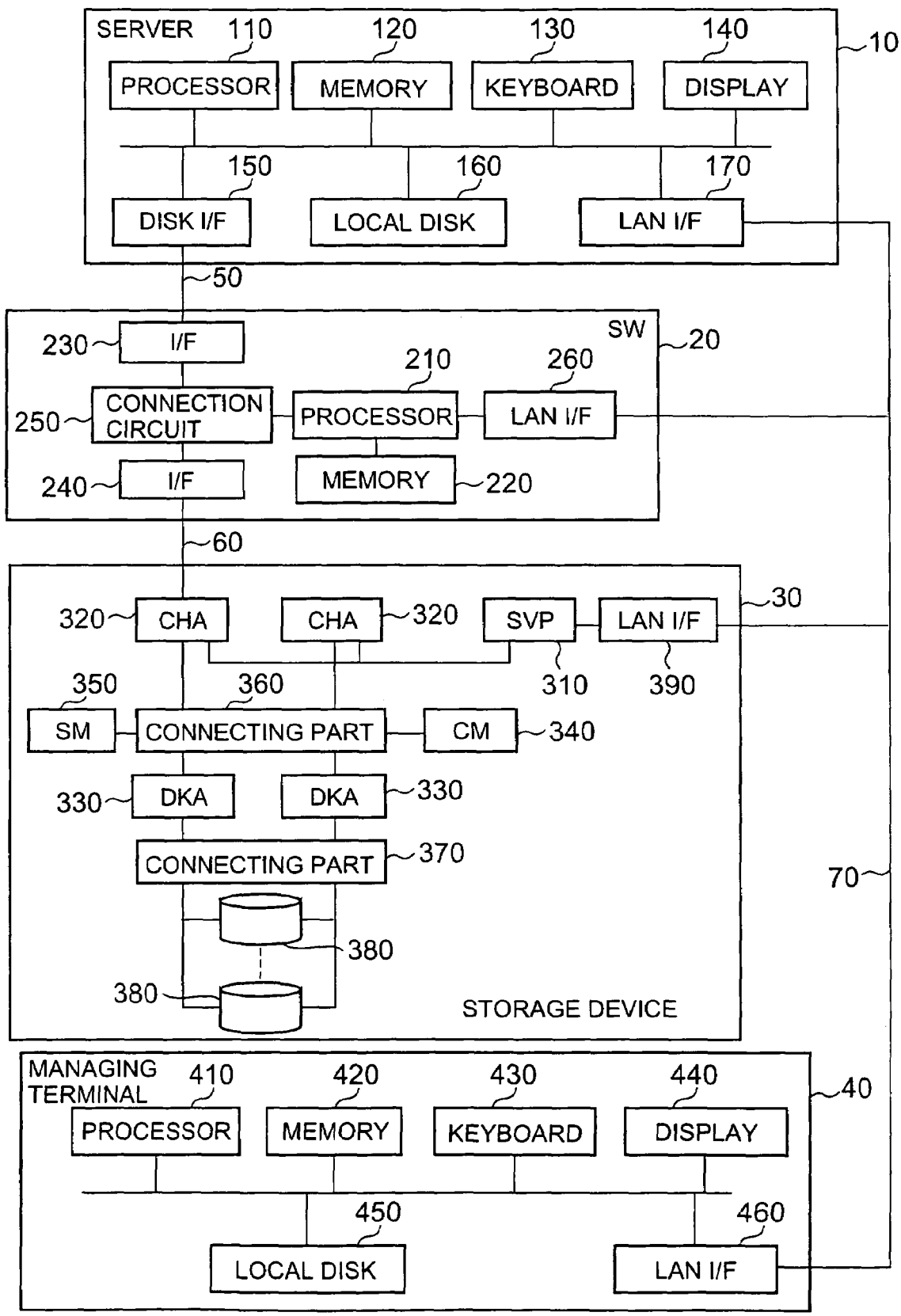
FIG. 4 is a block diagram which shows the physical construction of the storage system.

FIG. 4 is a block diagram which illustrates the hardware connections of the storage system. In FIGS. 3 and 4, only a single server 10, switch 20 and storage device 30 are shown; however, as was described with reference to FIG. 2, the storage system may be constructed so as to include a plurality of servers 10, a plurality of switches 20, an a plurality of storage devices 30.

For example, each server 10 may comprise a processor 110, a memory 120, a keyboard switch 130, a display 140, a disk interface (in the figures, interface is abbreviated to "I/F") 150, a local disk 160, and an LAN interface 170. For example, a logically divided server 11 can be constructed by logically dividing and using the processor 210, memory 120, disk interface 150 and local disk 160 among the respective elements mentioned above.

For example, each switch 20 may comprise a processor 210, memory 220, interfaces 230 and 240, connecting circuit 250, and LAN interface 260. For example, respective zones 21 can be constructed merely by dividing the interfaces 230 and 240 (among these respective elements). Furthermore, virtual switches can also be constructed by logically dividing the processor 210 and memory 220 in addition to the interfaces 230 and 240.

For example, each storage device 30 may be constructed so that this storage device 30 comprises a service processor (SVP) 310, channel adapters (CHAs) 320, disk adapters (DKA) 330, a cache memory (CM) 340, a shared memory (SM) 350, connecting parts 360 and 370, disk drives 380, and an LAN interface 390.

The SVP 310 collects various types of information within each storage device 30, and transmits the collected information to the managing terminal 40. Furthermore, the SVP 310 varies the construction within the storage device 30 on the basis of instructions from the managing terminal 40.

Each CHA 320 is a control circuit that performs data communications with the server 10. This CHA 320 comprises respective pluralities of ports and processors, and can perform data communications separately with a plurality of servers 10. Each DKA 330 is a control circuit that performs data communications with the respective disk drives 380. The DKAs 330 perform conversion processing between logical block addresses (LBAs) and physical addresses of disk drives 380. The CHAs 320 and DKAs 330 can be constructed as respective separate dedicated control boards, or can be constructed as multi-functional control boards with both parts mixed together on the same board.

For example, the cache memory 340 is constructed from a plurality of volatile or nonvolatile memory boards, and stores data that is received from the servers 10, data that is read out from the disk drives 380 and the like. Likewise, for example, the shared memory 350 is constructed from a plurality of volatile or nonvolatile memory boards, and stores construction information, control information and the like for the storage devices 30. The cache memory 340 and shared memory 350 can be constructed as respective separate memory boards, or can be mixed together on the same memory board.

The connecting part 360 connects the CHAs 320, DKAs 330, cache memory 340 and shared memory 350 to each other; for example, this connecting part 360 is constructed as a cross-bar switch. The other connecting part 370 is a switching circuit that connects the respective disk drives 380 and DKAs 330 to each other.

For example, the disk drives 380 can be constructed from various types of storage devices such as hard disks, optical disks, semiconductor memories, magnetic tapes or the like. A logical storage region corresponding to the RAID level can be constructed by connecting a plurality of physical storage regions belonging to the respective disk drives 380.

For example, the managing terminal 40 may comprise a processor 410, a memory 420, a keyboard switch 430, a display 440, a local disk 450 and an LAN interface 460.

Figure 5:
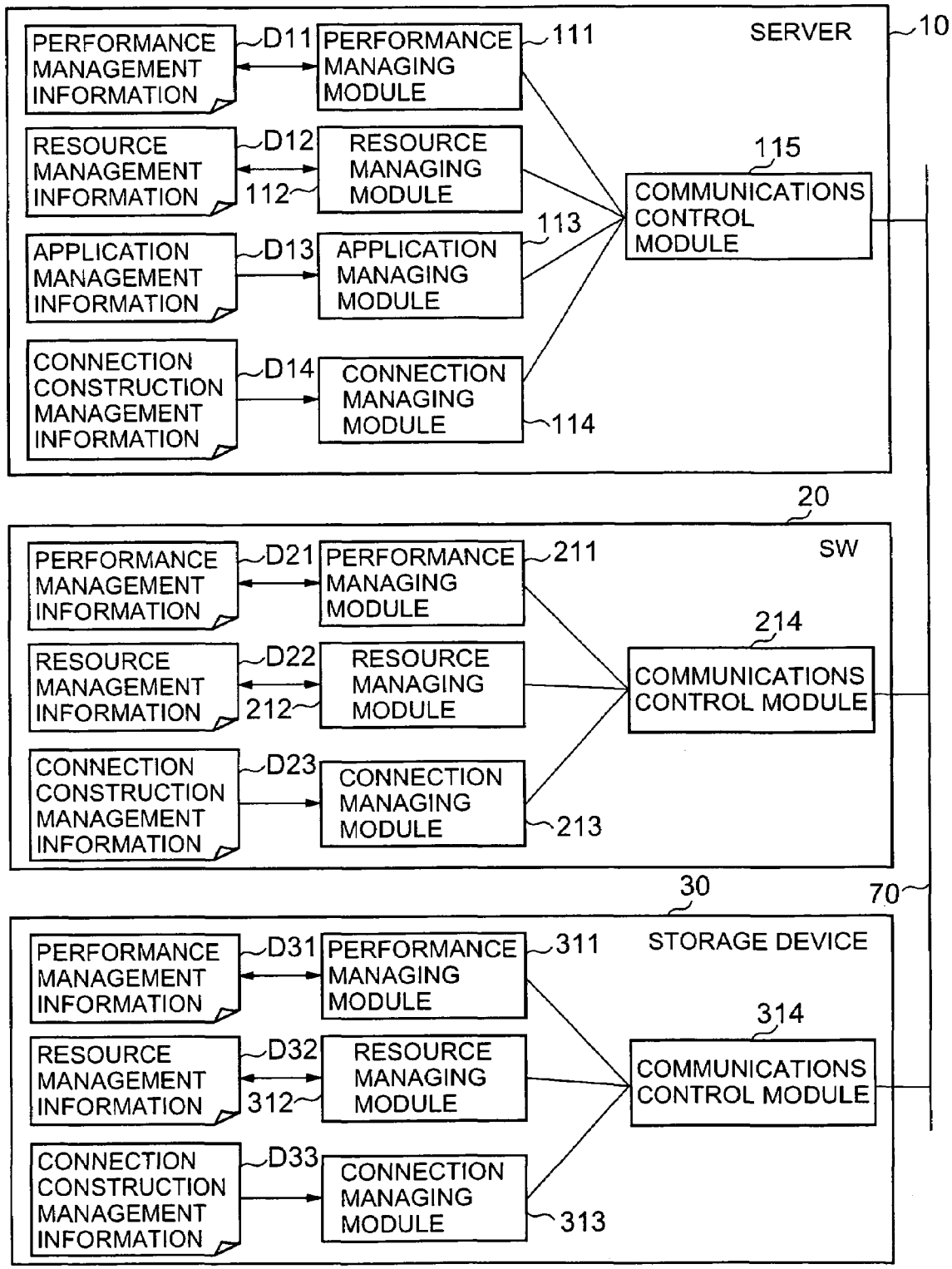
FIG. 5 is an explanatory diagram showing the software construction of the server, switches and storage device.

FIG. 5 is an explanatory diagram which shows in model form the software construction of the servers 10, switches 20 and storage devices 30 with regard to dynamic alterations in the construction of the storage system. For example, each server 10 may comprise a performance managing module 111, a resource managing module 112, an application managing module 113, a connection managing module 114 an a communications control module 115.

The performance managing module 111 is a module that manages performance management information D11. The resource managing module 112 is a module that manages resource management information D12. The application managing module 113 is a module that manages application management information D13. The connection managing module 114 is a module that manages connection construction management information D14. The contents of these respective types of information D11 through D14 will be described later.

For example, each switch 20 may comprise a performance managing module 211, a resource managing module 212 and a connection managing module 213. The performance managing module 211 manages performance management information D21. The resource managing module 212 manages resource management information D22. The connection managing module 213 manages connection management information D23.

For example, each storage device 30 may comprise a performance managing module 311, a resource managing module 312, and a connection managing module 313. The performance managing module 311 manages performance management information D31. The resource managing module 312 manages resource management information D32. The connection managing module 313 manages connection construction management information D33.

Figure 6:
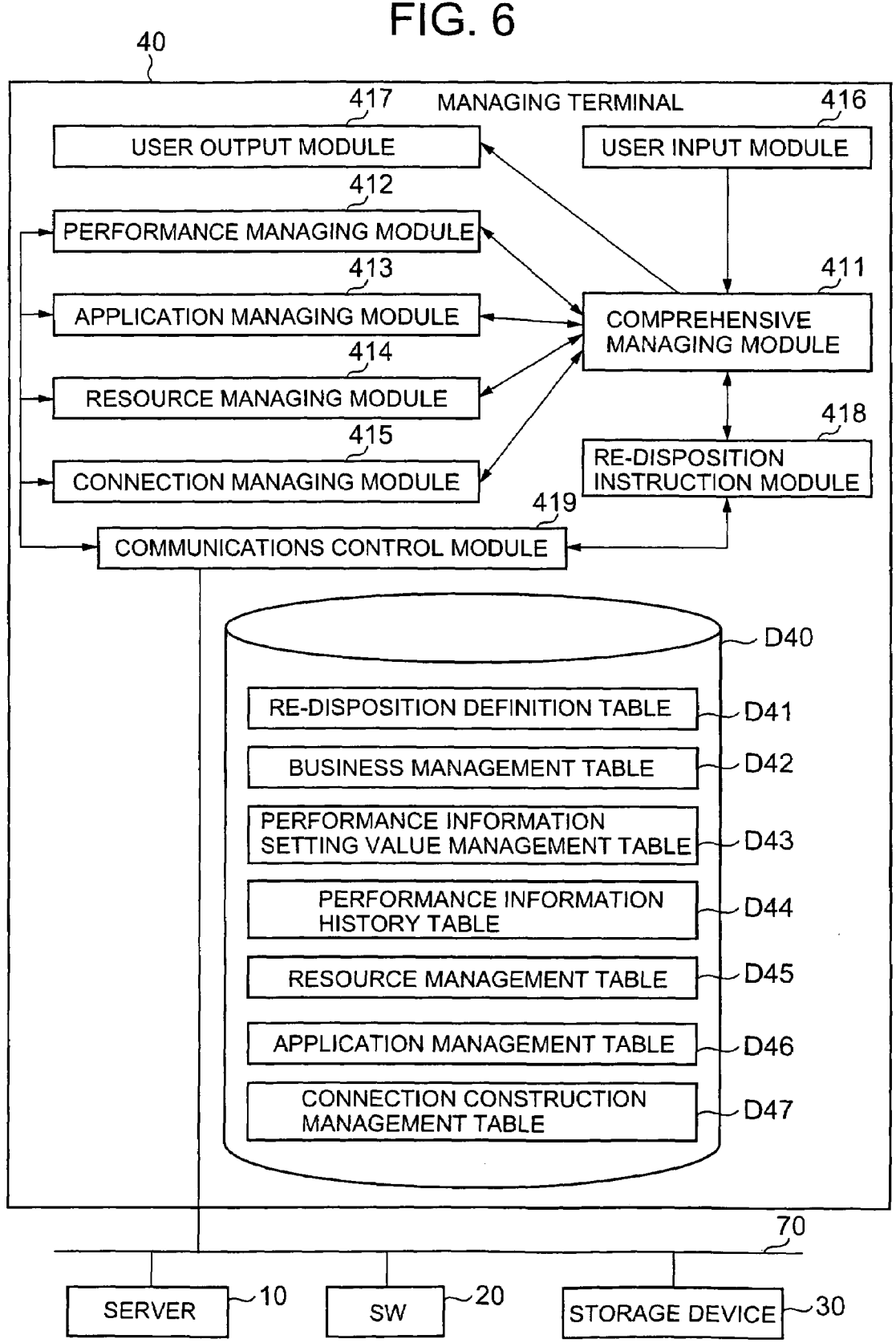
FIG. 6 is an explanatory diagram showing the software construction of the managing terminal.

FIG. 6 is an explanatory diagram showing the software construction of the managing terminal 40. For example, the managing terminal 40 may comprise a comprehensive managing module 411, a performance managing module 412, an application managing module 413, a resource managing module 414, a connection managing module 415, a user input module 416, a user output module 417, a re-disposition instruction module 418, and a communications control module 419.

Furthermore, for example, a re-disposition definition table D41, a business management table D42, a performance information setting value management table D43, a performance information history table D44, a resource management table D45, an application management table D46 and a connection construction management table D47 may be disposed in the data base D40 of the managing terminal 40.

The operations of the respective modules will be described later; here, the comprehensive managing module 411 controls the overall construction management of the storage system. The performance managing module 412 manages the performance management information inside the storage system. The application managing module 413 manages the information of the application programs that operate on the servers 10. The resource managing module 414 manages the conditions of assignment of respective resources inside the storage system. The connection managing module 415 manages the physical connections and logical connections inside the storage system.

The user input module 416 and user output module 417 constitute a user interface. The user input module 416 outputs information that is input by the user via the keyboard switch 430 or the like to the comprehensive managing module 411. For instance, various types of setting values (threshold values and the like), history display ranges, menu operations and the like may be cited as examples of information that is input by the user.

The user output module 417 outputs information that is input from the comprehensive managing module 411 via the display 440 or the like. Information indicating the current or past construction of the storage system, information indicating the current or past use conditions (load state) of the storage system and the like may be cited as examples of information that is output to the display 440 or the like.

The re-disposition instruction module 418 re-disposes the resources within the storage system by issuing re-disposition requests to specified devices among the respective servers 10, respective switches 20 and respective storage devices 30.

The communications control module 419 is a module that transmits and receives information among the communications control modules 115 of the respective serves 10, the communications control modules 214 of the respective switches 20, and the communications control modules 314 of the respective storage devices 30.

FIG. 7 is an explanatory diagram showing the construction of the performance management information D11 that is held in the servers 10. This performance management information D11 is information that is used to manage various types of information relating to performance on the basis of various types of resources within the servers 10. For example, this performance management information D11 can be constructed by establishing a correspondence among management locations, performance information, maximum performance values, upper limit threshold values, lower limit threshold values and monitoring periods.

The term "management location" refers to discriminating information that is used to specify respective resources that are the object of management. For example, management locations can be constructed so as to include the type and identification number of the resource in question, as in "processor 1", "processor 2", "memory 1", "memory 2" and the like. In each server 10, the processor 110, memory 120 and disk interface 150 are locations that are the object of management.

"Performance information" is information that indicates current performance values for the management locations; this information indicates the load state (or use rate). The "maximum performance value" is information indicating the maximum performance value of the management location in question. In cases where the performance information is expressed as a percentage, the value of the maximum performance value is 100%. The performance information and maximum performance value may be expressed as percentages, or may be expressed as absolute values as in MB or IOPS (input output per second).

The "upper limit threshold value" indicates the upper limit value of the value of performance information for the management location in question. This upper limit threshold value can be set by the user. An initial upper limit value is set in cases where this value is not set by the user. In cases where the performance information for the management location reaches the upper limit threshold value, this indicates that fresh resources must be assigned to the management location in question. The "lower limit threshold value" indicates the lower limit value of the performance information for the management location in question. This lower limit threshold value can be set by the user. An initial lower limit value is set in cases where this value is not set by the user. In cases where the performance information of the management location reaches the lower limit threshold value, this means that the management location in question cannot be effectively utilized, and indicates that the assignment of this resource to the logically divide server 11 must be canceled.

The "monitoring period" indicates the period during which the performance information for the management location in question is detected. The monitoring period can be set by the user. An initial period is set in cases where this period is not set by the user.

FIG. 8 is an explanatory diagram showing the construction of the resource management information D12 that is held by the servers 10. This resource management information D12 is used to manage the assignment conditions of the respective resources within each server 10. For example, the resource management information D12 can be constructed by establishing a correspondence between the management locations and the assignment information. The "assignment information" is information indicating the logically divided server 11 to which the management location is assigned. Either information that is used to discriminate the logically divided server 11 ("LPR1" and "LPR2" in the figures) or information indicating that the management location has not been assigned to any of the logically divided servers 11 is set in the assignment information.

FIG. 9 is an explanatory diagram showing the construction of the application management information D13 that is held by the servers 10. The application management information D13 is information that is used to manage the respective application programs 101 that are executed on the servers 10. For example, this application management information D13 can be constructed by establishing a correspondence among application names, assignment information, path names and cluster names.

The term "application name" refers to information that is used to discriminate the application programs 101; for example, this information can be constructed so as to include the type and identification number of the application program in question. The term "assignment information" refers to information that is used to specify the logically divided server 11 to which the application program 101 in question is assigned. The term "path name" refers to information that is set only in the path management software. Information that is used to specify the path that is managed by the path management software in question is set in the path name. The term "cluster name" refers to information that is set only in the cluster software that is used to manage the cluster in question. Information that is used to discriminate this cluster is set in the cluster name.

FIG. 10 is an explanatory diagram showing the construction of the connection construction management information D14 that is held by the servers 10. The connection construction management information D14 shows the physical connection construction of the server 10 in question. For example, the connection construction management information D14 can be constructed by establishing a correspondence between the disk interface names and the connection destinations. The term "disk interface name" refers to information that is used to discriminate the disk interface 150. The term "connection destination" refers to information that is used to specify the storage device 30 to which this disk interface 150 is connected.

FIG. 11 is an explanatory diagram showing the construction of the performance management information D31 that is held by each storage device 30. This performance management information D31 is information that is used to manage the performance states of the respective types of resources of the storage device 30. For example, like the performance management information D11, the performance management information D31 can be constructed by establishing a correspondence among the management locations, performance information, maximum performance values, upper limit threshold values, lower limit threshold values and monitoring periods. For instance, the processor, host interface, shared memory 350, cache memory 340, disk control parts (DKAs) 330 and physical disks 380 can be cited as examples of management locations. For example, the processor and host interface are resources possessed by the CHAs 320.

FIG. 12 is an explanatory diagram showing the construction of the resource management information D32 held by each storage device 30. The resource management information D32 is information which indicates the logically divided storage devices 31 to which respective resources inside the storage device 30 have been assigned. Like the resource management information D12, the resource management information D32 can be constructed by establishing a correspondence between management locations and assignment information.

Like the abovementioned connection construction management information D14, the connection construction management information D33 that is held by the storage device 30 can be constructed by establishing a correspondence between the host interface names and the connection destinations. Accordingly, a graphic illustration of the connection construction management information D33 is omitted.

Furthermore, the performance management information D21, resource management information D22 and connection construction management information D23 held by each switch 20 can be respectively constructed in substantially the same manner as the abovementioned performance management information D11, resource management information D12 an connection construction management information D14. Accordingly, a graphic illustration of these respective types of information D21 through D23 is omitted.

Figure 13:
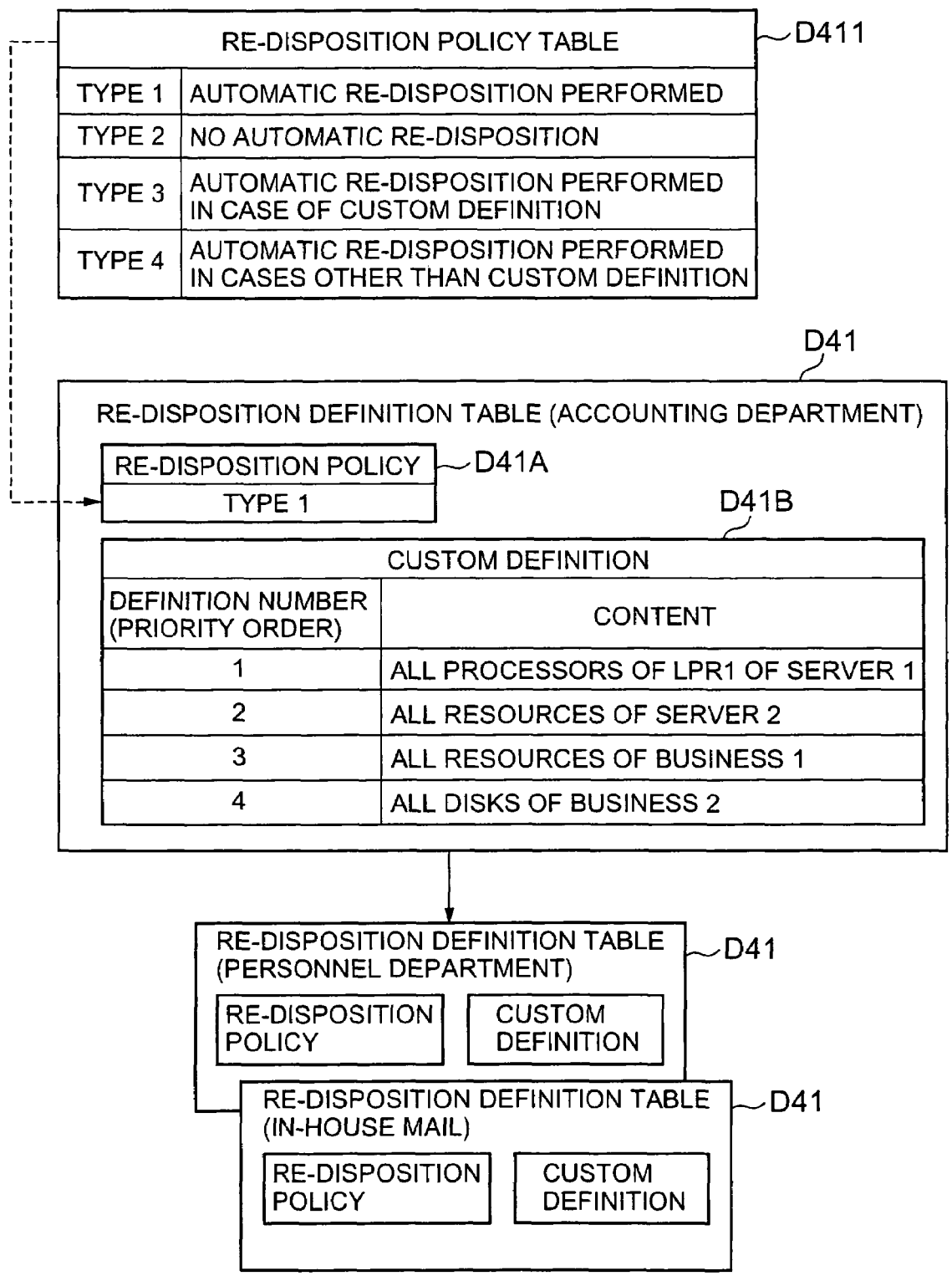
FIG. 13 is an explanatory diagram showing the construction of the re-disposition definition table.

FIG. 13 is an explanatory diagram showing the construction of the re-disposition definition table D41 held by the managing terminal 40. Such a re-disposition definition table D41 is respectively prepared for each application program; these tables constitute information that defines in advance the re-disposition conditions for the respective resources utilized by the respective application programs.

For example, the re-disposition definition table D41 can be constructed so that this table includes re-disposition policies D41A and custom definitions D41B. Information that is used to select one policy from a plurality of policies registered in a re-disposition policy table D411 is set in the re-disposition policies D41A. In the re-disposition policy table D411, for example, a correspondence is established between type names and policies for the respective types.

For example, in the case of "type 1", there is a definition indicating that automatic re-disposition is performed. In the case of "type 2", there is a definition indicating that automatic re-disposition is not performed. In the case of "type 3", there is a definition indicating that automatic re-disposition is performed for custom-defined resources. In the case of "type 4", there is a definition indicating that automatic re-disposition is performed for resources other than custom-defined resources. Automatic re-disposition means that in cases where the performance information for resources reaches a threshold value, the respective resources utilized by application programs relating to these resources are automatically re-disposed. Custom definition means that the ranking of re-disposition is separately designated by the user for one or a plurality of resources.

In the custom definitions D41B in the re-disposition definition table D41, for example, re-disposition conditions that are separately defined by the user are registered, such as "all processors assigned to LPR1 of server 1", "all resources belonging to server 2" or the like. Furthermore, custom definitions with a higher ranking are preferentially executed.

As was described above, re-disposition definition tables D41 can be respectively prepared for respective application programs, such as a table for accounting programs, a table for personnel programs, a table for in-house email programs, a table for external email programs and the like.

FIG. 14 is an explanatory diagram showing the construction of the business management table D42 that is held by the managing terminal 40. The business management table D42 is used to manage the constructions and the like of respective businesses defined by the user. For example, the business management table D42 can be constructed by establishing a correspondence among business names, server names, LPR information, application names and business periods.

The term "business name" refers to a name that is set for the application program in question. For example, in the case of a sales management data base program, the user can freely set a name such as "accounting processing" or the like. Furthermore, in cases where the object of processing of an email management program is in-house email, the user can freely set a name such as "in-house email processing" or the like for this application program.

The term "server name" refers to information that is used to specify the server 10 on which the business, i.e., the application program, is executed. The term "LPR information" refers to information that is used to specify the logically divided server 11 on which the application program is executed. The term "application name" refers to information that is used to specify the application program.

The term "business period" refers to information which indicates the period in which the I/O peak of the application program occurs. The respective application programs have specified I/O patterns in accordance with the specific natures of these programs. For example, in the case of accounting processing, the period during which the income and disbursal of funds are performed in a concentrated manner tends to be substantially fixed; accordingly, the amount of I/O is increased during this period, and the amount of I/O during periods other than this period drops. Furthermore, in the area of email, for example, in cases where an email archive is prepared on a weekly basis, the amount of I/O increases at the timing at which the archive is prepared. Thus, in respective application programs, the timing at which batch processing is executed (and the like) varies according to the nature of the program, so that the period in which the I/O peak is seen may differ. Accordingly, in the "business period" column, the user designates the periods in which the I/O peaks of the respective application programs occur. Furthermore, as in the case of other user input items that have already been described or that will be describe later, a construction may also be used in which setting values are automatically calculated by analyzing history information. Furthermore, the system may also be constructed so that automatically calculated setting values are stored as initial values, and these initial values can easily be altered by the user.

As is also shown in the lower part of FIG. 14, the business management table D42 is stored in association with the year, month and day of preparation of this table (the hour, minute and second may also be included). Specifically, the alteration history of the business management table D42 is managed.

FIG. 15 is an explanatory diagram showing the construction of the performance information setting value management table (hereafter also referred to as the "setting value management table" in some cases) D43 that is held by the managing terminal 40. The setting value management table D43 is used to manage the respective setting values relating to performance for the respective resources within the storage system. For example, such a setting value management table D43 is prepared for each server 10, each switch 20 and each storage device 30. For example, the setting value management table D43 for a given device can be constructed by establishing a correspondence among the management location, performance threshold value, upper limit threshold value, lower limit threshold value and monitoring period.

Here, the term "performance threshold value" refers to a threshold value that indicates the usable upper limit of the resource in question. On the other hand, the term "upper limit threshold value" refers to a trigger used to cause the re-disposition of the respective resources utilized by the application program relating to these resources.

Figure 16:
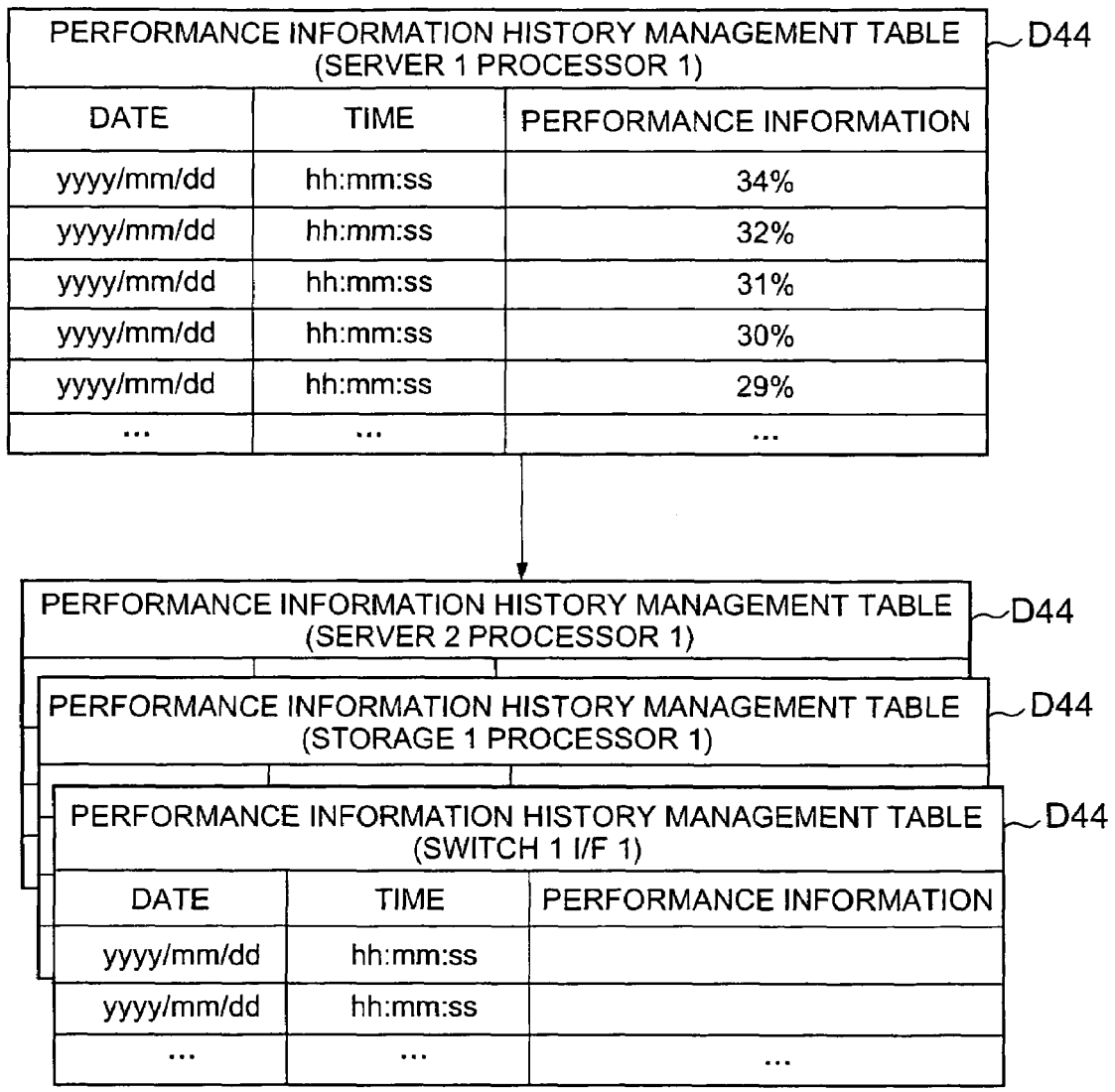
FIG. 16 is an explanatory diagram showing the construction of the performance information history management table.

FIG. 16 is an explanatory diagram showing the construction of the performance information history management table (hereafter also referred to as the "history management table" in some cases) D44 that is held by the managing terminal 40. The history management table D44 manages transitions in the performance information for the respective resources. Such a history management table D44 is respectively prepared for each resource that is the object of management. For example, the history management table D44 can be constructed by establishing a correspondence between information relating to the year, month and day on which performance information is acquired (the hour, minute and second may also be included) and the performance information that is acquired at this time.

Figure 17:
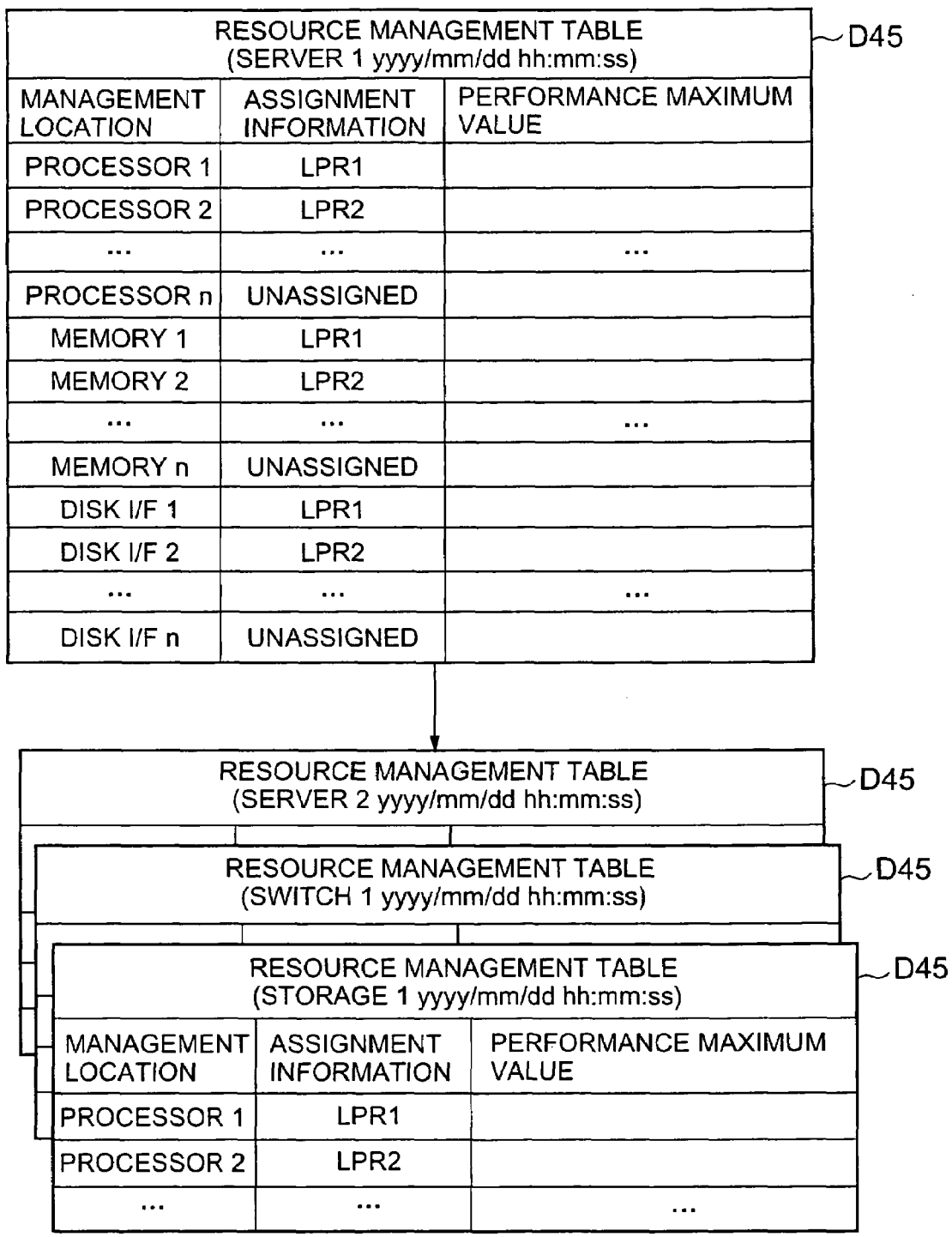
FIG. 17 is an explanatory diagram showing the construction of the resource management table.

FIG. 17 is an explanatory diagram showing the construction of the resource management table D45 that is held by the managing terminal 40. This resource management table D45 is used to manage the logically divided devices (LPRs) to which respective resources that are the object of management are assigned. For example, the resource management table D45 can be constructed by establishing a correspondence among the management locations, assignment information (LPR information) and maximum performance values. Such a resource management table D45 is respectively prepared for each server 10, each switch 20 and each storage device 30, and the histories of these tables are respectively managed.

FIG. 18 is an explanatory diagram showing the construction of the application management table D46 that is held by the managing terminal 40. The application management table D46 is used to manage the constructions of the respective application programs 101. Such an application management table D46 is prepared for each server 10, and the histories of these tables are managed.

Figure 19:
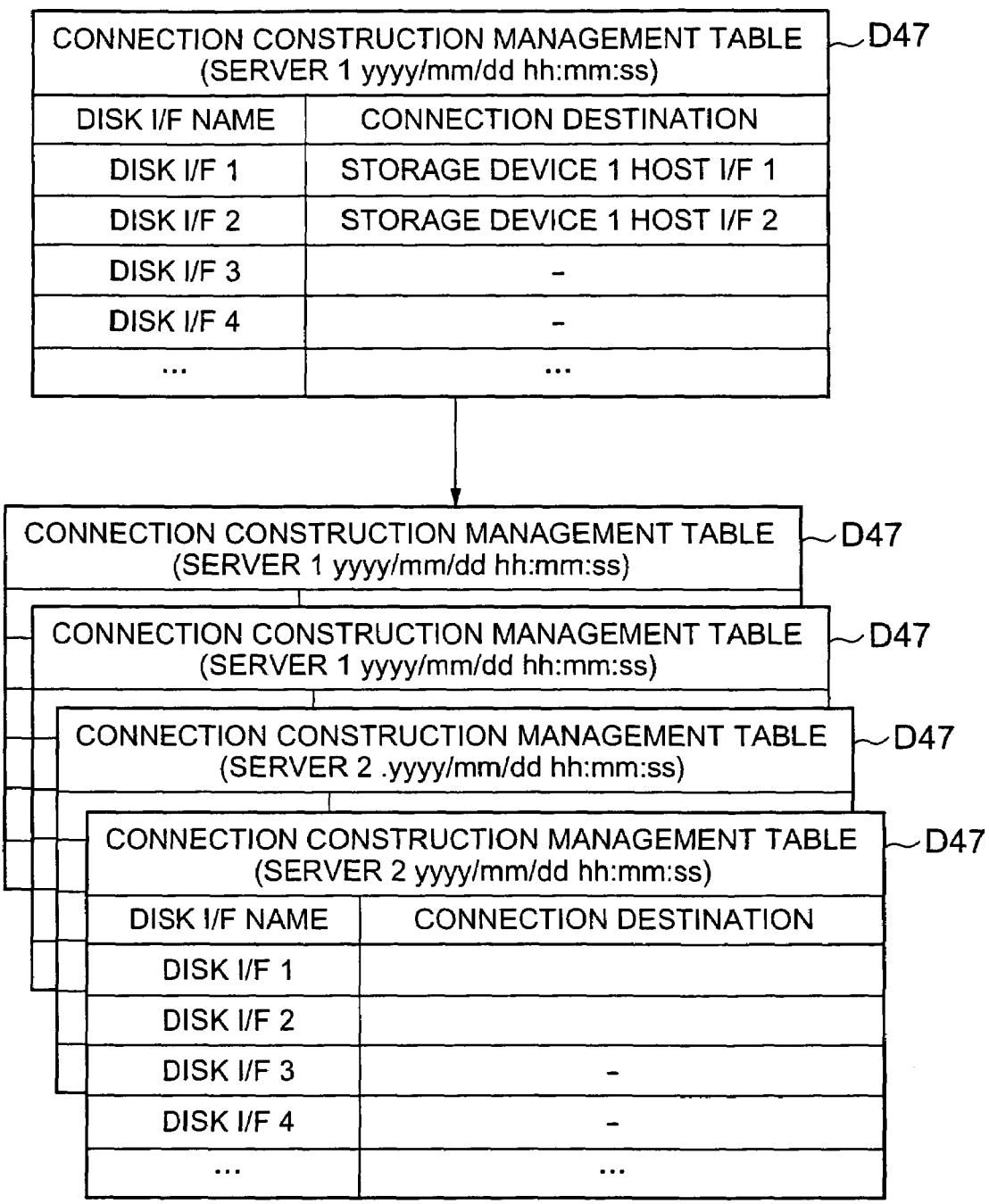
FIG. 19 is an explanatory diagram showing the construction of the connection construction management table.

FIG. 19 is an explanatory diagram showing the construction of the connection construction management table D47 that is held by the managing terminal 40. Such a connection construction management table D47 can be respectively prepared for each server 10, each switch 20 and each storage device 30. In FIG. 19, a table relating to one of the servers 10 is shown. For example, this table D47 can be constructed by establishing a correspondence between the interface names (port names) and connection destinations. Furthermore, in the figure, the port numbers (host interface numbers) of the storage devices that constitute the ultimate destinations are noted as the connection destinations; instead of this, however, it would also be possible to record which switch 20 is connected to which storage device 30 via which port.

The constructions of the principal tables have been described above. Here, the description again refers to FIG. 5. An association is made between the performance management information D11, D21 and D31 respectively held by the servers 10, switches 20 and storage devices 30 that are the object of management and the setting value management table D43 and history management table D44 that are held by the managing terminal 40. Furthermore, an association is made between the resource management information D12, D22 and D32 held by the respective devices that are the object of management and the resource management table D45 held by the managing terminal 40. Moreover, an association is made between the application management information D13 held by the respective servers 10 and the application management table D46 held by the managing terminal 40. Furthermore, an association is made between the connection construction management information D14, D23 and D33 held by the respective devices that are the object of management and the construction connection management table D47 held by the managing terminal 40.

Next, the various types of input screens and output screens provided by the user interface of the managing terminal 40 will be described.

Figure 20:
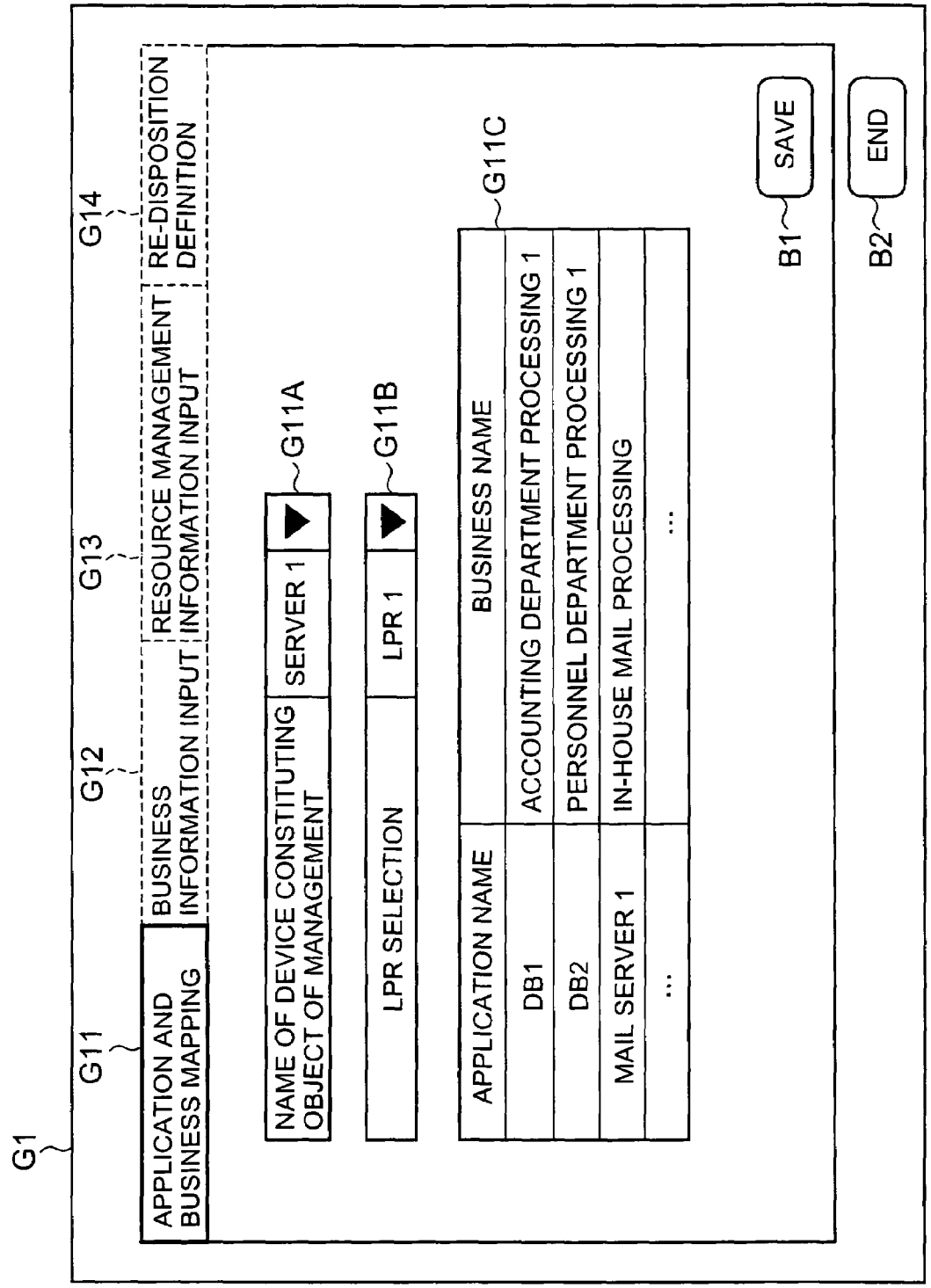
FIG. 20 is an explanatory diagram showing the screen on which a correspondence between applications and business is established.

FIG. 20 is an explanatory diagram showing the input screen G1 that is used to establish a correspondence between application programs and businesses. A plurality of tab menus G11, G12, G13 and G14 are displayed on this input screen. When the first tab menu G11 is selected by the user, a screen G1 that is used to map the application programs 101 and businesses is displayed.

For example, the mapping screen G11 may include a selection column G11A that is used to select devices that are the object of management, a selection column G11B that is used to select the logically divided units (LPRs), and a name entry column G11C that is used to set respective business names (service names) for each application program. The user selects the desired logically divided server 11 (LPR) via the selection columns G11A and G11B. As a result, the names of the respective application programs that are executed on the logically divided server 11 are displayed in the name entry column G11C. The user sets respective free business names for each of the respective application programs. When the user operates the store button B1, the input content is registered in the business management table D42. When the user operates the end button B2, the screen G1 is closed.

Figure 21:
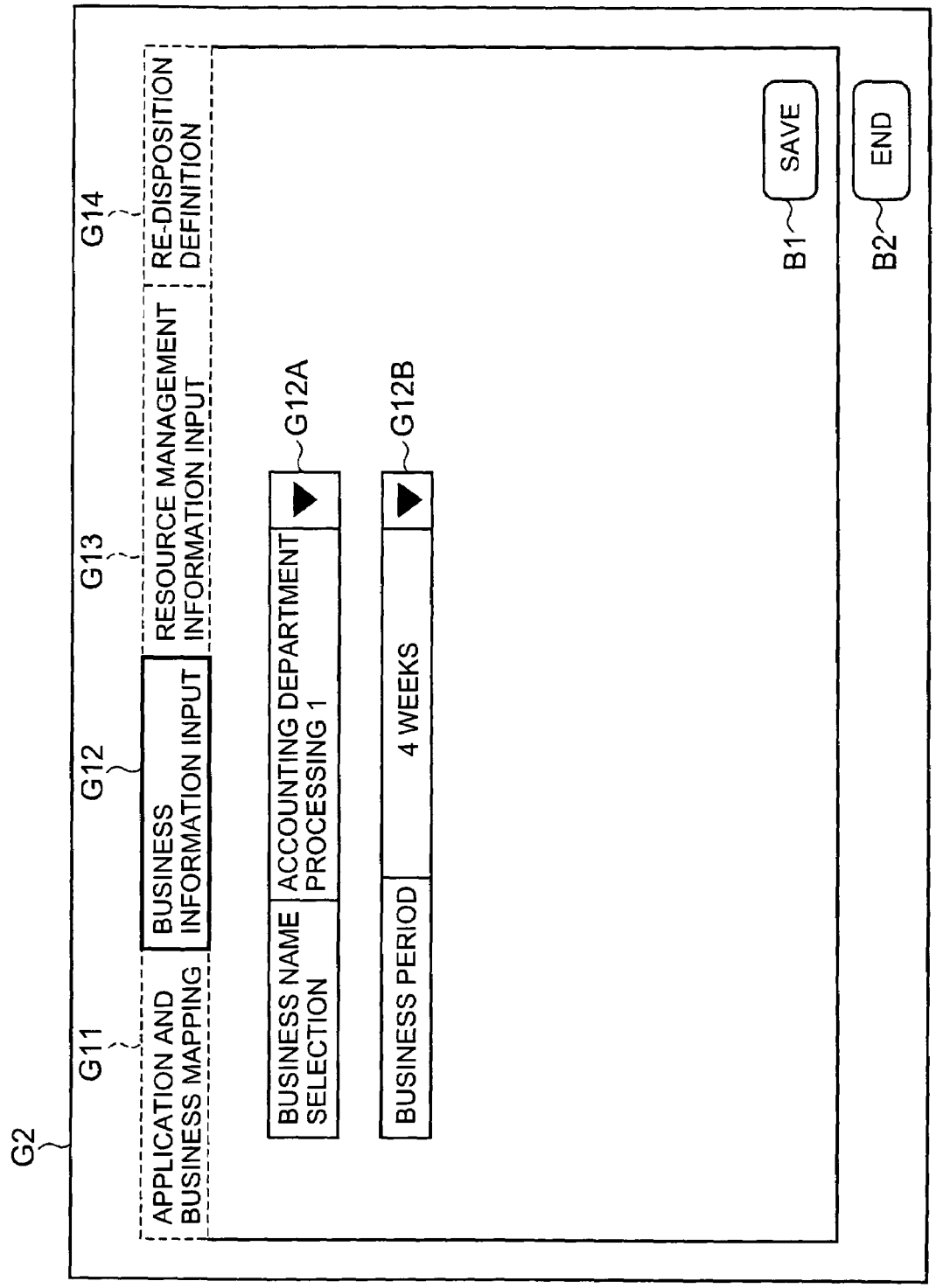
FIG. 21 is an explanatory diagram showing the screen on which business information is input.

FIG. 21 is an explanatory diagram showing the screen G2 that is used to input business information. When the user selects the tab menu G12, this screen G2 is displayed. For example, the screen G2 may include a selection column G12A which is used to select business names, and a setting column G12B which is used to set business periods. Via the selection column G12A, the user selects a business name for which a business period is to be set. Then, the user sets the business period for this selected business name via the setting column G12B. As was described above, the term "business period" refers to the period in which the I/O peak of the business (application program) occurs; in other words, this indicates the period during which the performance information is monitored. When the user operates the store button B1, the content of the input made into the screen G2 is registered in the business management table D42.

Figure 22:
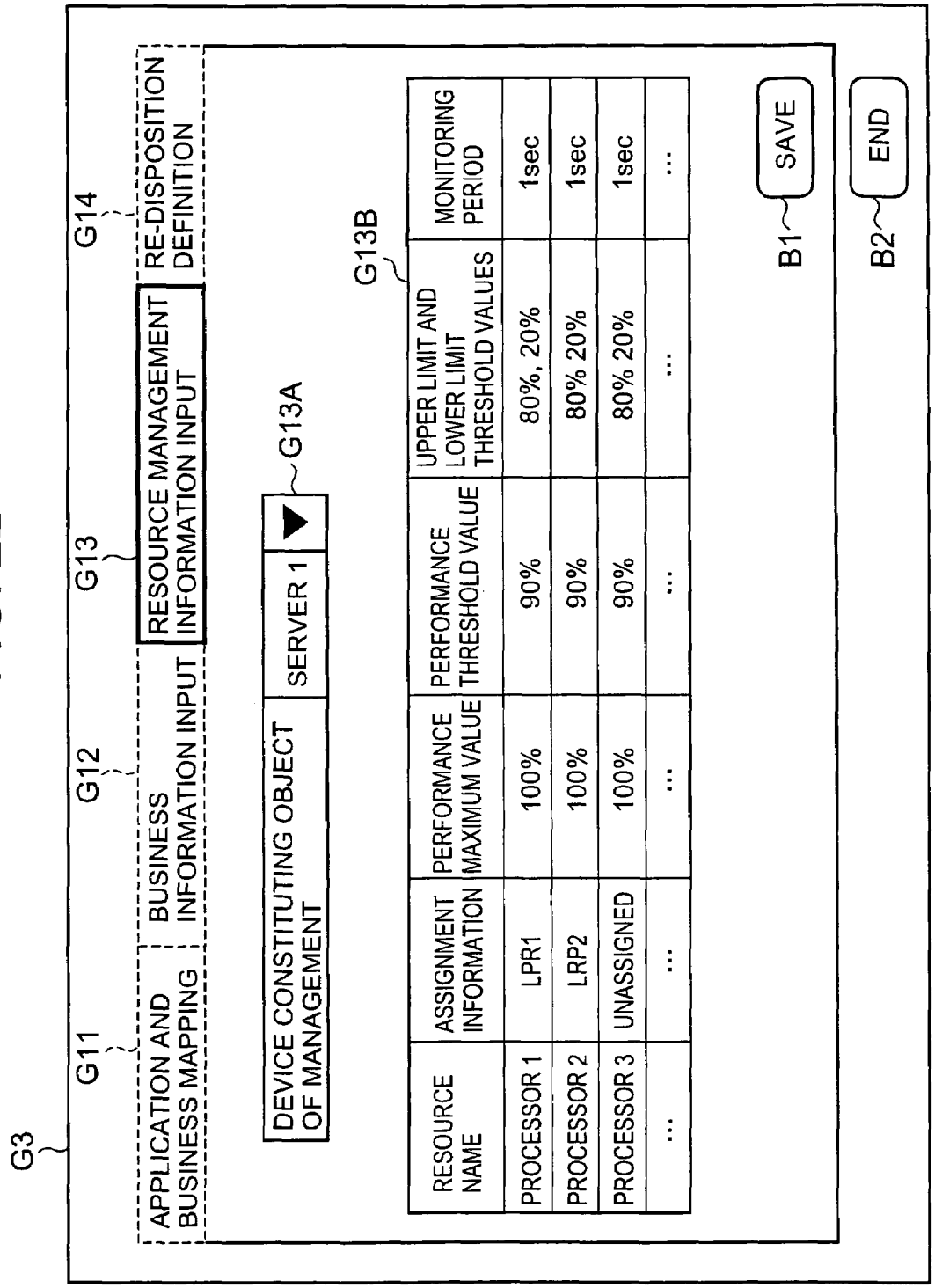
FIG. 22 is an explanatory diagram showing the screen on which resource management information is input.

FIG. 22 is an explanatory diagram showing the screen G3 that is used to input resource management information. When the user operates the tab menu G13, this screen G3 is displayed. For example, the screen G3 may include a selection column G13A used to select the device that is the object of management, and a setting column G13B used to set threshold values and the like. Via the selection column G13A, the user selects one of the devices constituting the object of management. As a result, a list of resources belonging to the selected device is displayed in the setting column G13B. For each of the resources thus displayed, the user can respectively set the logically divided server 11 to which the resource is assigned (assignment information), the performance threshold value, the upper limit threshold value, the lower limit threshold value, and the monitoring period.

Figure 23:
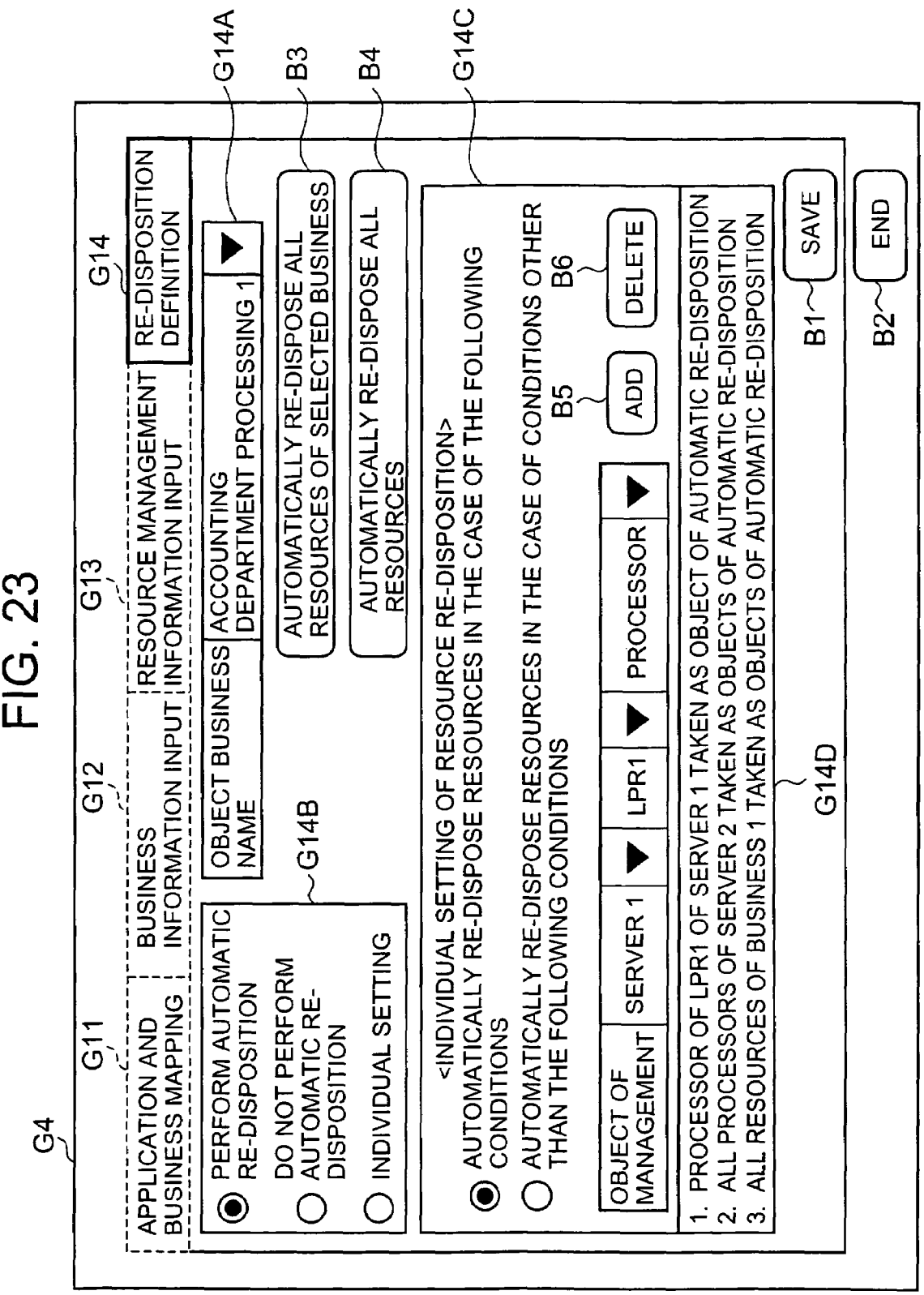
FIG. 23 is an explanatory diagram showing the screen on which re-disposition conditions are input.

FIG. 23 is an explanatory diagram showing the screen G4 for defining the re-disposition conditions. When the user operates the tab menu G14, the screen G4 is displayed on the managing terminal 40. For example, the screen G4 may include a selection column G14A that is used to select the business name that is the object of management, a selection column G14B that is used to select the re-disposition policy, a setting column G14C that is used to perform custom definitions, a display column G14D that is used to display the concrete contents of custom definitions, a store button B1, an end button B2, a button B3 that is use to perform automatic re-disposition of the selected resource, a button B4 that is used to perform automatic re-disposition of all of the resources, an add button B5, and a delete button B6.

The user can select the object business name via the selection column G14A. The user can select one of the re-disposition policies to be applied to the selected business via the selection column G14B. In cases where a custom definition is performed, the user can separately set the conditions for re-disposition for each resource of each device via the setting column G14C. In cases where conditions for a custom definition are to be additionally registered, the user operates the add button B5. In cases where registered custom definition conditions are to be deleted, the user operates the delete button B6. When the user operates the store button B1, the content that is input into the screen G4 is reflected in the re-disposition definition table D41.

By operating the button B3, the user can cause the automatic re-disposition of all of the resources relating to the business selected in the selection column G14A. Specifically, an automatic re-disposition can be caused to take place with all of the resources utilized by the application programs 101 associated with the selected business taken as resources that are the object of re-disposition. Furthermore, by operating the button B4, the user can also cause the automatic re-disposition of all of the resources within the storage system.

Figure 24:
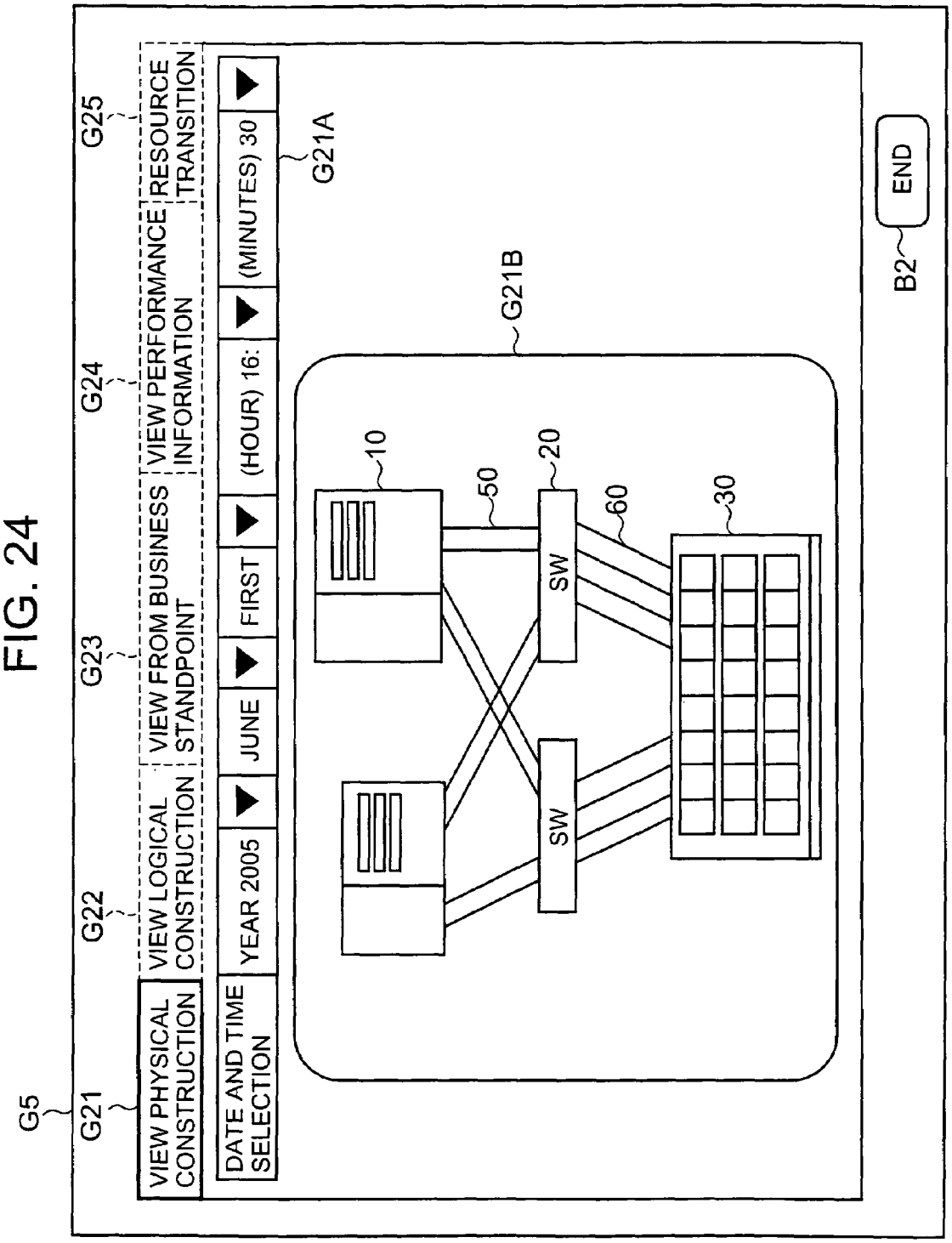
FIG. 24 is an explanatory diagram showing the screen that displays the physical construction of the storage system.

Next, the output screens that are provided to the user will be described. FIG. 24 is an explanatory diagram showing the screen G5 that displays the physical construction of the storage system. This screen G5 is displayed when the user operates the tab menu G21. For example, the screen G5 may include a selection column G21A that is used to select the date and time, and a display column G21B. The user can selected the desired date and time via the selection column G21A. The physical construction of the storage system at the selected date and time is displayed in the display column G21B.

Figure 25:
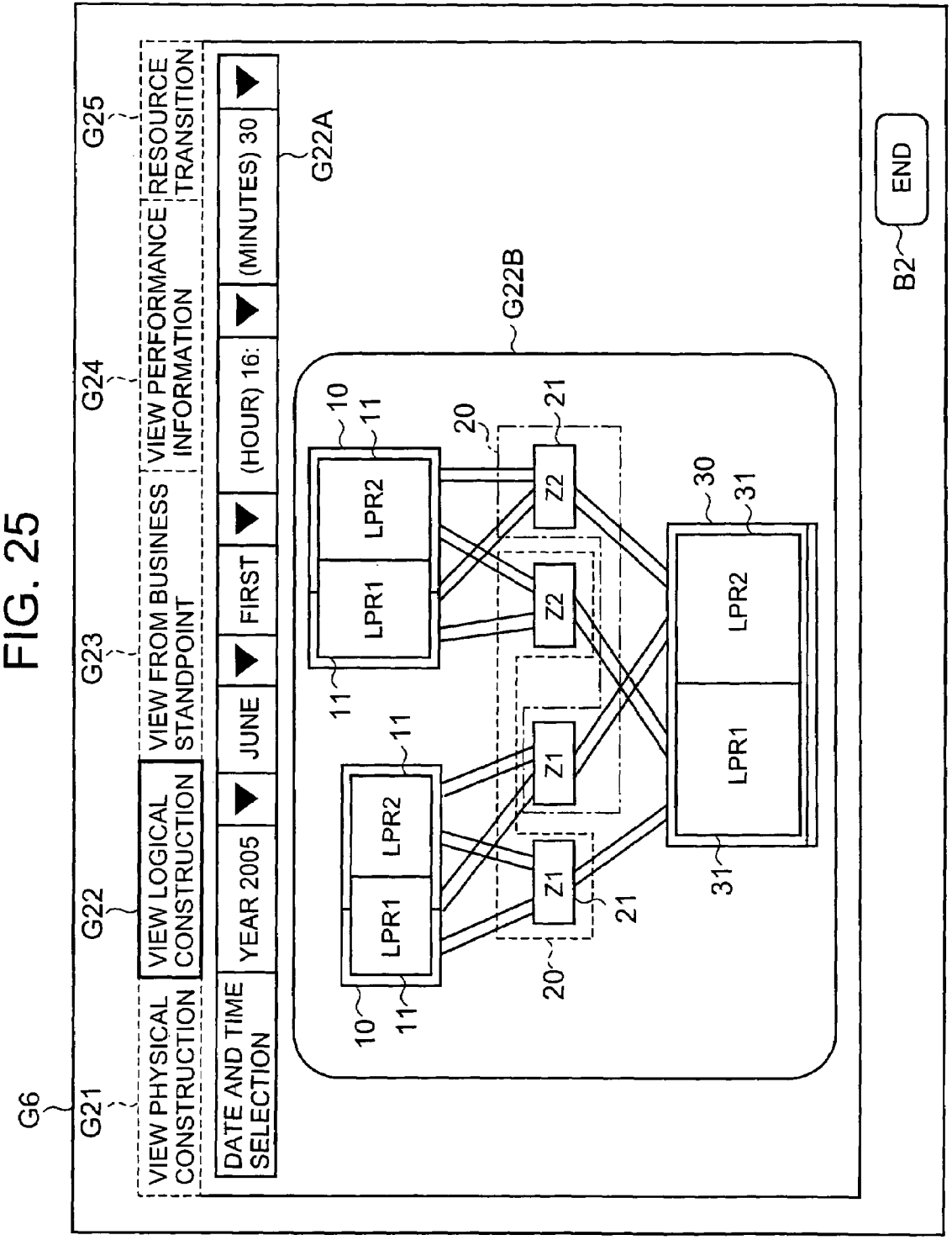
FIG. 25 is an explanatory diagram showing the screen that displays the logical construction of the storage system.

FIG. 25 is an explanatory diagram showing the screen G6 that is used to display the logical construction of the storage system. The screen G6 is displayed when the user operates the tab menu G22. For example, this screen G6 may include a selection column G22A that is used to select the date and time, and a display column G22B. The user can select the desired date and time via the selection column G22A. As a result, the logical construction of the storage system at the selected date and time is displayed in the display column G22B. The term "logical construction" refers to the connection relationship of the respective logically divided units (LPRs) and the like.

Figure 26:
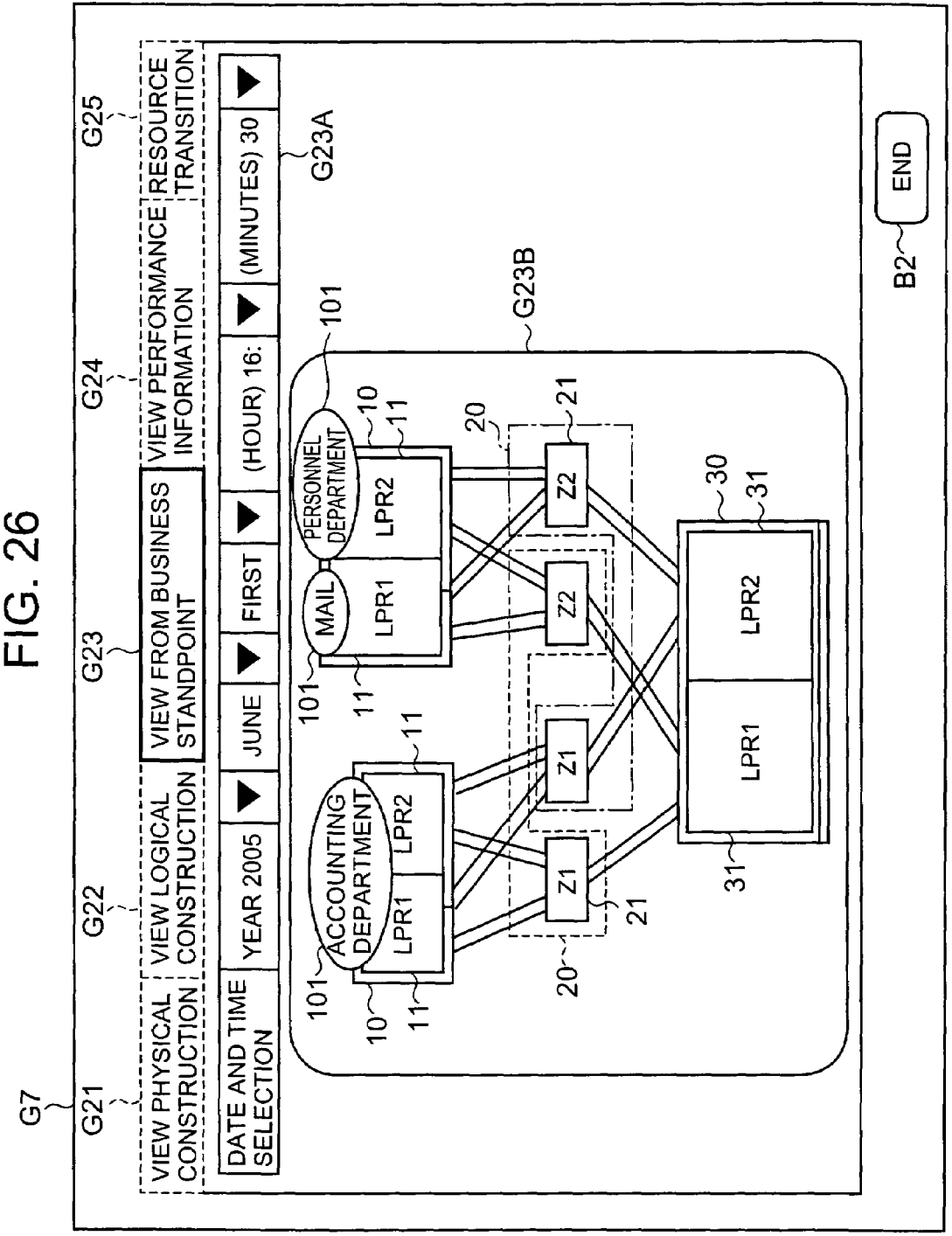
FIG. 26 is an explanatory diagram showing the screen that displays the logical construction of the storage system from the viewpoints of the respective application programs.

FIG. 26 shows the screen G7 that displays the construction in a case where the storage system is viewed from the viewpoint of the application program (viewpoint of the business). This screen G7 is displayed when the user operates the tab menu G23. For example, the screen G7 may include a selection column G23A that is used to select the date and time, and a display column G23B. The business names of the application programs utilizing the logically divided units are displayed in association in the display column G23B. Accordingly, the user can easily understand which application programs are utilizing which LPRs.

Figure 27:
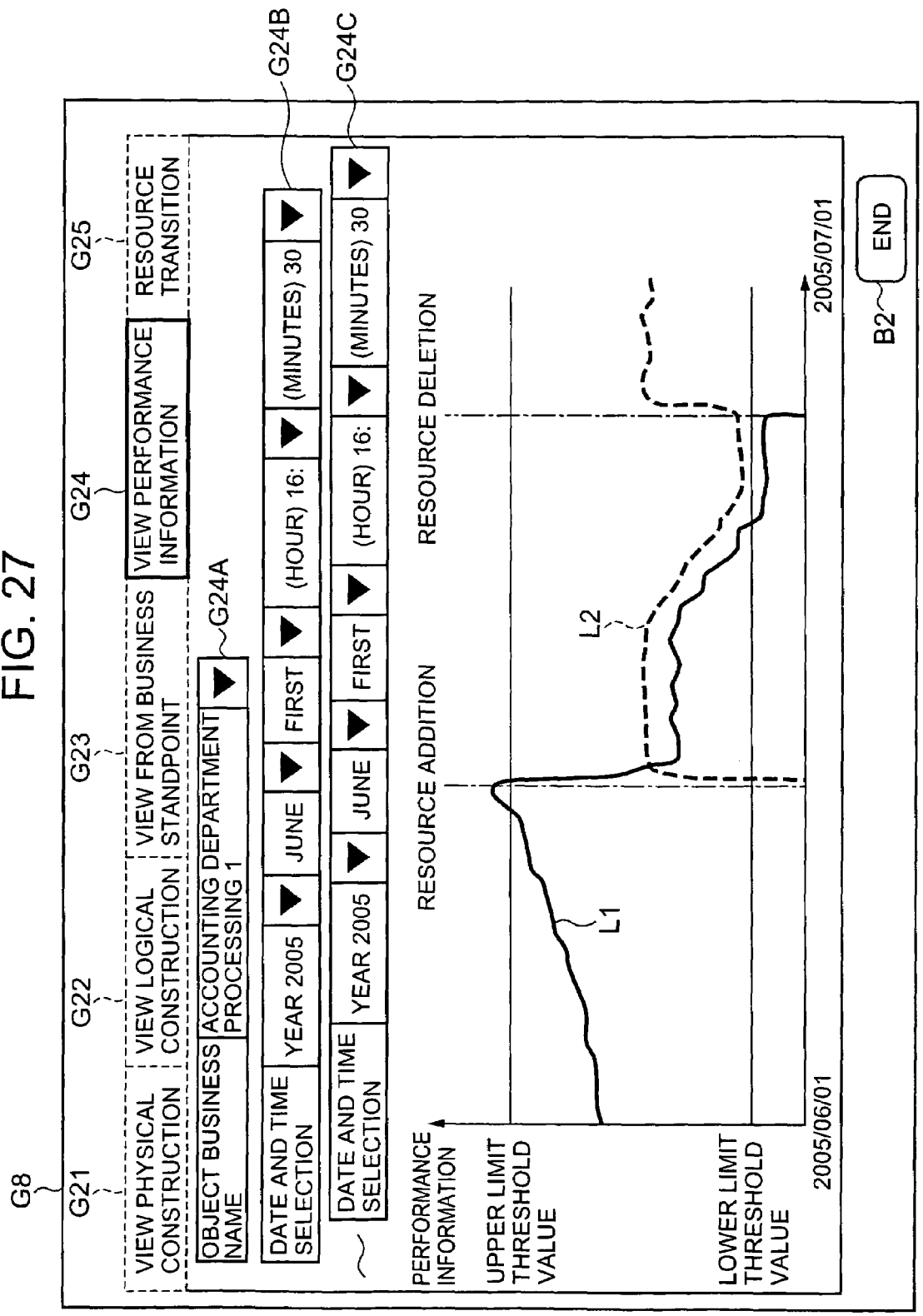
FIG. 27 is an explanatory diagram showing the screen that displays the trend of the resource load state for each application program.

FIG. 27 is an explanatory diagram showing the screen G8 that used to display transitions in the performance information. This screen G8 is displayed when the user operates the tab menu G24. For example, the screen G8 may include a selection column G24A that is used to select object business names, a selection column G24B that is used to select the starting date and time, and a selection column G24C that is used to select the ending date and time. Furthermore, the lower part of the screen G8 is a display column; changes in the performance information over time are graphically displayed here.

The user selects object business names via the selection column G24A. Furthermore, the user respectively selects the starting time and ending time for the display of the history of the performance information via the respective selection columns G24B and G24C. As a result, changes over time in the performance information for resources relating to the selected business are graphically displayed on the screen G8.

In FIG. 27, for convenience of description, a curve graph is displayed for one resource. However, it would also be possible to display respective curve graphs for respective resources. In this case, the line types or display colors may be varied for respective resources. Furthermore, corresponding resource names may be displayed in the vicinity of respective curve graphs. Instead of this, it would also be possible to provide a selection column for selecting one or a plurality of resources, and to devise the system so that only curve graphs for selected resources are displayed.

These graphs will be further described. Variations over time in the performance information for one resource are indicated by a solid line graph L1. When the load on this resource increases and reaches the upper limit threshold value, the resource disposition is revised for the business relating to this resource. As a result, resources of the same type are newly added. Variations over time in the performance information for these added resources are indicated by a dotted line graph L2. As a result of the addition of new resources, the load on the original resource decreases. Furthermore, when the load on the original resource decreases and reaches the lower limit threshold value, this resource is deleted, and is returned to the unused pool. Specifically, the status of resources whose assignment has been canceled is "unused". As a result, the load on the remaining resources increases (L2).

Figure 28:
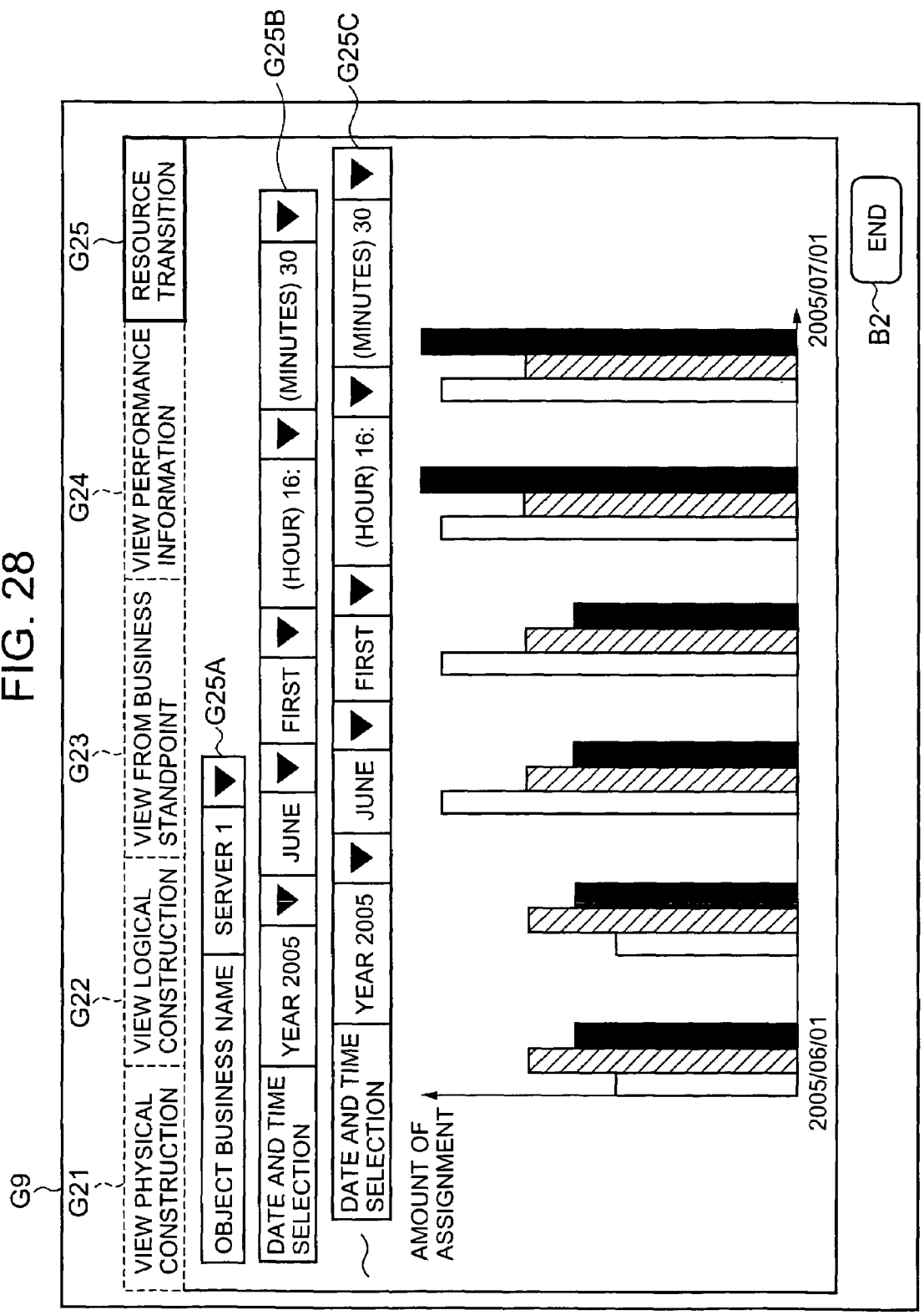
FIG. 28 is an explanatory diagram showing the screen that displays the trend of the resource construction for each device that is the object of management.

FIG. 28 is an explanatory diagram showing the screen G9 that is used to display transitions of the resources. This screen G9 is displayed when the user operates the tab menu G25. For example, the tab menu G9 may include a selection column G25A used to select the object device, a selection column G25B used to select the starting time of the history display, and a selection column G25C used to select the ending time of the history display. Furthermore, the lower part of the screen G9 constitutes a display column, and changes over time in the assignment state of the resources are displayed here in the form of a bar graph or the like. In this screen G9, a history indicating which resources have been assigned (and the extent to which these resources have been assigned) to the respective logically divided units (LPRs) is displayed. In the figures, for convenience of description, transitions in the resource assignment for a single logically divided unit are shown. Instead of this, it would also be possible to simultaneously display transitions in resource assignment for all of the logically divided units present in the device, or to perform a display for selected logically divided units only. In the figures, bar graphs with respectively varied shapes or display colors are displayed for each of the respective types of resources assigned to a single logically divided unit.

Figure 29:
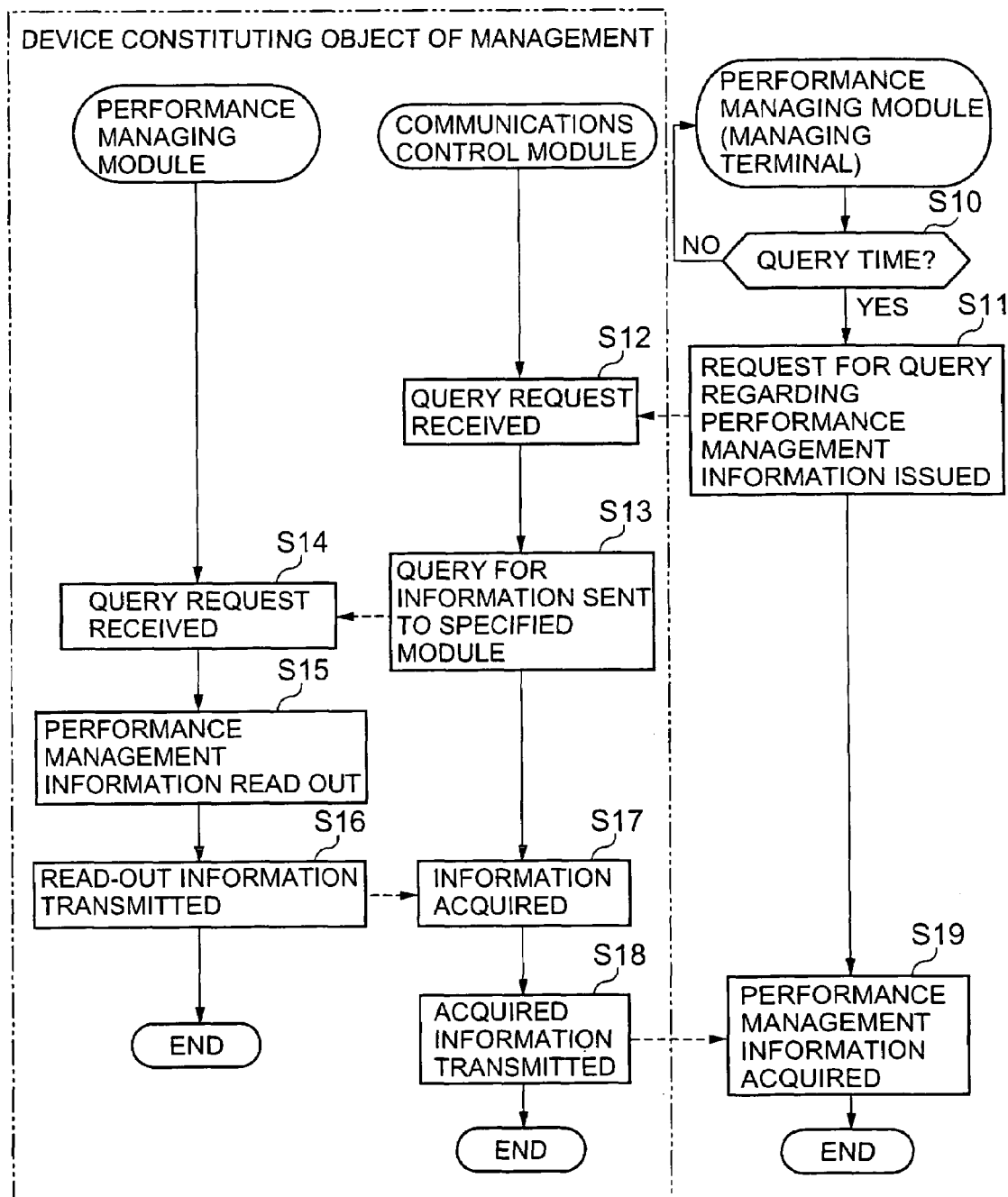
FIG. 29 is a flow chart showing the processing that collects performance management information from the respective devices.

Next, the respective types of processing used to dynamically alter the construction of the storage system will be described. FIG. 29 is a flow chart showing the processing that is used by the managing terminal 40 to acquire and manage performance management information from the respective devices that are the object of management. Furthermore, the respective flow charts shown below are similar; however, each of these flow charts shows an outline of the operation, and differs from the actual program.

The performance managing module 412 of the managing terminal 40 ascertains whether or not the query time for performance information has arrived (S10); in cases where this query time has arrived (S10): YES), the managing terminal 40 queries the respective devices that are the object of management for performance management information (S11). When the communications control module of a device that is the object of management receives a query request from the managing terminal 40 (S12), this communications control module informs a specified module, i.e., the performance managing module, of this query request (S13). When the performance managing module receives a query request (S14), the performance managing module reads out performance management information (S15), and transmits this performance management information that has been read out to the communications control module (S16).

When the communications control module receives this performance management information (S17), the communications control module transmits this performance management information to the managing terminal 40 (S18). The managing terminal 40 acquires and stores the performance management information (S19). The above processing can be performed in parallel between the managing terminal 40 and the respective servers 10, respective switches 20 and respective storage devices 30. Alternatively, a construction in which performance management information is acquired in stages may be used, so that after performance management information has been acquired from the respective servers 10, performance management information is acquired from the respective switches 20, and performance management information is then finally acquired from the respective storage devices 30.

Figure 30:
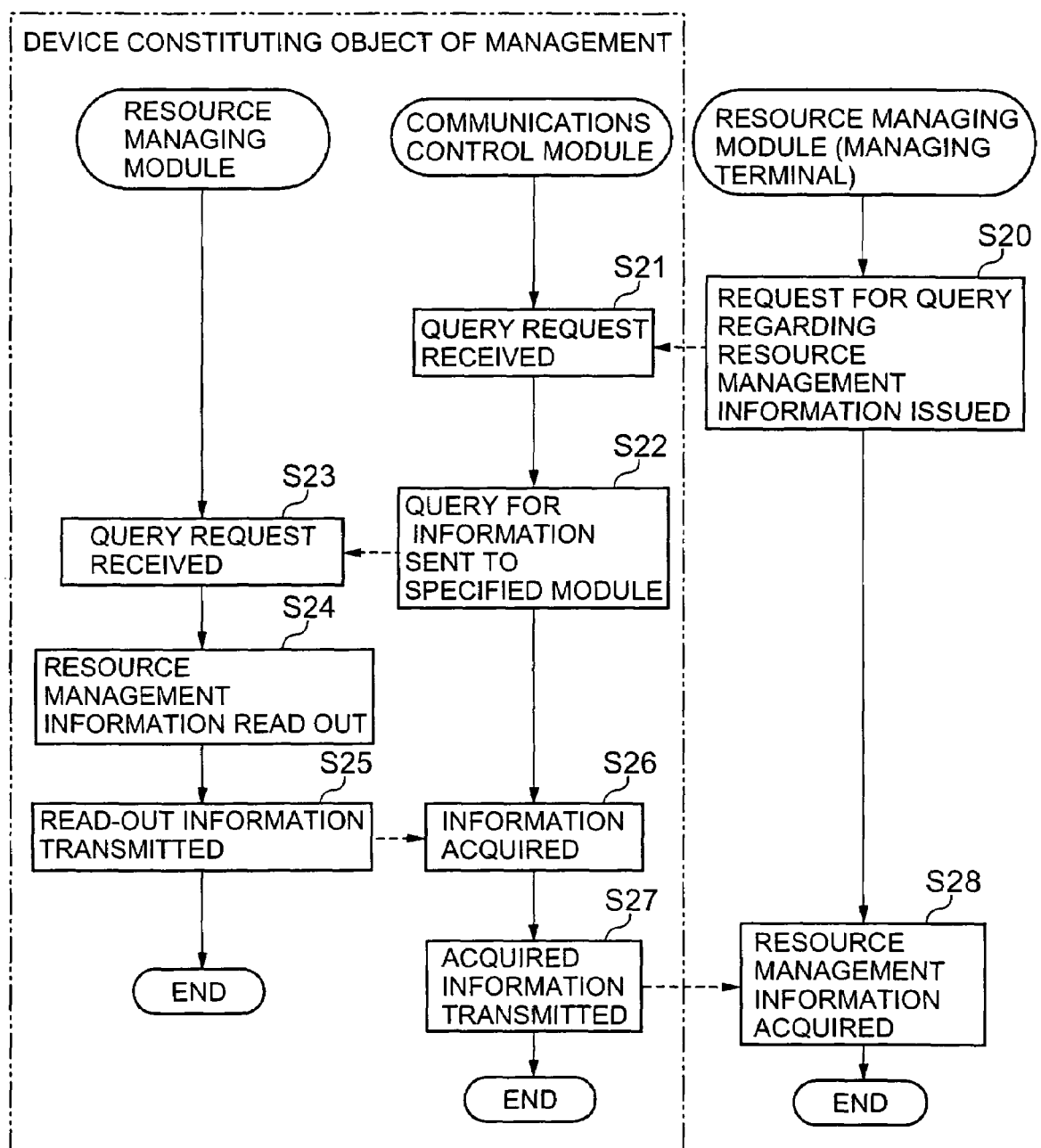
FIG. 30 is a flow chart showing the processing that collects resource management information from the respective devices.

FIG. 30 is a flow chart showing the processing that is performed by the managing terminal 40 in order to acquire resource management information from the respective devices that are the object of management. The resource managing module 414 of the managing terminal 40 respectively requests the transmission of resource management information from the respective devices that are the object of management (S20). When the communications control module of a device that is the object of management receives such a query request (S21), this communications control module request the transmission of resource management information from a specified module, i.e., the resource managing module (S22). When the resource managing module receives this request (S23), the resource managing module reads out the resource management information (S24), and transmits this resource management information to the communications control module (S25). When the communications control module receives the resource management information (S26), the communications control module transmits this information to the managing terminal 40 (S27). The managing terminal 40 respectively receives the resource management information transmitted from the respective devices that are the object of management, and stores this resource management information (S28).

Figure 31:
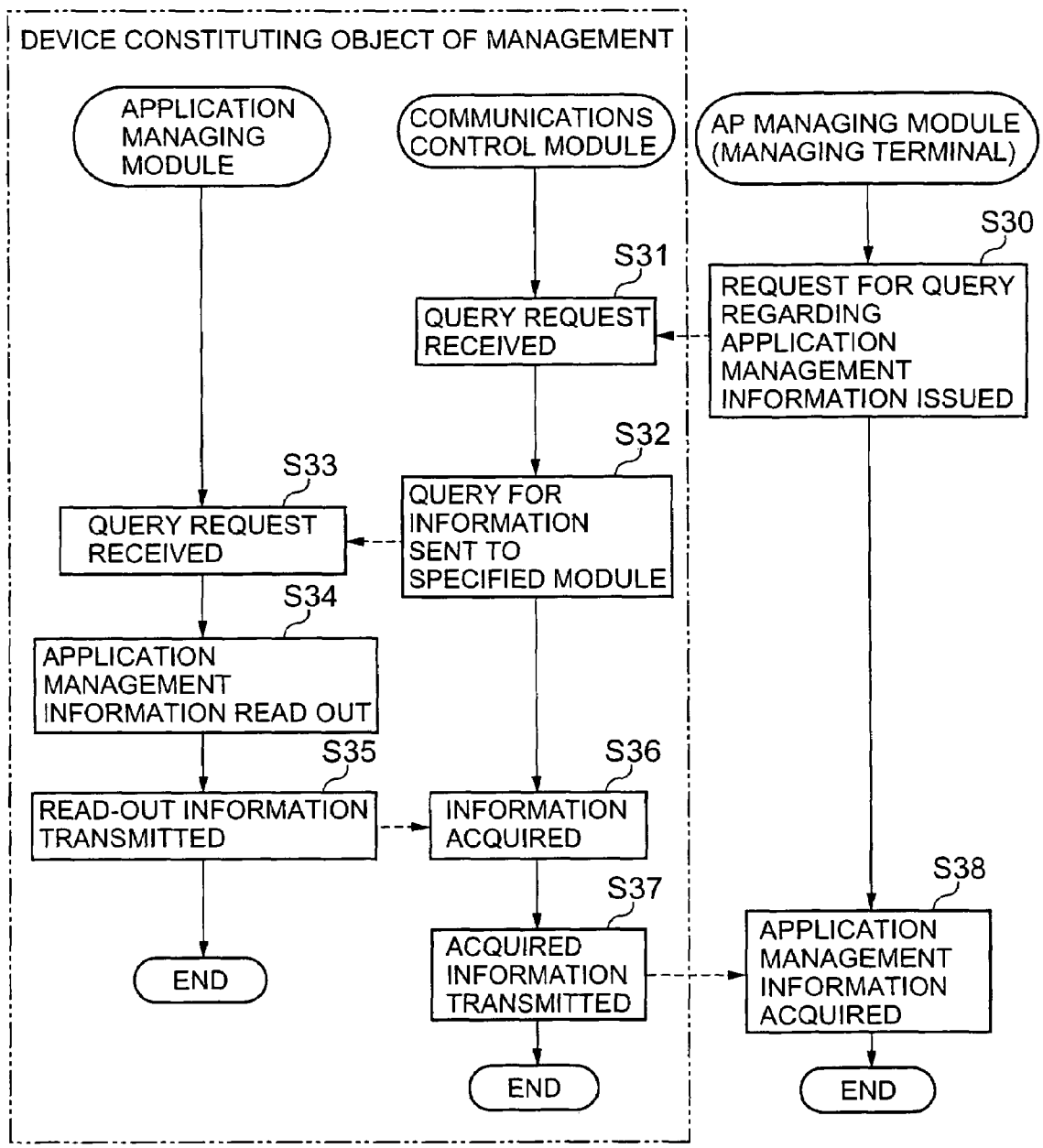
FIG. 31 is a flow chart showing the processing that collects application management information from the respective devices.

FIG. 31 is a flow chart showing the processing that is performed by the managing terminal 40 in order to acquire application management information from the respective servers 10. The application managing module 413 of the managing terminal 40 queries the respective servers 10 for application management information (S30). When the communications control module 115 of each server 10 receives a request from the managing terminal 40 (S31), the communications control module 115 requests the transmission of application management information from the application managing module 113 (S32). When the application managing module 113 receives this request (S33), the application managing module 113 reads out the application management information D13 (S34), and transmits this information to the communications control module 115 (S35). When the communications control module 115 receives the application management information D13 (S36), the communications control module 115 transmits this information to the managing terminal 40 (S37). The application managing module 413 of the managing terminal 40 receives the application management information D13, and stores this information in memory (S38).

Figure 32:
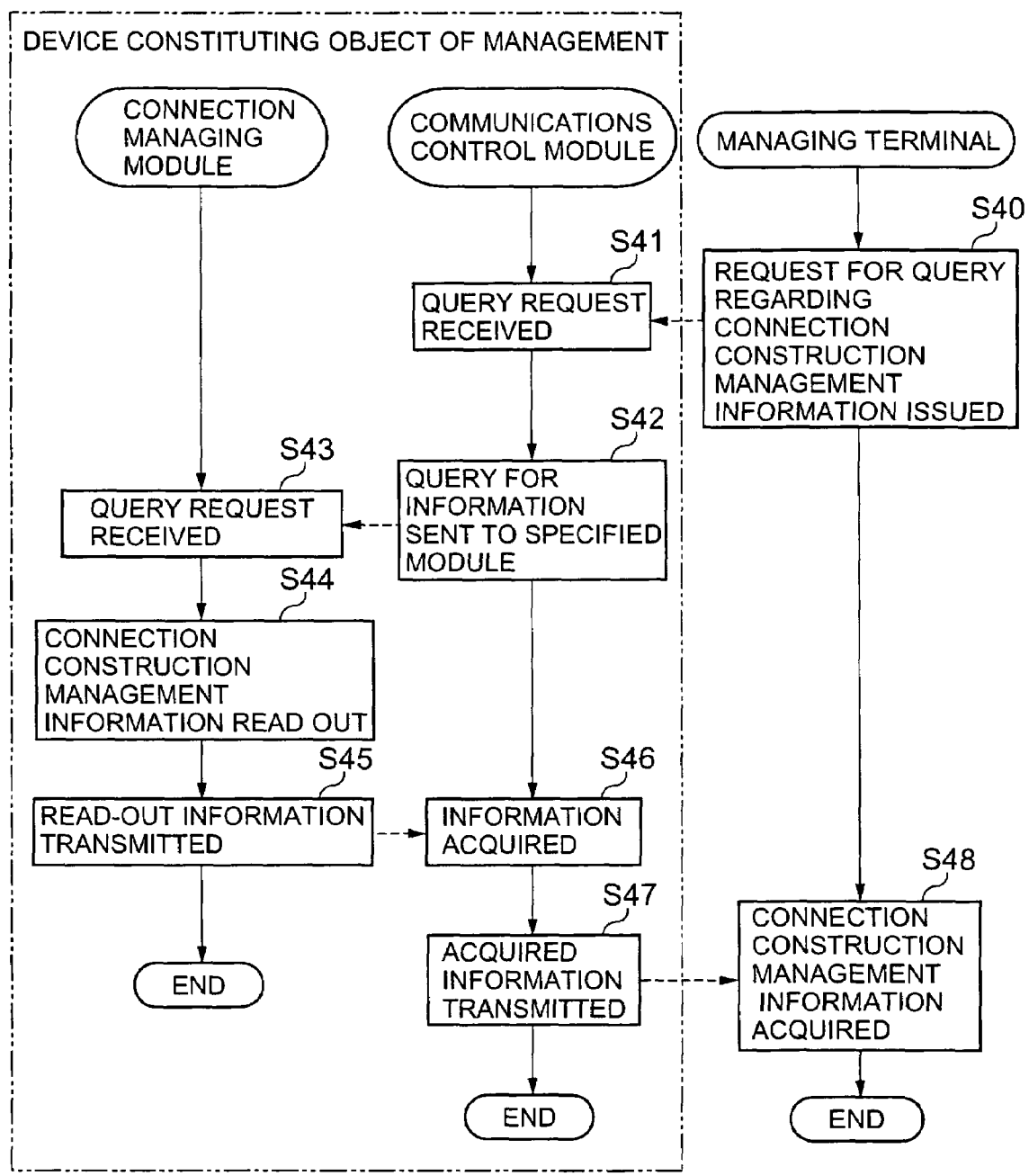
FIG. 32 is a flow chart showing the processing that collects connection construction management information from the respective devices.

FIG. 32 is a flow chart showing the processing that is performed by the managing terminal 40 in order to acquire connection construction management information from the respective devices that are the object of management. The connection managing module 415 of the managing terminal 40 respectively queries the respective devices that are the object of management for connection construction information (S40). When the communications control module of a device that is the object of management receives such a query request (S41), this communications control module requests the transmission of connection construction management information from the connection managing module (S42). When the connection managing module receives this request (S43), the connection managing module reads out the connection construction management information (S44), and transmits this information to the communications control module (S45). When the communications control module receives this connection construction management information (S46), the communications control module transmits this information to the managing terminal 40 (S47). The managing terminal 40 respectively receives connection construction management information from the respective devices that are the object of management, and stores this information in memory (S48).

Figure 33:
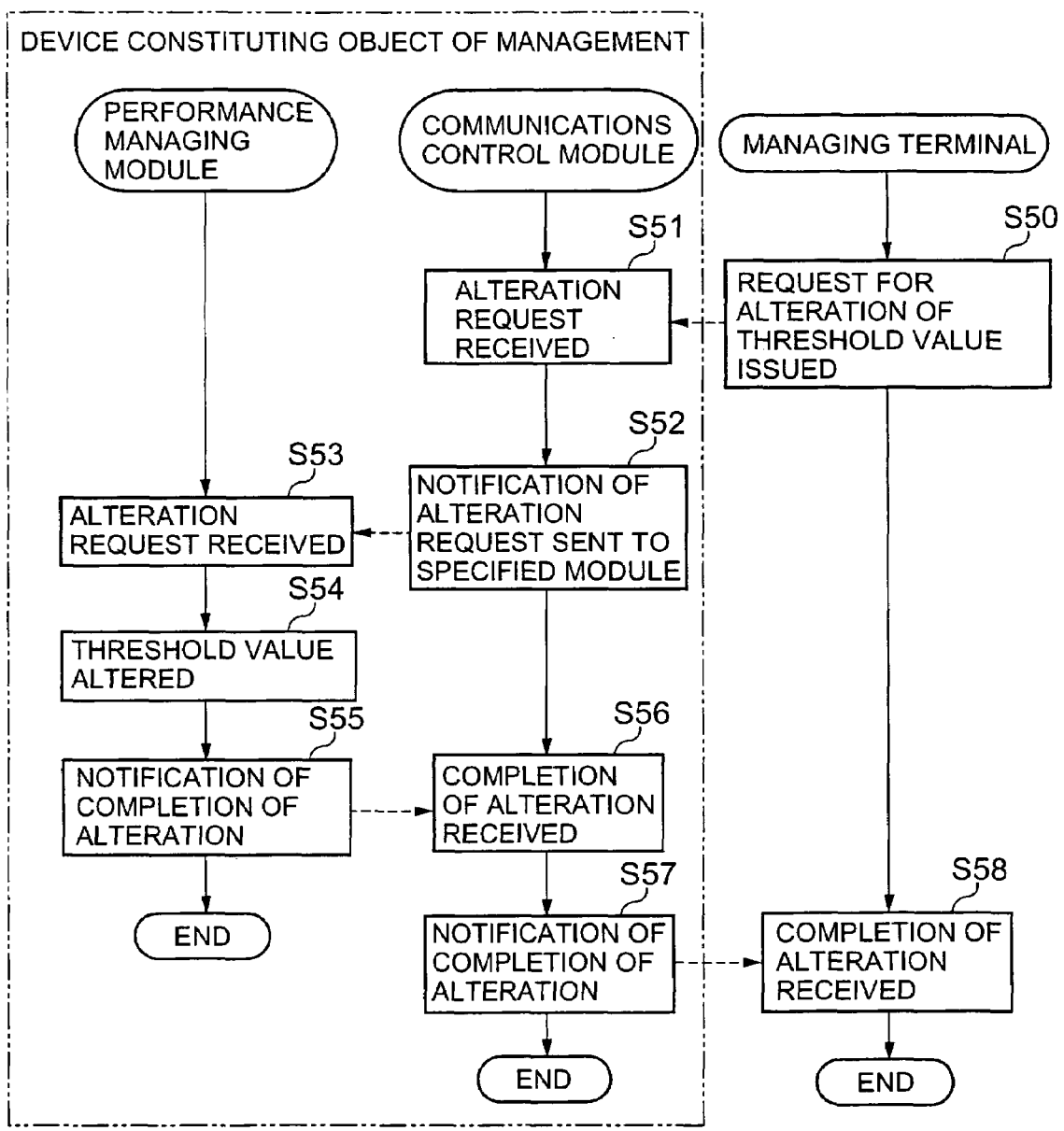
FIG. 33 is a flow chart showing the processing that alters the threshold value for the respective devices.

FIG. 33 is a flow chart showing the processing whereby the managing terminal 40 causes the devices that are the object of management to alter threshold values relating to performance information. The managing terminal 40 sends a request for the alteration of a threshold value to a device that is the object of management (S50). When the communications control module of this device that is the object of management receives this threshold value alteration request (S51), the communications control module notifies a specified module, i.e., the performance managing module in this case, of this alteration request (S52). When the performance managing module receives the alteration request (S53), the performance managing module alters the threshold value that is stored in the performance management information (S54), and notifies the communications control module that the alteration of the threshold value has been completed (S55). When the communications control module receives this alteration completion notification (S56), the communications control module reports this to the managing terminal 40 (S57). When the managing terminal 40 receives this alteration completion notification, the managing terminal 40 confirms that the alteration of the threshold value has been completed in a normal manner (S58).

Figure 34:
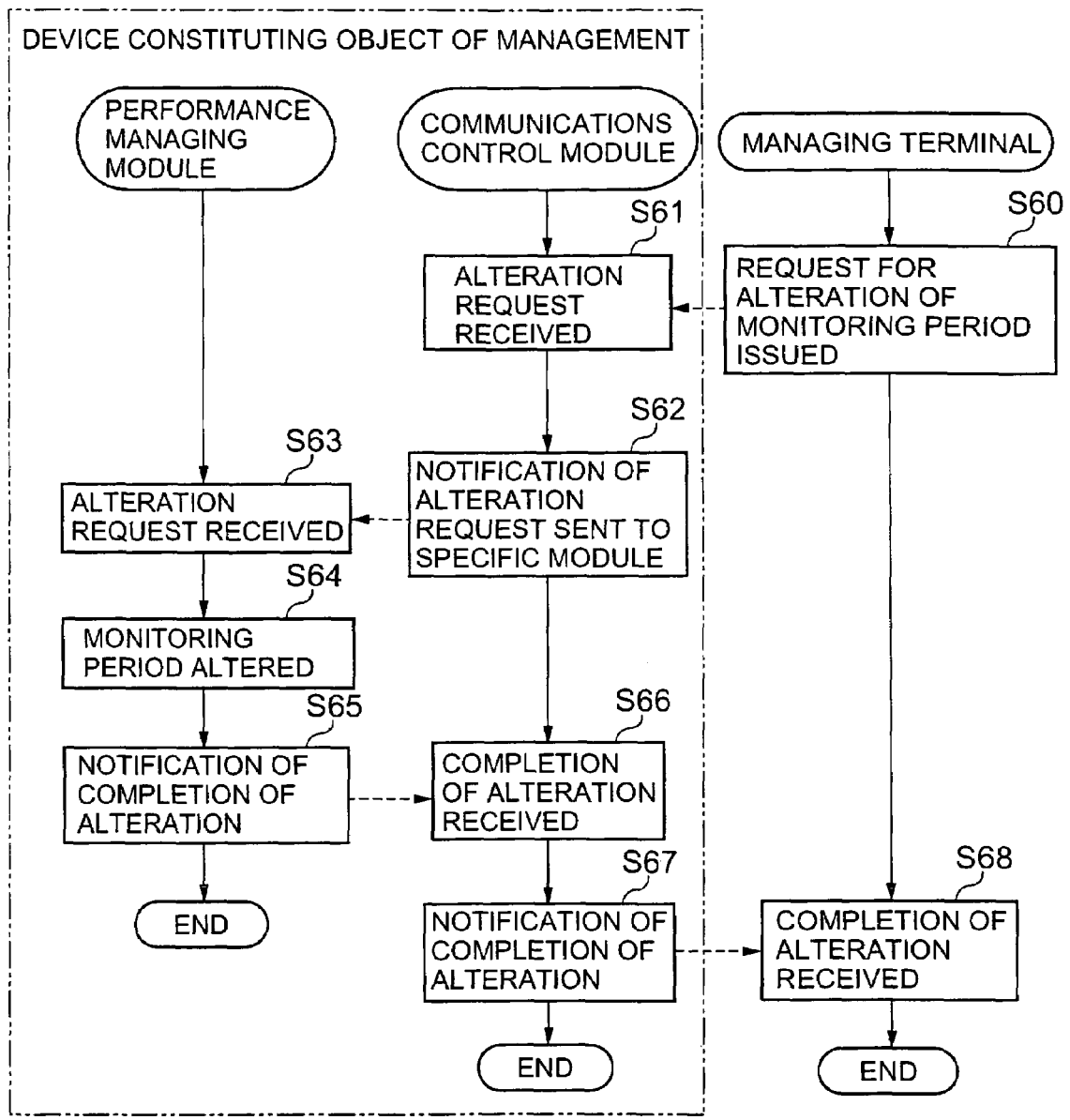
FIG. 34 is a flow chart showing the processing that alters the monitoring period for the respective devices.

FIG. 34 is a flow chart showing the processing whereby the managing terminal 40 causes the devices that are the object of management to alter the monitoring period of the performance information. The managing terminal 40 sends a request for the alteration of the monitoring period to a device that is the object of management (S60). When the communications control module of this device that is the object of management receives this request for the alteration of the monitoring period (S61), the communications control module sends a request to alter the monitoring period to a specified module, i.e., the performance managing module (S62). When the performance managing module receives this alteration request (S63), the performance managing module alters the monitoring period that is stored in the performance management information (S64), and notifies the communications control module that this alteration has been completed (S65).

When the communications control module receives this alteration completion notification (S66), the communications control module transmits this notification to the managing terminal 40 (S67). The managing terminal 40 receives the alteration completion notification from the device that is the object of management, and confirms that the alteration of the monitoring period has been completed in a normal manner (S68).

Figure 35:
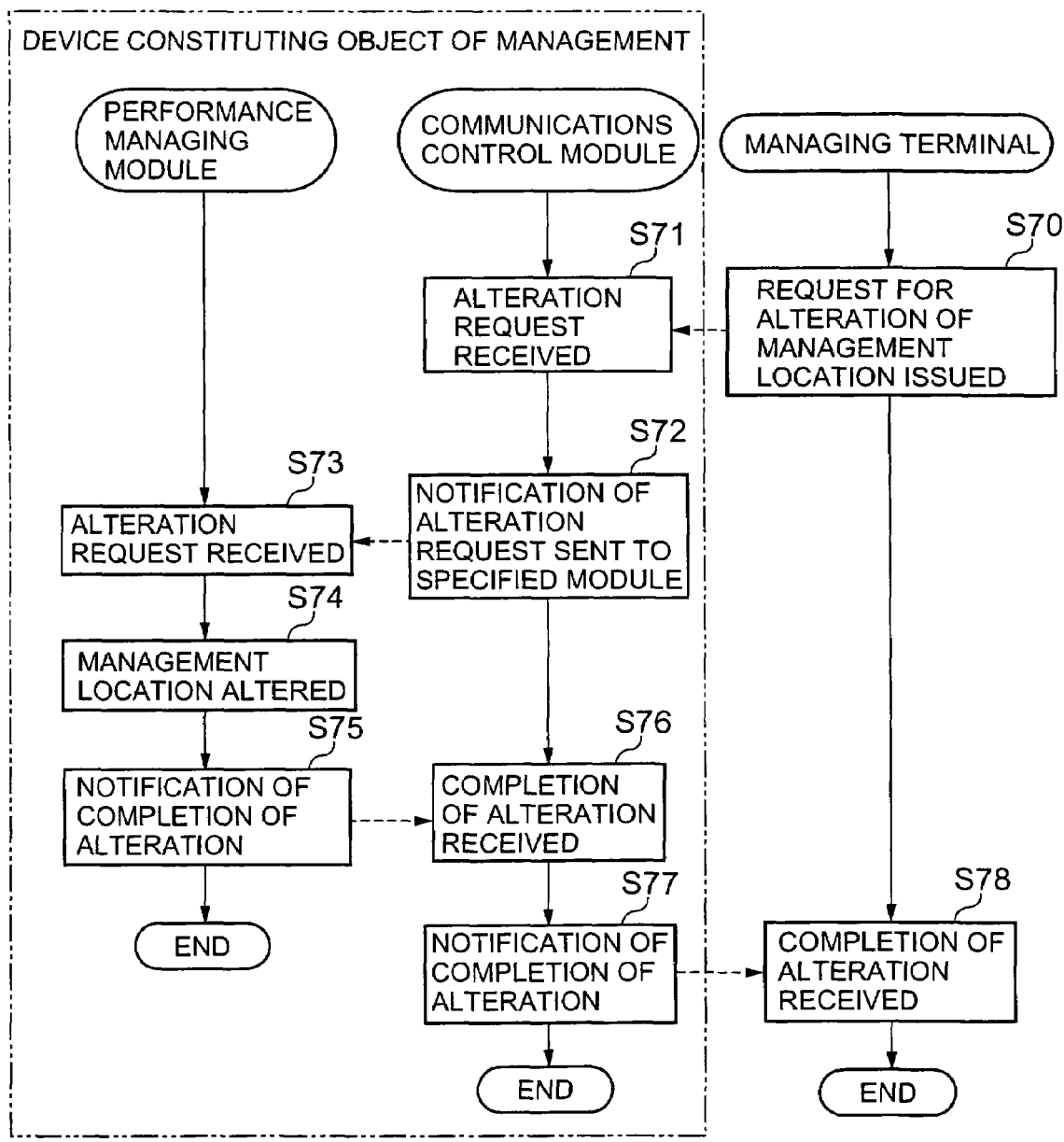
FIG. 35 is a flow chart showing the processing that alters the management area for the respective devices.

FIG. 35 is a flow chart showing the processing that is performed by the managing terminal in order to request an alteration of the management location from a device that is the object of management. The managing terminal 40 requests the alteration of the management location (S70). For example, in cases where the physical construction of the device that is the object of management changes, as in cases where additional memory is installed, cases where disk drives are removed or the like, the managing terminal 40 requests the alteration of the management location. When the communications control module of this device that is the object of management receives an alteration request (S71), this communications control module sends a request for such an alteration to the performance managing module (S72). When the performance managing module receives an alteration request (S73), the performance managing module alters the management location stored in the performance management information (S74), and notifies the communications control module that this alteration has been completed (S75). When the communications control module receives this alteration completion notification (S76), the communications control module notifies the managing terminal 40 of the completion of this alteration (S77). When the managing terminal 40 receives this alteration completion notification (S78), the managing terminal 40 confirms that the alteration of the management location has been completed in a normal manner (S79).

Figure 36:
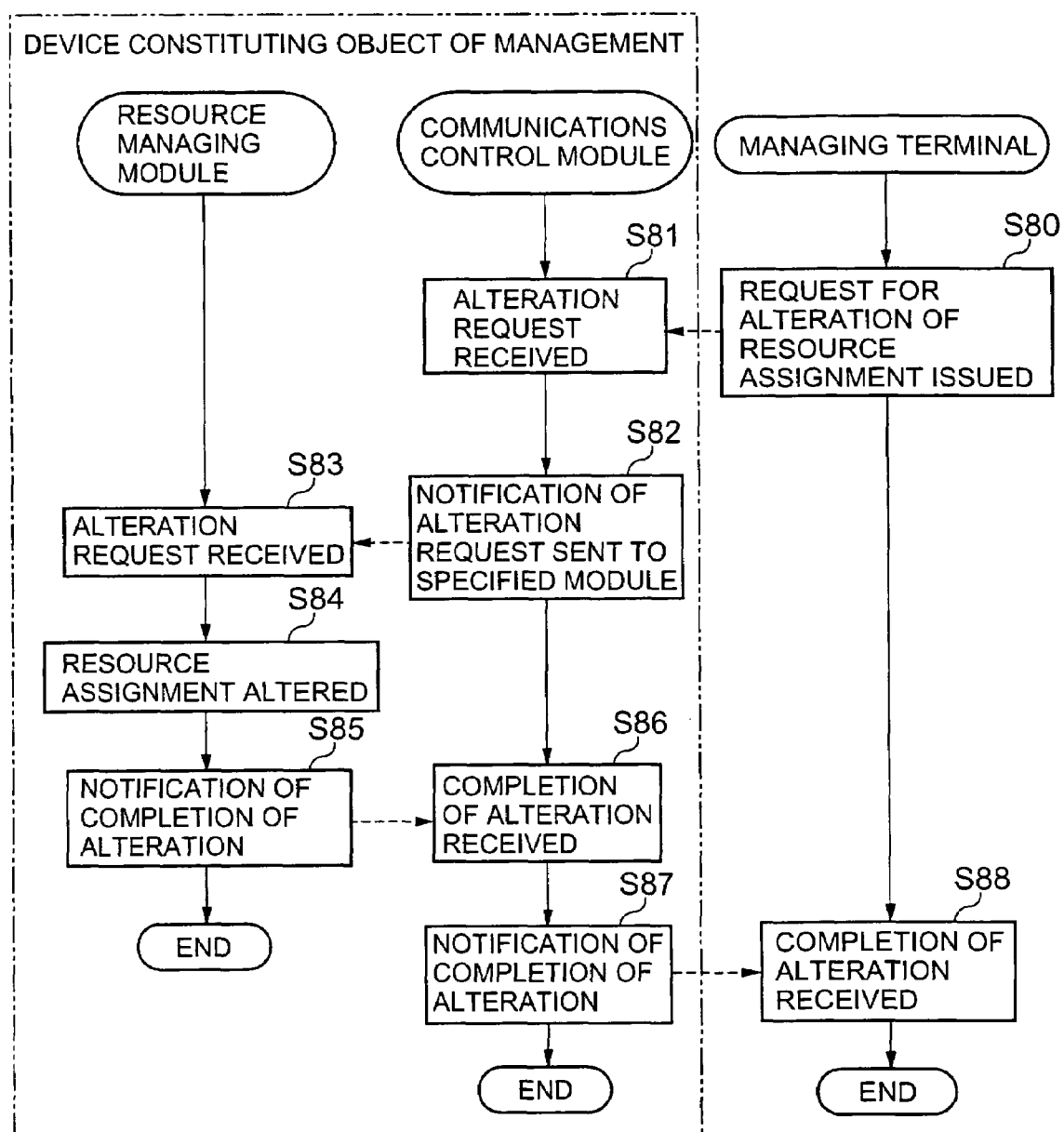
FIG. 36 is a flow chart showing the processing that alters resource assignment for the respective devices.

FIG. 36 is a flow chart showing the processing whereby the managing terminal 40 requests an alteration of resource assignment from a device that is the object of management. In cases where the assignment destinations of resources are to be altered, the managing terminal 40 issues an alteration request (S80). When the communications control module of the device that is the object of management receives this alteration request (S81), the communications control module sends a request for resource assignment alteration to a specified module, i.e., the resource managing module (S82). When the resource managing module receives this alteration request (S83), the resource managing module alters the information relating to assignment destinations that is stored in the resource management information (S84), and notifies the communications control module that this alteration has been completed (S85). When the communications control module receives this alteration completion notification (S86), the communications control module reports the completion of this alteration to the managing terminal 40 (S87). The managing terminal 40 receives this alteration completion notification (S88), and confirms that the resource assignment has been altered in a normal manner (S89).

Figure 37:
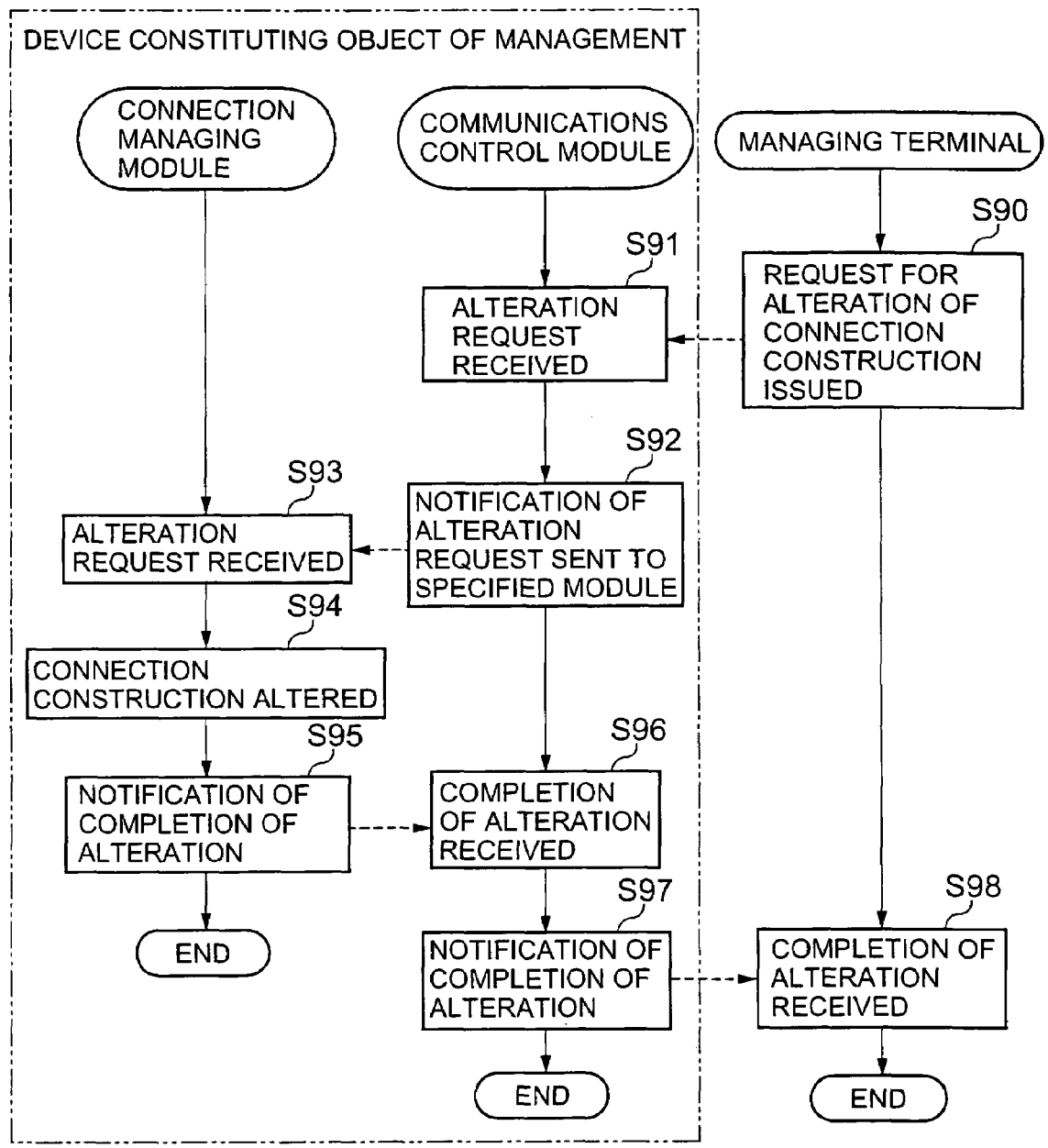
FIG. 37 is a flow chart showing the processing that alters the connection construction for the respective devices.

FIG. 37 is a flow chart showing the processing whereby the managing terminal 40 requests an alteration of the connection construction from a device that is the object of management. In cases where the construction of a path is to be change, the managing terminal 40 requests a connection construction alteration (S90). When the communications control module of the device that is the object of management receives this alteration request (S91), the communications control module requests a connection construction alteration from the connection managing module (S92). When the connection managing module receives this alteration request (S93), the connection managing module alters the connection construction by rewriting the content stored in the connection construction management information (S94), and notifies the communications control module that the alteration has been completed (S95). When the communications control module receives this alteration completion notification (S96), the communications control module notifies the managing terminal 40 of this (S97). The managing terminal 40 receives this alteration completion notification (S98), and confirms that this alteration of the connection construction has bee completed in a normal manner.

Figure 38:
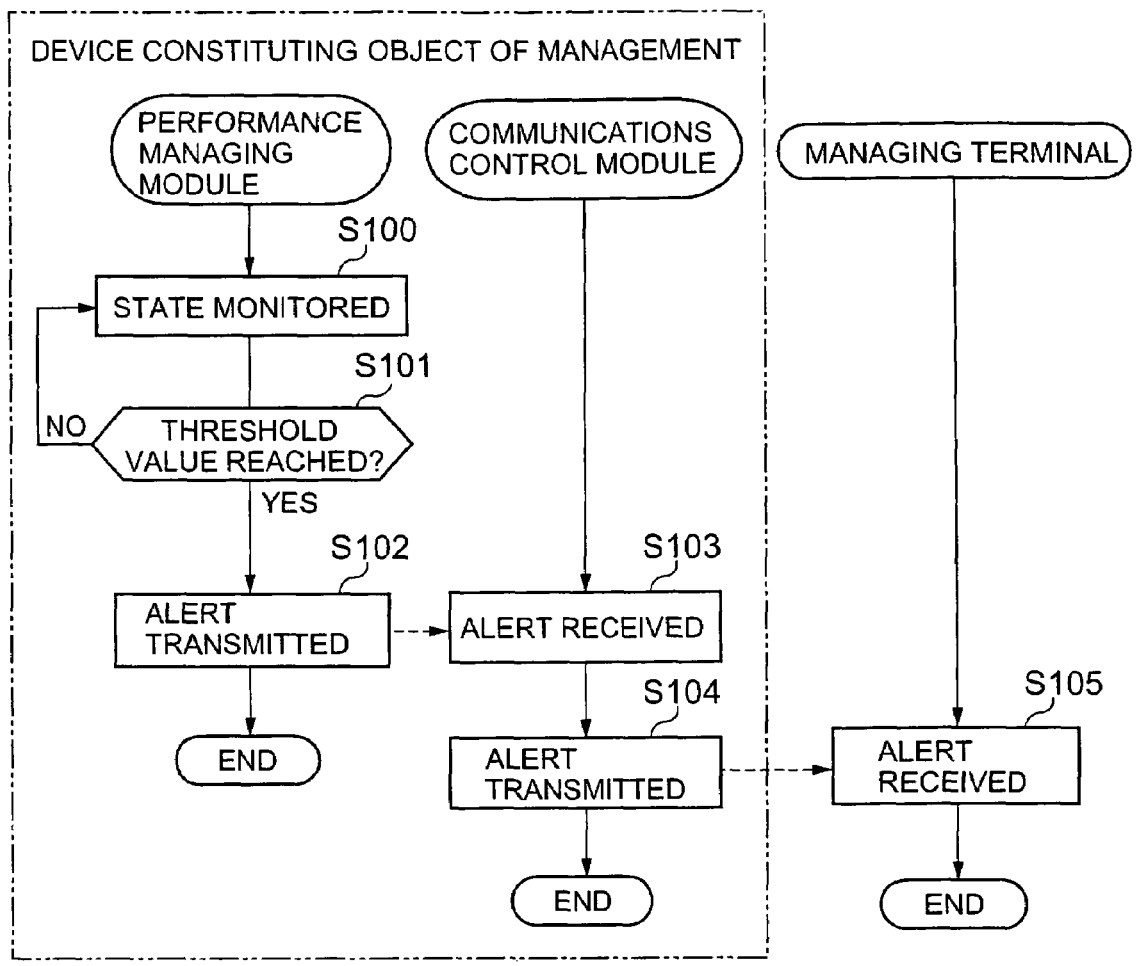
FIG. 38 is a flow chart showing the processing that receives alerts from the respective devices.

FIG. 38 is a flow chart showing the processing that warns the managing terminal 40 in cases where resources belonging to a device that is the object of management are subjected to an excessive load exceeding the threshold value (or a low load that is less than the threshold value). For the respective resources that are the object of management, the performance managing module of the device that is the object of management monitors the values of the performance information (i.e., the load states) (S100). The performance managing module respectively ascertains whether or not the values of the performance information for the respective resources have reached the specified upper limit threshold value (or lower limit threshold value) (S101), and in cases where a resource that has reached one of these threshold values is discovered (S101: YES), the performance managing module issues an alert (S102). When the communications control module receives this alert (S103), the communications control module transmits this alert to the managing terminal 40 (S104). The managing terminal 40 receives this alert from the device that is the object of management (S105), and performs the re-disposition processing described later.

Figure 39:
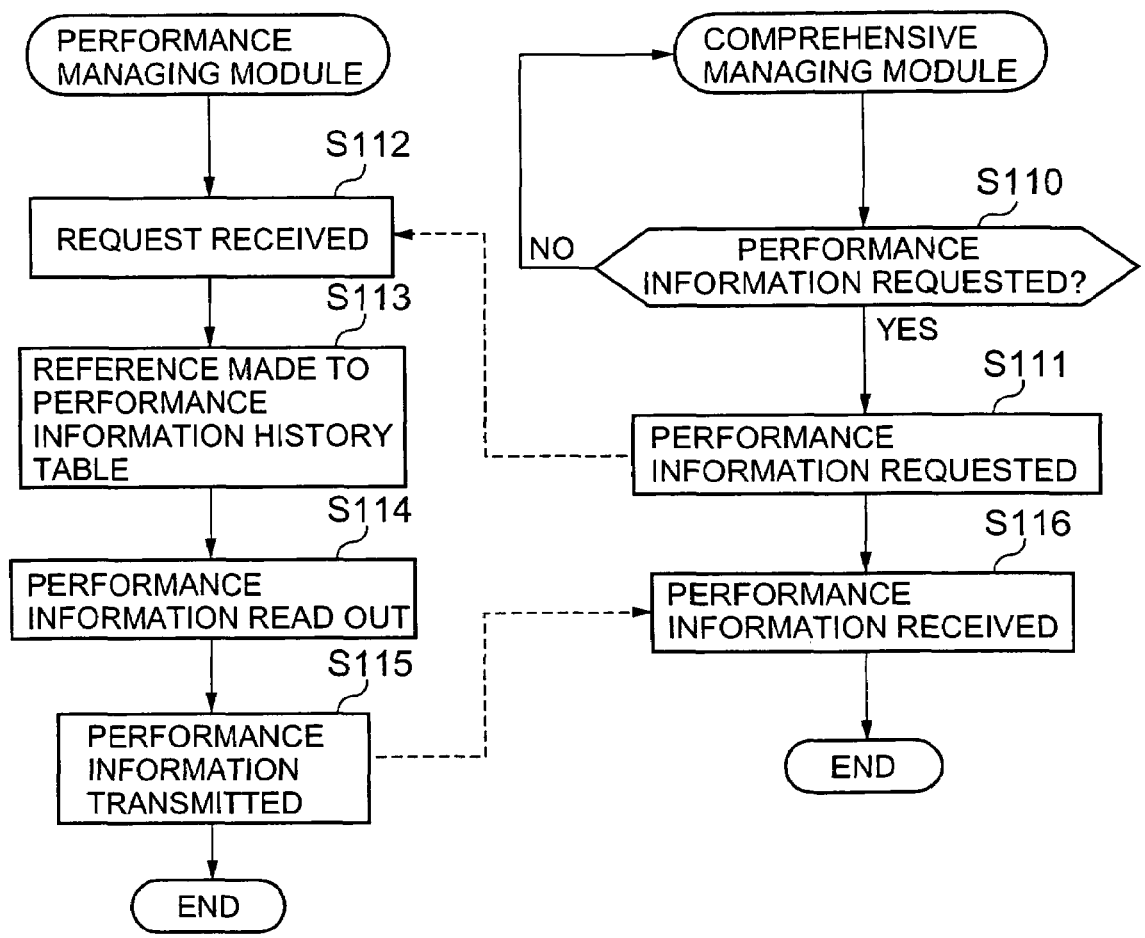
FIG. 39 is a flow chart showing the processing whereby the comprehensive management module acquires performance management information.

The processing that is performed by the managing terminal 40 will be described with reference to FIGS. 39 through 58. FIG. 39 is a flow chart showing the processing whereby the comprehensive managing module 411 acquires respective types of performance information in the storage system from the performance managing module 412 in the managing terminal 40. The comprehensive managing module 411 ascertains whether or not the acquisition of performance information has been requested (S110). The comprehensive managing module 411 can acquire performance information either periodically or aperiodically. When the comprehensive managing module 411 decides that performance information is to be acquired (S110: YES), the comprehensive managing module 411 requests the transmission of performance information from the performance managing module 412 (S111). When the performance managing module 412 receives this request (S112), the performance managing module 412 refers to the performance information history table D44 (S113), reads out the request performance information (S114), and transmits this performance information to the comprehensive managing module 411 (S115). The comprehensive managing module 411 receives the performance information that is transmitted from the performance managing module 412 (S116). As was described above, the performance managing module 412 collects and manages performance information relating to the respective resources of the device that is the object of management either periodically or aperiodically; accordingly, the comprehensive managing module 411 can obtain performance information relating to the respective resources in the storage system merely by sending a query to the performance managing module 412.

Figure 40:
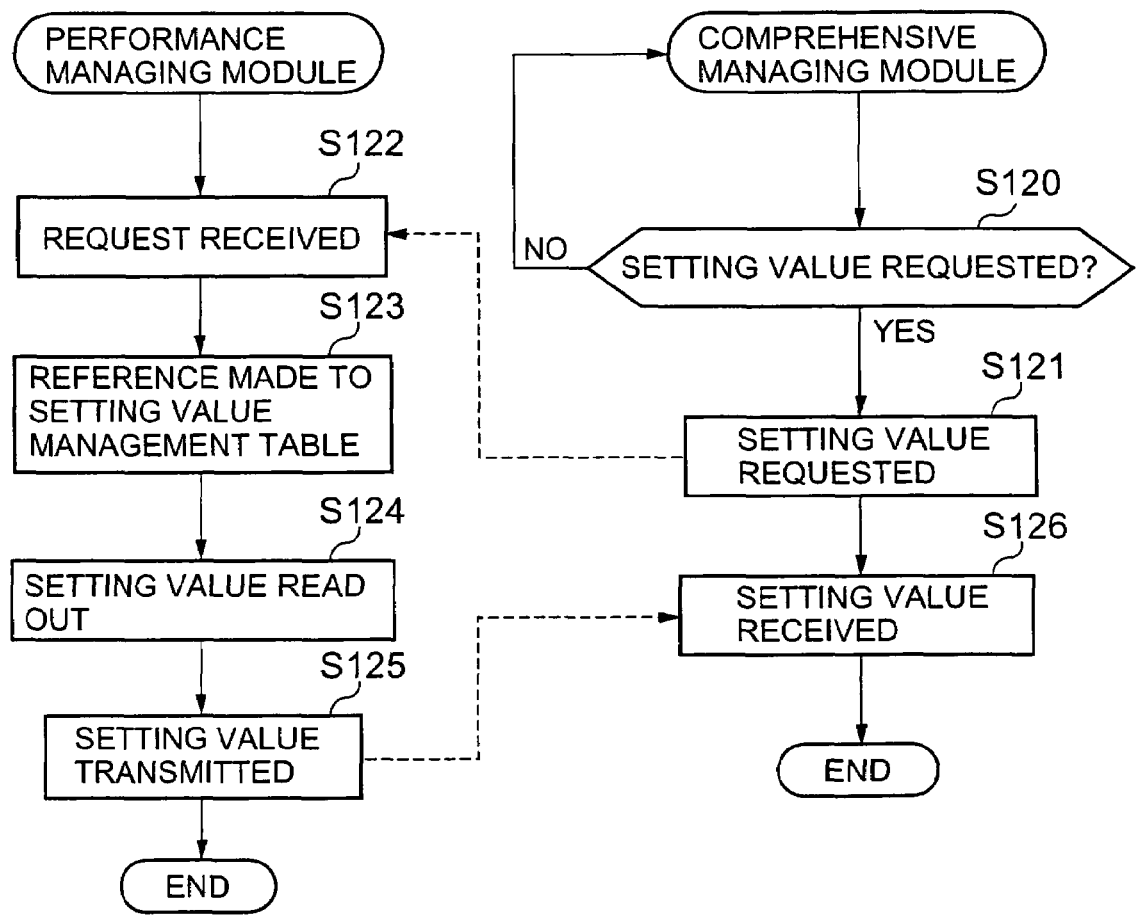
FIG. 40 is a flow chart showing the processing whereby the comprehensive management module requests alteration of the setting values.

FIG. 40 is a flow chart showing the processing whereby the comprehensive managing module 411 acquires setting values from the performance managing module 412. The comprehensive managing module 411 ascertains whether or not the acquisition of setting values has been requested (S120). In cases where it has been decided to acquire setting values (S120: YES), the comprehensive managing module 411 sends a request for the transmission of setting values to the performance managing module 412 (S121). When the performance managing module 412 receives this request (S122), the performance managing module 412 refers to the setting value management table D43 (S123), reads out the requested setting value (S124), and transmits this setting value to the comprehensive managing module 441 (S125). The comprehensive managing module 411 receives the setting value relating to the performance information (S126). The setting values for performance information relating to the respective resources in the storage system are managed by the performance managing module 412 in the managing terminal 40. Accordingly, the comprehensive managing module 411 can acquire respective setting values for the respective resources in the storage system merely by sending a query to the performance managing module 412.

Figure 41:
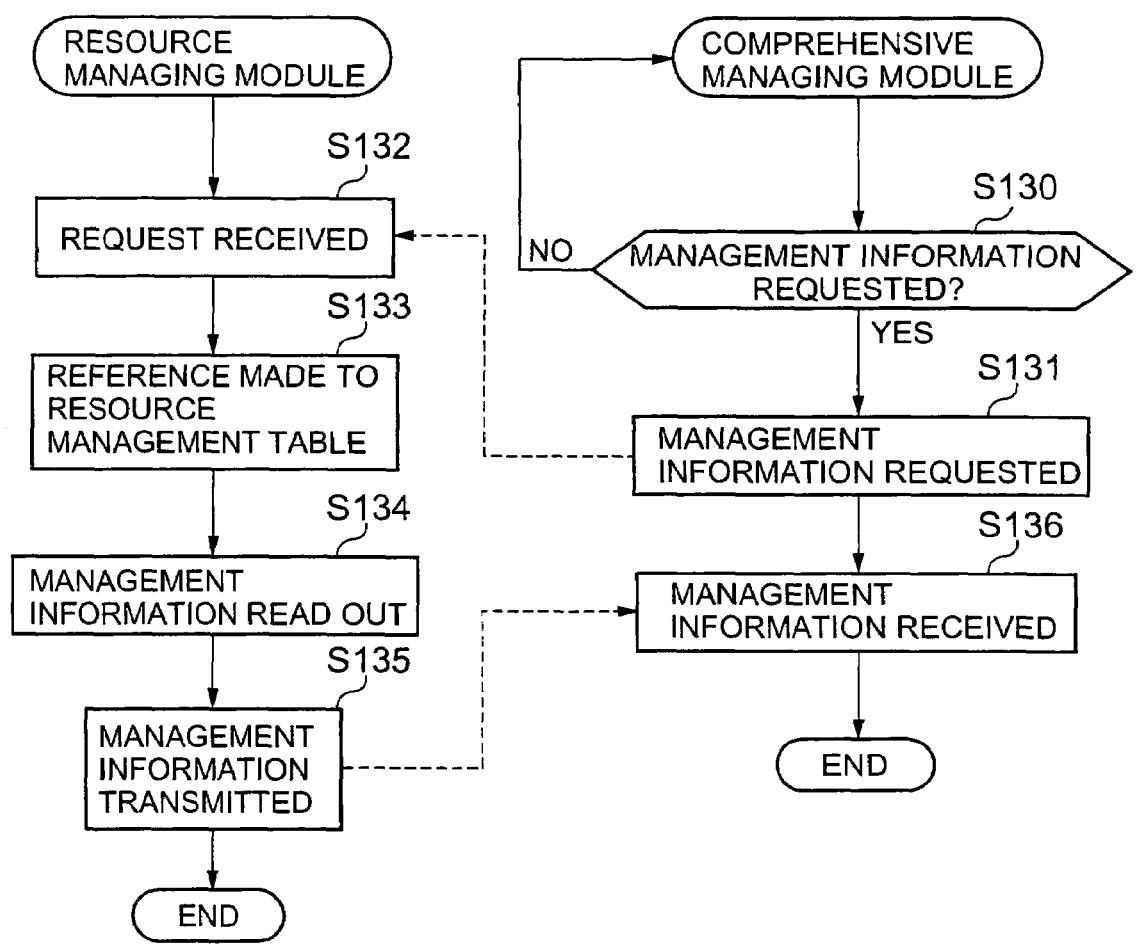
FIG. 41 is a flow chart showing the processing whereby the comprehensive management module acquires resource management information.

FIG. 41 is a flow chart showing the processing whereby the comprehensive managing module 411 acquires resource management information in the storage system from the resource managing module 414. When the comprehensive managing module 411 decides that resource management information is to be acquired (S130: YES), the comprehensive managing module 411 sends a request for the transmission resource management information to the resource managing module 414 (S131). When the resource managing module 414 receives this request (S132), the resource managing module 414 refers to the resource management table D45 (S133), reads out the requested resource management information (S134), and transmits the read-out resource management information to the comprehensive managing module 411 (S135). The comprehensive managing module 411 receives this resource management information (S136). Furthermore, as in the abovementioned processing and the processing that will be described later, the comprehensive managing module 411 can request the acquisition of information and alteration of information for all of the resources or a specified portion of the resources in the storage system.

Figure 42:
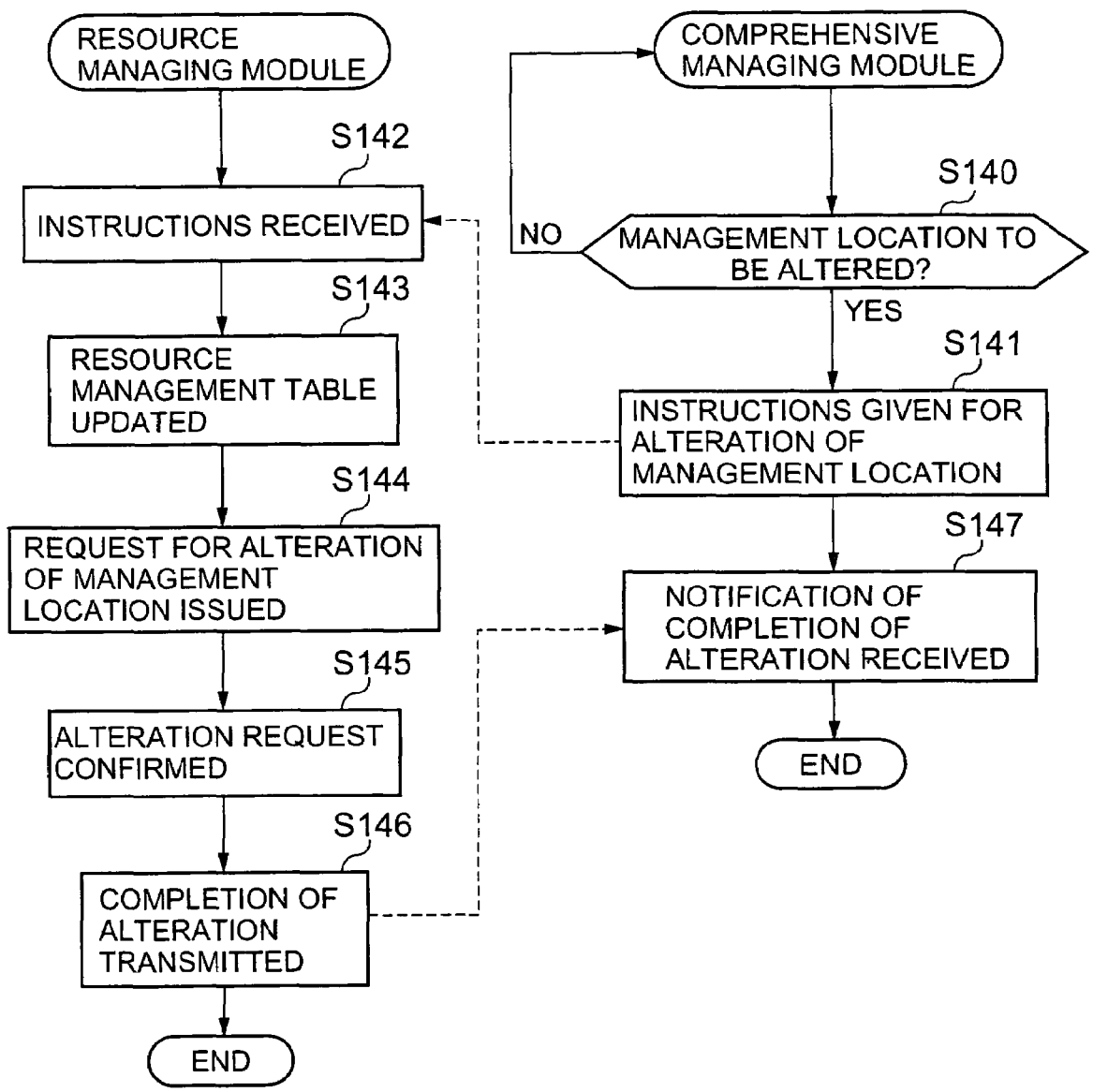
FIG. 42 is a flow chart showing the processing whereby the comprehensive management module requests alteration of the management area.

FIG. 42 is a flow chart showing the processing whereby the comprehensive managing module 411 requests the alteration of the management location from the resource managing module 414. When the comprehensive managing module 411 decides that the management location is to be altered (S140: YES), the comprehensive managing module 411 sends a request for the alteration of the management location to the resource managing module 414 (S141). When the resource managing module 414 receives this request (S142), the resource managing module 414 alters the stored content of the resource management table D45 on the basis of the request from the comprehensive managing module 411 (S143). Then, the resource managing module 414 issues a management location alteration request to the resource managing module of the device constituting the object of management that relates to the altered management location (S144). When the resource managing module 414 confirms that the resource managing module of the device that is the object of management has completed the alteration of the management location (S145), the resource managing module 414 notifies the comprehensive managing module 411 that the alteration has been completed (S146). The comprehensive managing module 411 receives this notification (S147).

Figure 43:
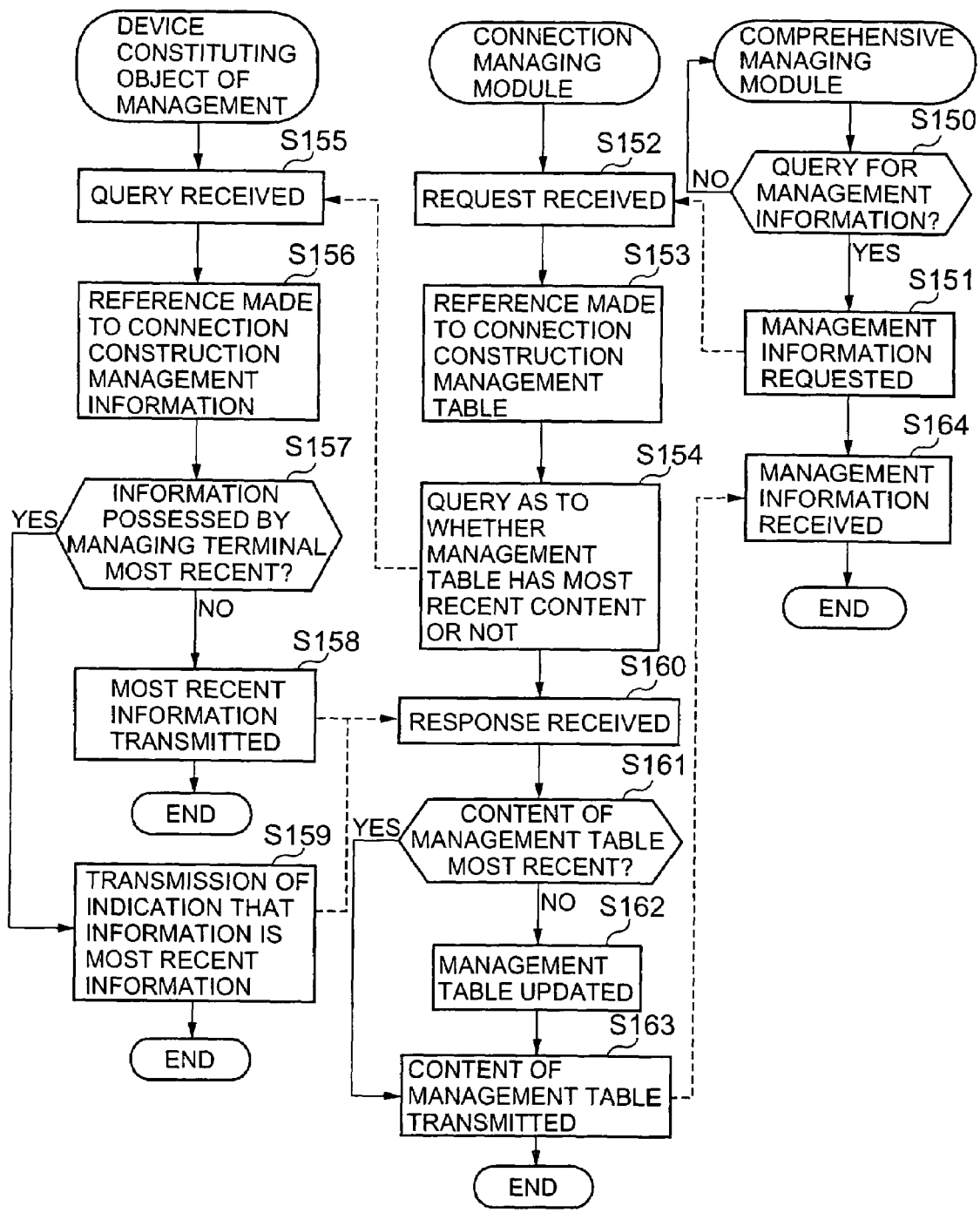
FIG. 43 is a flow chart showing the processing whereby the comprehensive management module acquires connection construction management information.

FIG. 43 is a flow chart showing the processing whereby the comprehensive managing module 411 acquires connection construction management information from the connection managing module 415. When the comprehensive managing module 411 decides that connection construction management information is to be acquired (S150: YES), the comprehensive managing module 411 requests management information from the connection managing module 415 (S151). When the connection managing module 415 receives this request (S152), the connection managing module 415 refers to the connection construction management table D47 (S153), and respectively queries the connection managing modules of the respective devices that are the object of management as to whether or not the stored content of this management table D47 is the most recent content (S154). The current connection construction content relating to the device that is the object of management (a portion of the stored content of the table D47) is included in this query.

When the connection managing module of a device that is the object of management receives this query from the managing terminal 40 (S155), this connection managing module refers to the connection construction management information (S156), and ascertains whether or not the connection construction management information held in the managing terminal 40 is the most recent content (S157). In cases where this information is not the most recent content (S157: NO), the connection managing module of the device that is the object of management transmits the most recent connection construction management information to the connection managing module 415 of the managing terminal 40 (S158). In cases where the connection construction management information held in the managing terminal 40 is the most recent content (S157: YES), the connection managing module of the device that is the object of management notifies the connection managing module 415 of the managing terminal 40 that this information is the most recent content (S159).

When the connection managing module 415 of the managing terminal 40 receives a response from the device that is the object of management (S160), this connection managing module 415 ascertains whether or not the stored content of the connection construction management table D47 is the most recent stored content (S161). In cases where this content is not the most recent content (S161: NO), the connection managing module 415 updates the stored content of this management table D47 to the most recent content (S162), and then transmits the stored content of the management table D47 to the comprehensive managing module 411 (S163). If the stored content of the connection construction management table D47 is the most recent content (S161: YES), the connection managing module 415 transmits this stored content of the management table D47 to the comprehensive managing module 411 (S163). The comprehensive managing module 411 receives the connection construction management information from the connection managing module 415 (S164).

Figure 44:
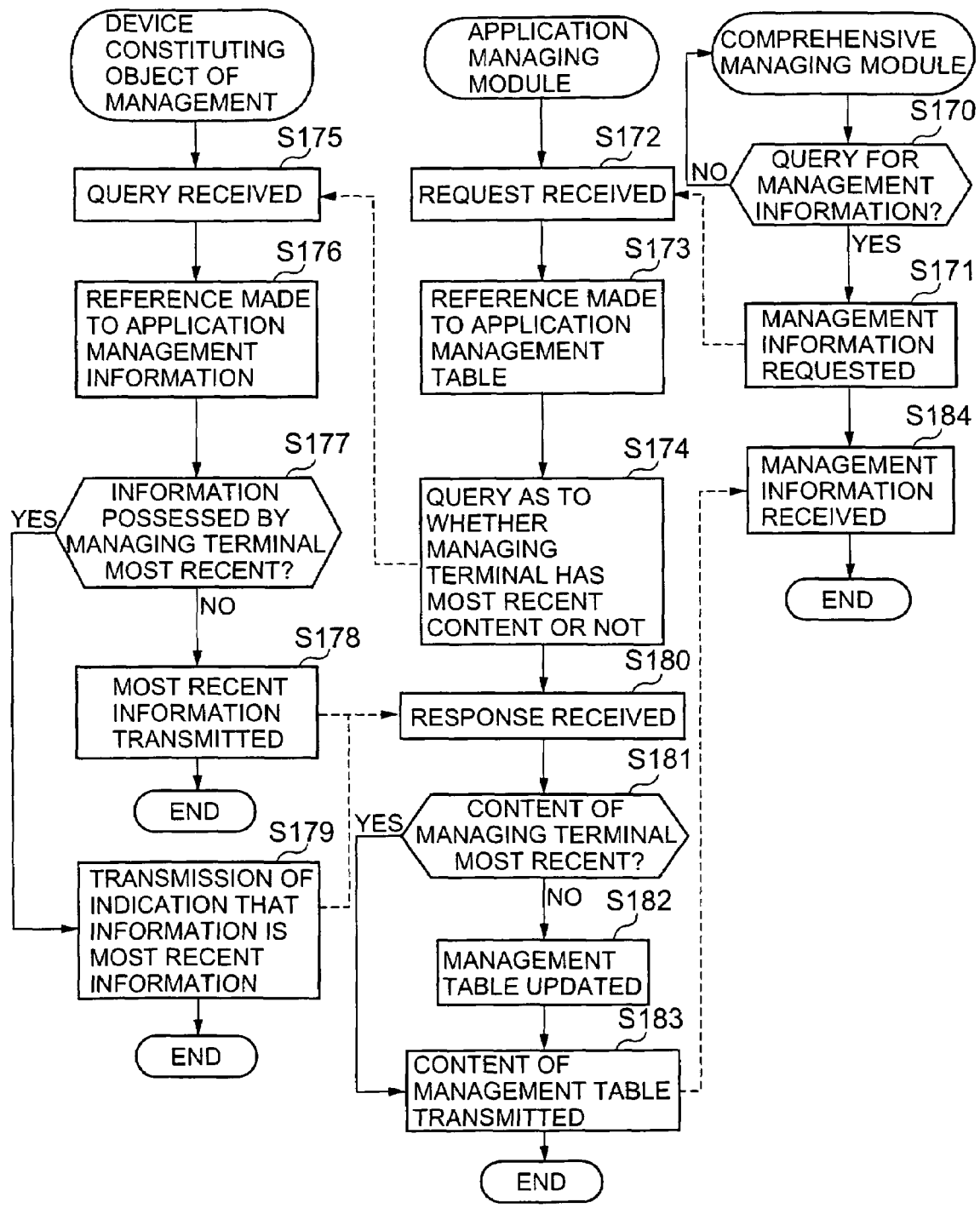
FIG. 44 is a flow chart showing the processing whereby the comprehensive management module acquires application management information.

FIG. 44 is a flow chart showing the processing whereby the comprehensive managing module 411 acquires application management information from the application managing module 413. When the comprehensive managing module 411 decides that application management information is to be acquired (S170: YES), the comprehensive managing module 411 sends a request for the transmission of application management information to the application managing module 413 (S171). When the application managing module 413 receives this request (S172), the application managing module 413 refers to the application management table D46 (S173), and queries the application managing modules 113 of the respective servers 10 as to whether or not the stored content of this table D46 is the most recent content (S174).

When the application managing module 113 of each server 10 receives this query from the managing terminal 40 (S175), this application managing module 113 refers to the application management information D13 (S176), and ascertains whether or not the application management information held by the managing terminal 40 is the most recent content (S177). In cases where the content held by the managing terminal 40 is old (S177: NO), the application managing module 113 transmits the most recent application management information to the application managing module 413 of the managing terminal 40 (S178). In cases where the content held by the managing terminal 40 is the most recent content (S177: YES), the application managing module 113 of the server 10 notifies the managing terminal 40 that this is the case (S179).

When the application managing module 413 of the managing terminal 40 receives a response from the server 10 (S180), the application managing module 413 ascertains whether or not the stored content of the application management table D46 is the most recent content (S181). In cases where this stored content is not the most recent content (S181: NO), the application managing module 413 updates the stored content of the application management table D46 to the most recent content (S182), and transmits the stored content of the updated management table D46 to the comprehensive managing module 411 (S183). Conversely, in cases where the stored content of the management table D46 is the most recent content (S181: YES), the application managing module 413 transmits the current stored content to the comprehensive managing module 411 without updating the application management table D46 (S184).

Figure 45:
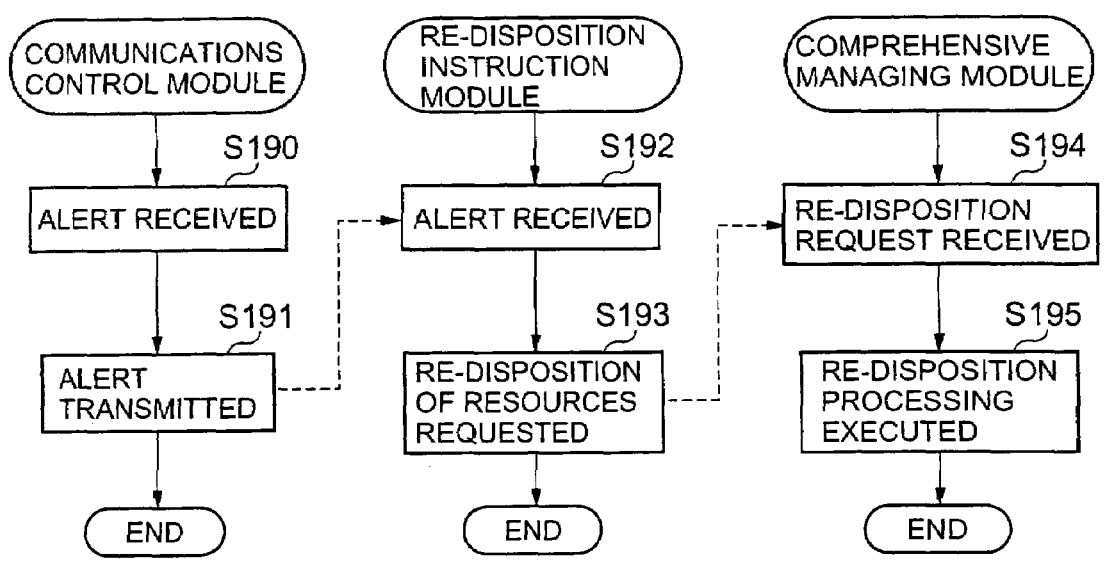
FIG. 45 is a flow chart showing the processing whereby instructions for resource re-disposition are given in accordance with alerts from the devices that are the object of management.

FIG. 45 is a flow chart showing the processing whereby instructions are given for the execution of a re-disposition of resources by an alert issued from any of the respective devices that are the object of management. As was described above, the performance managing modules of the respective devices that are the object of management respectively monitor the load states of the respective resources that are under the management of these performance managing modules, and issue an alert in specified cases. This alert is received by the communications control module of the device in question that is the object of management (S190). The communications control module of this device that is the object of management transmits this alert to the re-disposition instruction module 418 of the managing terminal 40 (S191).

When the re-disposition instruction module 418 receives the alert issued by the device that is the object of management (S192), the re-disposition instruction module 418 sends a request for the re-disposition of resources to the comprehensive managing module 411 (S193). When the comprehensive managing module 411 receives this re-disposition request (S194), the comprehensive managing module 411 executes the re-disposition processing described below (S195).

Figure 46:
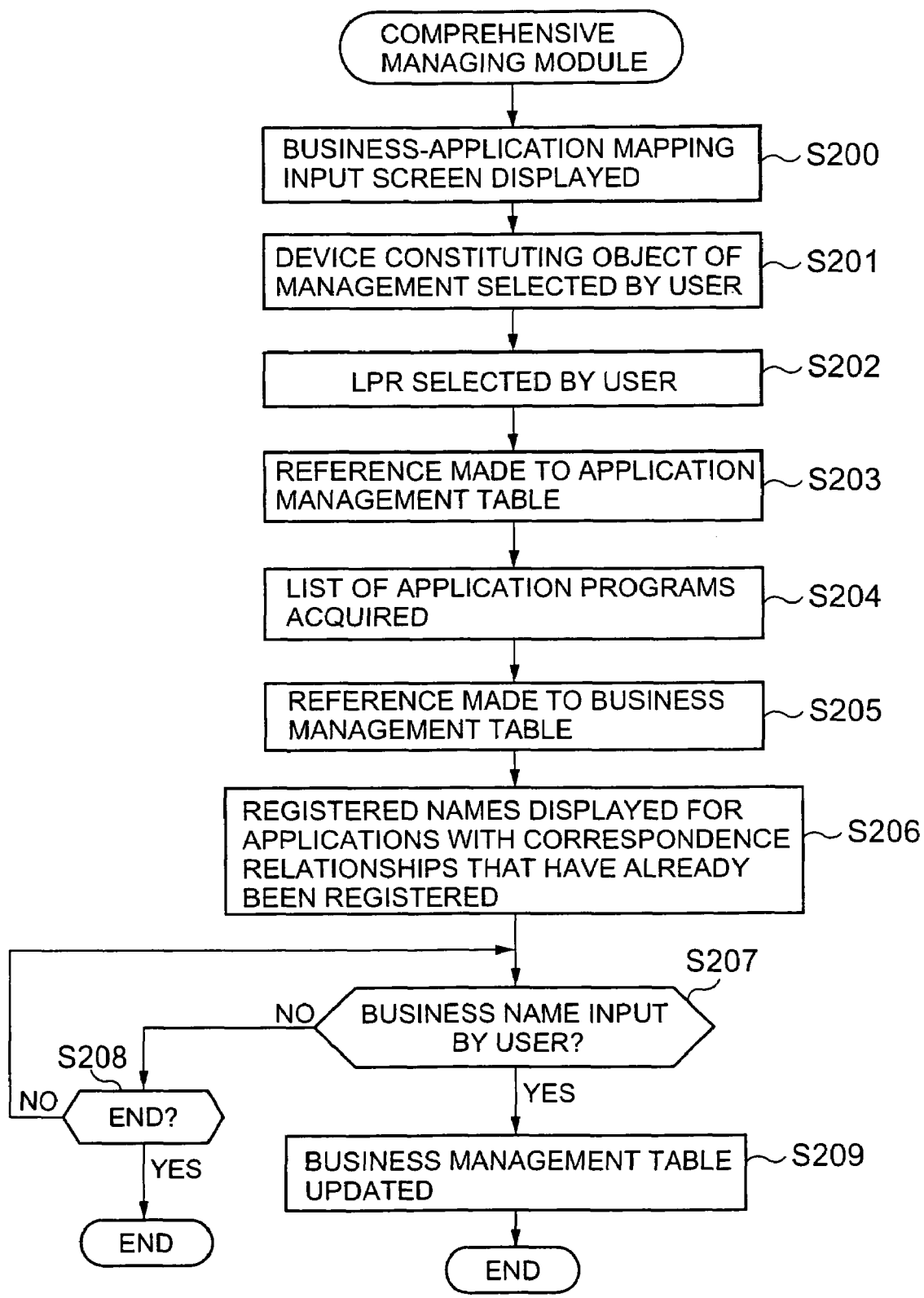
FIG. 46 is a flow chart showing the processing used to establish a correspondence between business names and application programs.

Next, before the details of the re-disposition processing are described, the processing relating to the user interface will be described. One example of the screen relating to the user interface is as already described above. FIG. 46 is a flow chart showing the processing used to establish a correspondence between business names and application programs.

The comprehensive managing module 411 causes the user output module 417 to display a screen G1 that maps the business names and application programs on the basis of an operation performed by the user via the user input module 416. The user selects the device that is the object of management (S201), and selects the logically divided server 11 that is the unit of logical division (S202). The comprehensive managing module 411 refers to the application program management table D46 (S203), and acquires a list of the application programs (S204). Furthermore, the comprehensive managing module 411 refers to the business management table D42 (S205).

The comprehensive managing module 411 causes the screen G1 to display the list of the application programs, and also causes this screen to display the business names that have already been set (S206). The comprehensive managing module 411 performs a monitoring operation as to whether or not any business names have been input by the user (S207). In cases where no business name has been input by the user (S207: NO), the comprehensive managing module 411 ascertains whether or not the "end" button B2 has been operated (S208). When a business name is input by the user (S207: YES), the comprehensive managing module 411 associates the input business name with an application program, and updates the business management table D42 (S209).

Figure 47:
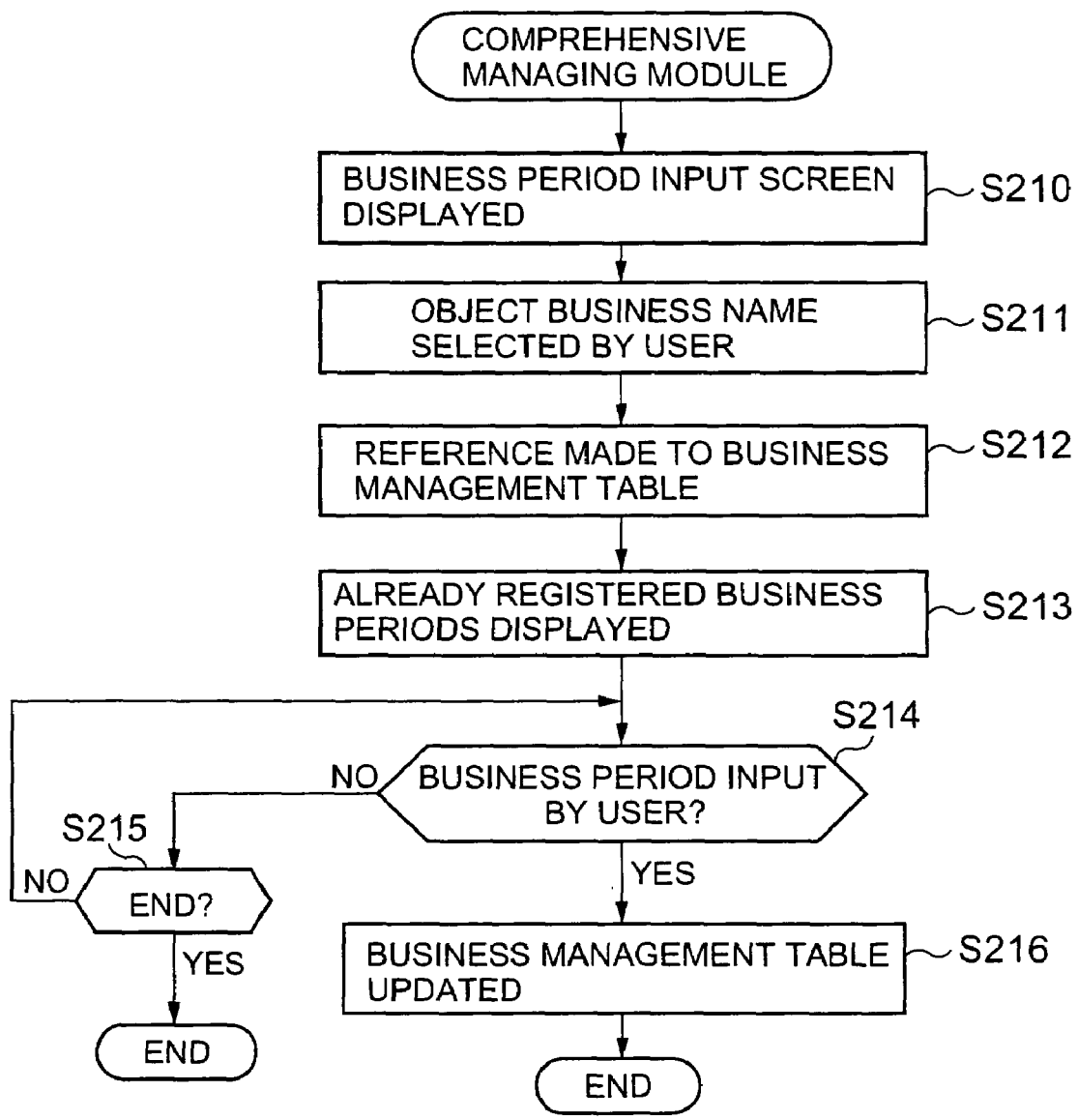
FIG. 47 is a flow chart showing the processing used to set the business periods.

FIG. 47 is a flow chart showing the processing that is used in order to input business information. The comprehensive managing module 411 displays the screen G2 on the basis of an operation performed by the user (S210). When the user selects the object business name (S211), the comprehensive managing module 411 refers to the business management table D42 (S212), reads out the business period that has already been registered, and causes the screen G2 to display this value (S213). The comprehensive managing module 411 performs respective monitoring functions in order to ascertain whether or not a business period has been input by the user (S214), and in order to ascertain whether or not the "end" button B2 has been operated by the user (S215). When the user inputs a business period on the screen G2 (S214: YES), the comprehensive managing module 411 updates the business management table D42 (S216).

Figure 48:
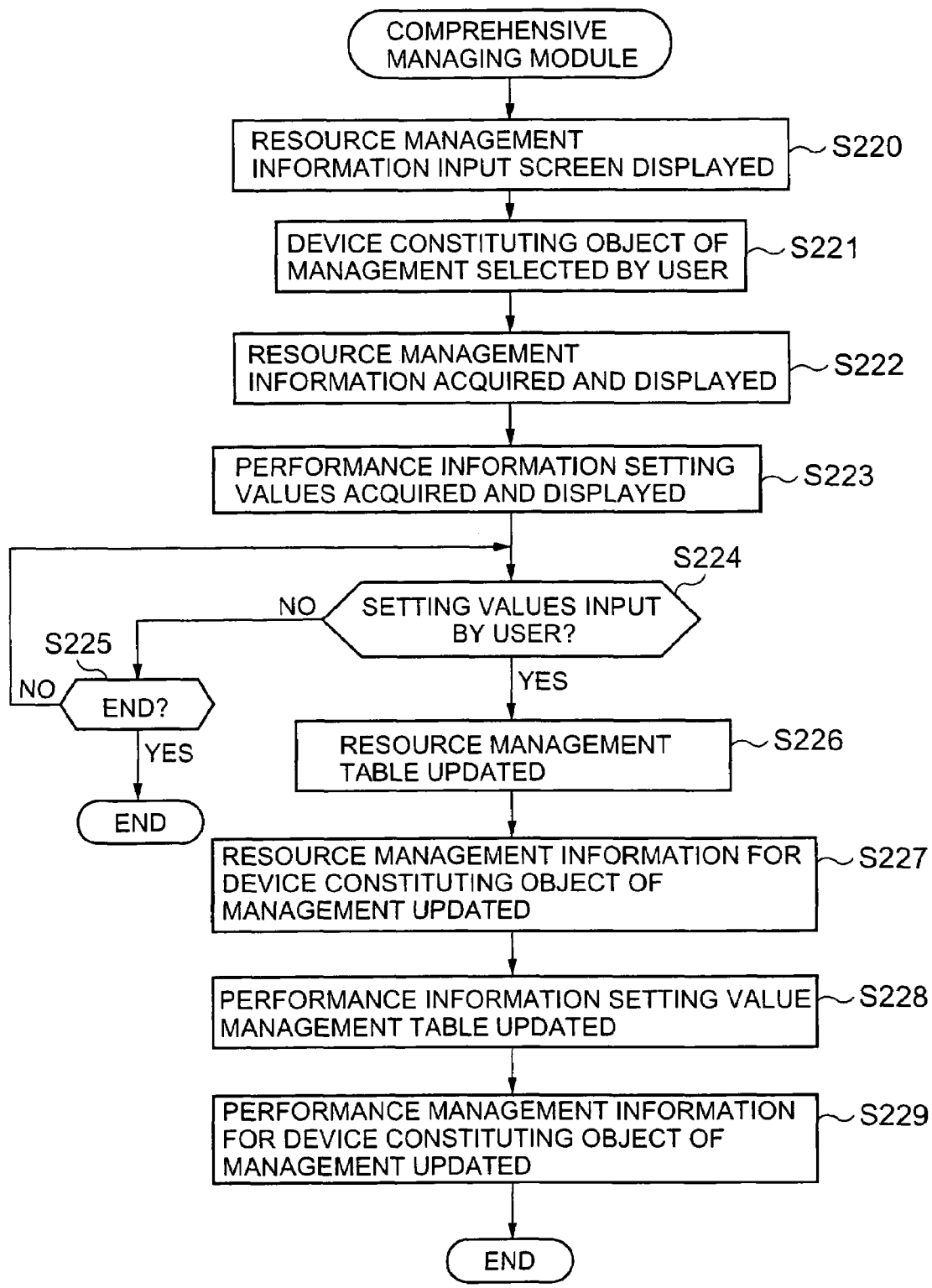
FIG. 48 is a flow chart showing the processing used to set the resource management information.

FIG. 48 is a flow chart showing the processing used to input resource management information. The comprehensive managing module 411 displays a screen G3 on the basis of an operation performed by the user (S220). When the device that is the object of management is selected by the user (S221), the comprehensive managing module 411 acquires resource management information relating to the selected device via the resource managing module 414, and causes this information to be displayed on the screen G3 (S222). Furthermore, the comprehensive managing module 411 respectively acquires performance information setting values for the respective resources of the selected device via the performance managing module 412, and causes these values to be displayed on the screen G3 (S223).

The comprehensive managing module 411 performs respective monitoring operations in order to ascertain whether or not setting values have been input by the user (S224), and in order to ascertain whether or not the "end" button B2 has been operated by the user (S225). When a setting value is input by the user (S224: YES), the comprehensive managing module 411 updates the resource management table D45 via the resource managing module 414 (S226). As a result, the resource management information held by the selected device that is the object of management is also updated on the basis of instructions from the resource managing module 414 (S227). Furthermore, the comprehensive managing module 411 updates the setting value management table D43 via the performance managing module 412 (S228). As a result, the performance management information held by the selected device that is the object of management is updated on the basis of instructions from the performance managing module 412 (S229).

Figure 49:
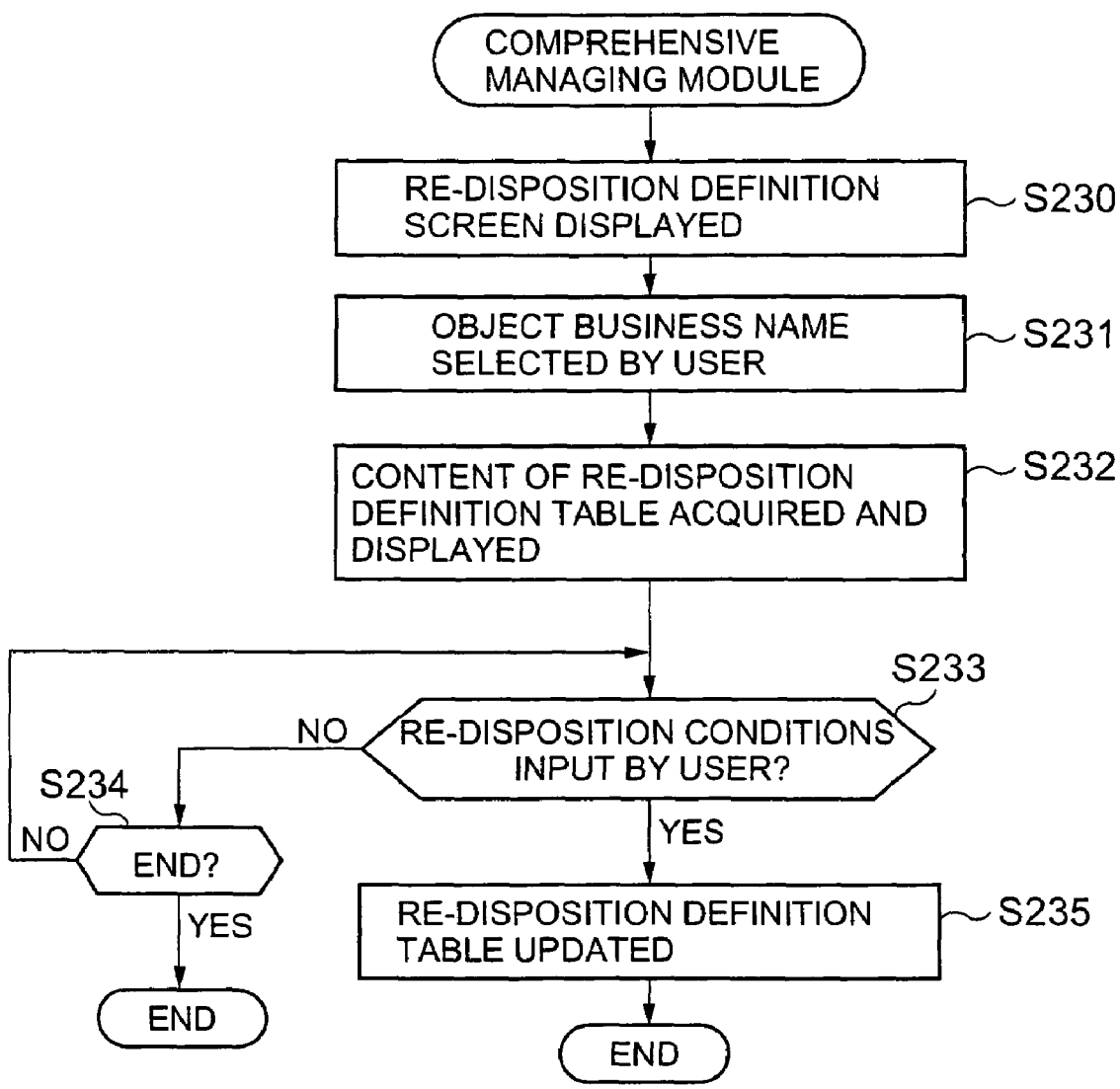
FIG. 49 is a flow chart showing the processing used to set the re-disposition conditions.

FIG. 49 is a flow chart showing the processing that is used to define the re-disposition conditions. The comprehensive managing module 411 displays a screen G4 on the basis of an operation performed by the user (S230). When an object business name is selected by the user (S231), the comprehensive managing module 411 reads out the definition content relating to the selected business from the re-disposition definition table D41, and causes this content to be displayed on the screen G4 (S232). The comprehensive managing module 411 performs respective monitoring operations in order to ascertain whether or not re-disposition conditions have been input by the user (S233), and in order to ascertain whether or not the "end" button B2 has been operated by the user (S234). When the user inputs re-disposition conditions (S233: YES), the comprehensive managing module 411 updates the re-disposition definition table D41 (S235).

Figure 50:
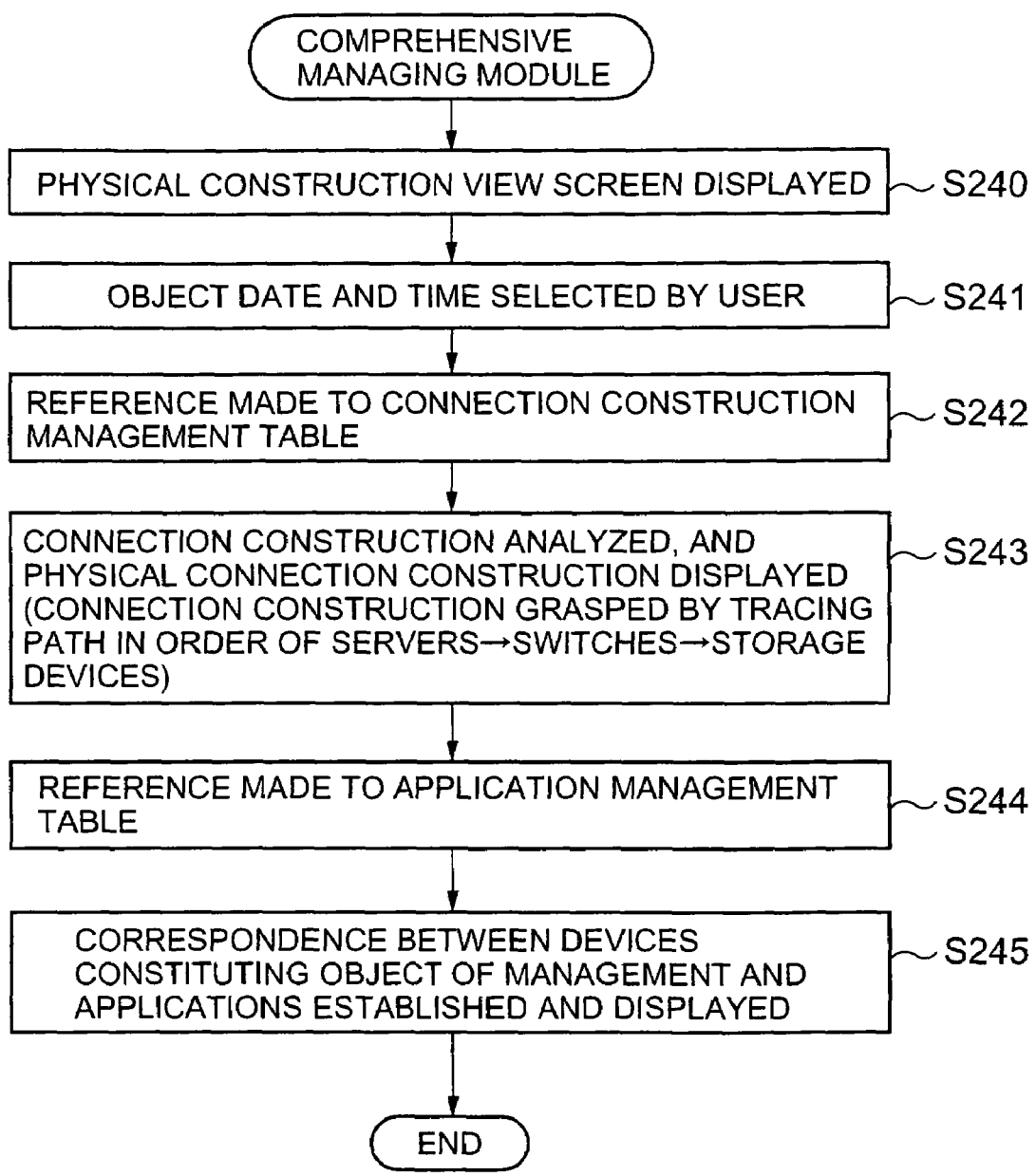
FIG. 50 is a flow chart showing the processing that displays the physical construction of the storage system.

FIG. 50 is a flow chart showing the processing used to display the physical construction of the storage system. The comprehensive managing module 411 displays a screen G5 on the basis of an operation performed by the user (S240). When the date and time of the object of display are selected by the user (S241), the comprehensive managing module 411 refers to the connection construction management table D47 via the connection managing module 415 (S242). The comprehensive managing module 411 displays the physical connection state on the basis of the acquired connection construction (S243). In this case, the comprehensive managing module 411 grasps the physical construction of the storage system by tracing a path in order from the servers 10 to the switches 20, and from the switches 20 to the storage devices 30.

Furthermore, the comprehensive managing module 411 refers to the application management table D46 via the application managing module 413 (S244), establishes a correspondence between the physical devices and the application programs, and displays this correspondence on the screen G5 (S245).

Figure 51:
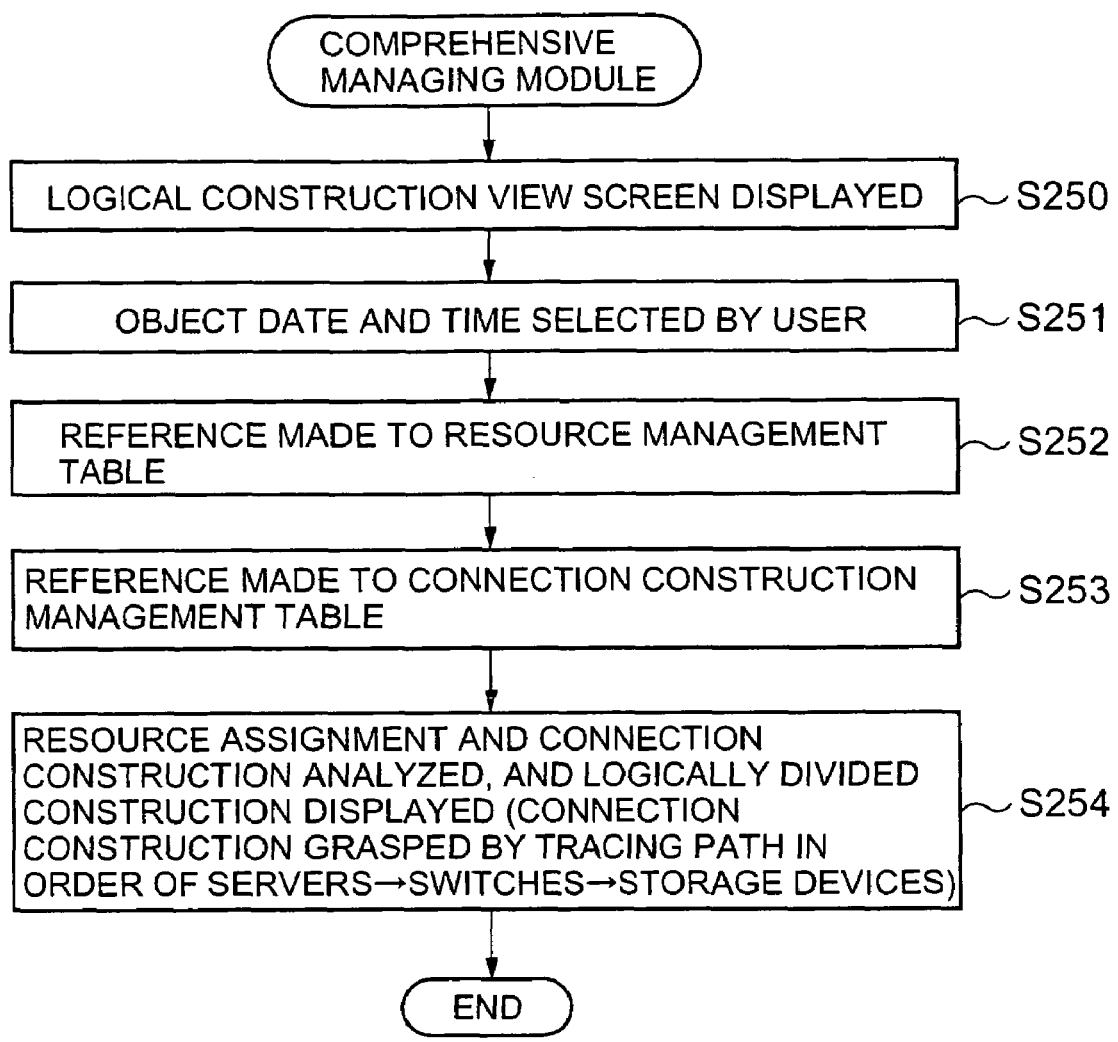
FIG. 51 is a flow chart showing the processing that displays the logical construction of the storage system.

FIG. 51 is a flow chart showing the processing used to display the logical construction of the storage system. The comprehensive managing module 411 displays a screen G6 on the basis of an operation performed by the user (S250). When the user selects the data and time of the object of display (S251), the comprehensive managing module 411 refers to the resource management table D45 via the resource managing module 414 (S252). Furthermore, the comprehensive managing module 411 refers to the connection construction management table D47 via the connection managing module 415 (S253). Then, the comprehensive managing module 411 performs an analysis in order to ascertain which resources are assigned to the respective logically divided units (and the extent to which these resource are assigned), and in order to ascertain how the respective logically divided units are connected; the comprehensive managing module 411 then displays the logical construction of the storage system (S254). In this case, the comprehensive managing module 411 grasps the logical construction of the storage system by tracing a path in order via the servers 10, switches 20 and storage devices 30.

Figure 52:
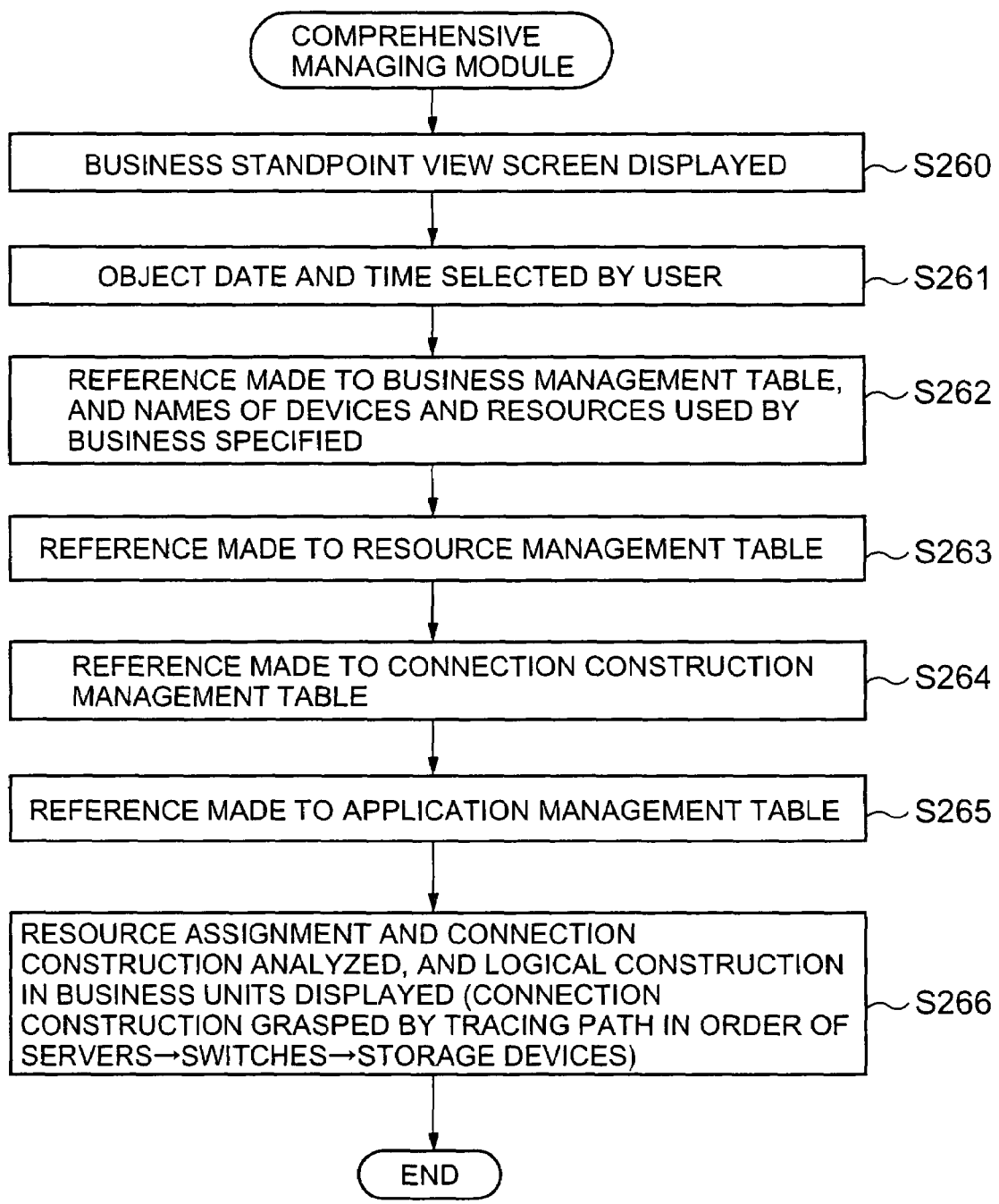
FIG. 52 is a flow chart showing the processing that displays the logical construction of the storage system from the viewpoints of the respective application programs.

FIG. 52 is a flow chart showing the processing used to display the construction in cases where the storage system is viewed from the standpoints of the respective businesses. The comprehensive managing module 411 displays a screen G7 on the basis of an operation performed by the user (S260). When the user selects the date and time of the object of display (S261), the comprehensive managing module 411 refers to the business management table D42, and detects the names of the devices and resources used by the application programs involved in the respective businesses (S262), The comprehensive managing module 411 refers to the resource management table D45 via the resource managing module 414 (S263). Furthermore, the comprehensive managing module 411 refers to the connection construction management table D47 via the connection managing module 415 (S264). Moreover, the comprehensive managing module 411 refers to the application management table D46 via the application managing module 413 (S265). Then, the comprehensive managing module 411 respectively analyzes the resource assignment state and connection state for each business, and causes the logical construction for each business unit to be displayed on the screen G7 (S266).

Figure 53:
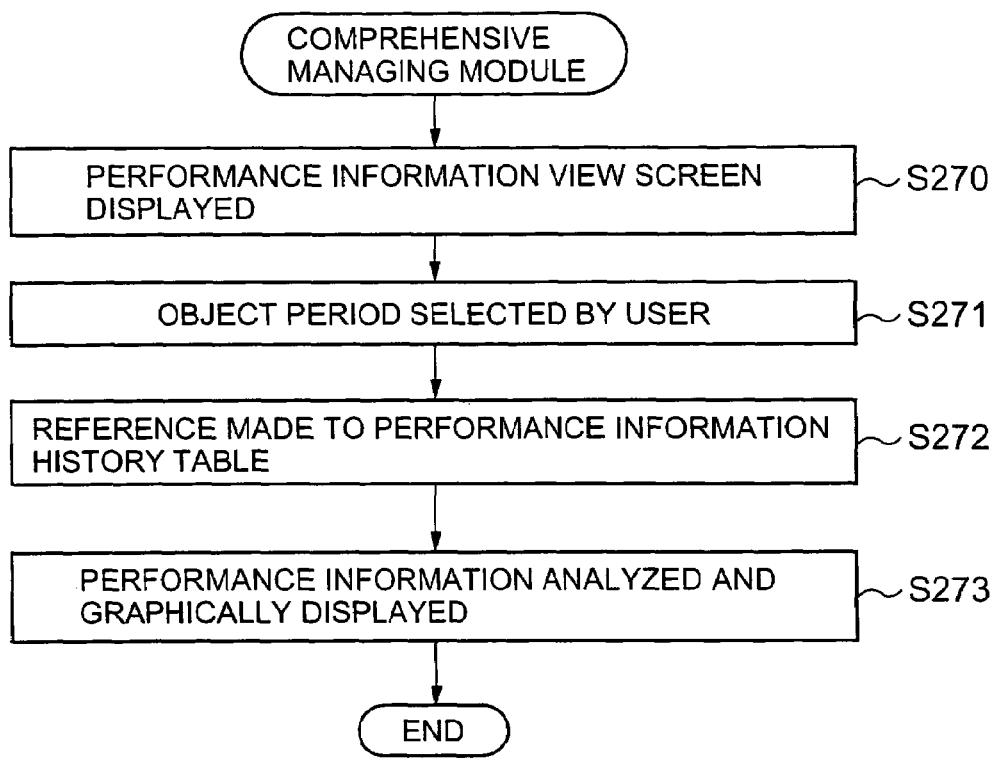
FIG. 53 is a flow chart showing the processing that displays the trend of the performance information of the respective resources.

FIG. 53 is a flow chart showing the processing used to display transitions in the performance information. The comprehensive managing module 411 displays a screen G8 on the basis of an operation performed by the user (S270). When the user selects the period of the object of display (S271), the comprehensive managing module 411 refers to the performance information history table D44 via the performance managing module 412 (S272). The comprehensive managing module 411 respectively acquires values for respective types of performance information with the selected period, and graphically displays these values on the screen G8 (S273).

Figure 54:
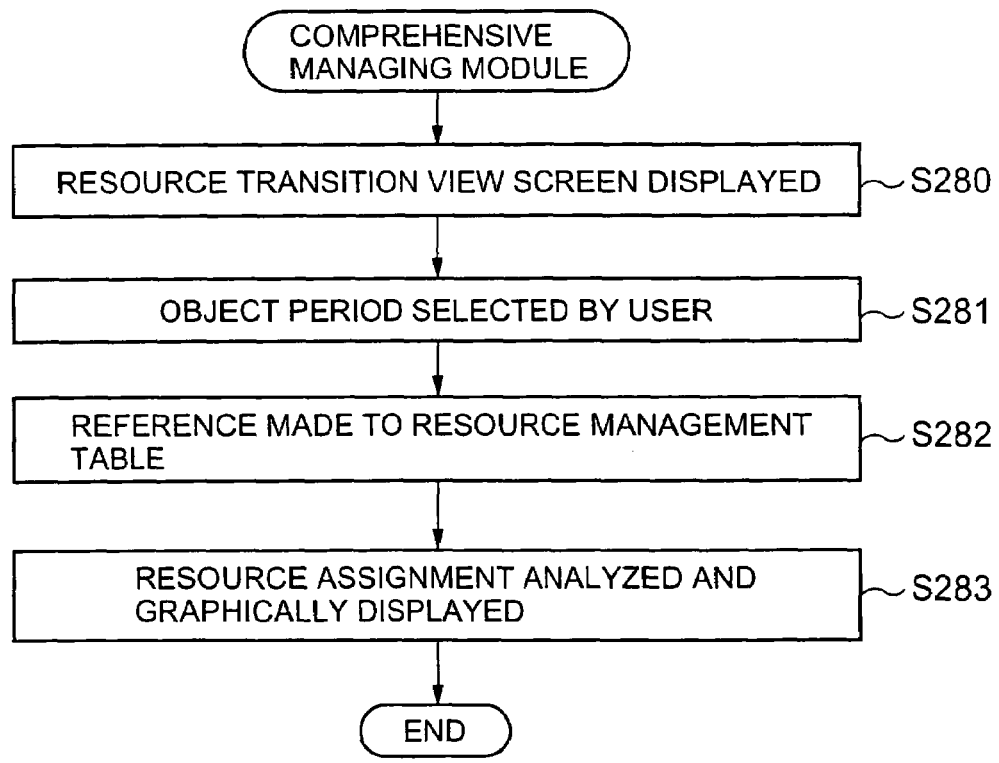
FIG. 54 is a flow chart showing the processing that displays the trend of the resources.

FIG. 54 is a flow chart showing the processing used to display transitions in resources. The comprehensive managing module 411 displays a screen G9 on the basis of an operation performed by the user (S280). When the user selects the period of the object of display (S281), the comprehensive managing module 411 refers to the resource management table D45 via the resource managing module 414 (S282), and respectively acquires information within the selected period. Then, the comprehensive managing module 411 causes changes in the resource assignment conditions in the selected period to be display in graph form on the screen G9 (S283).

Figure 55:
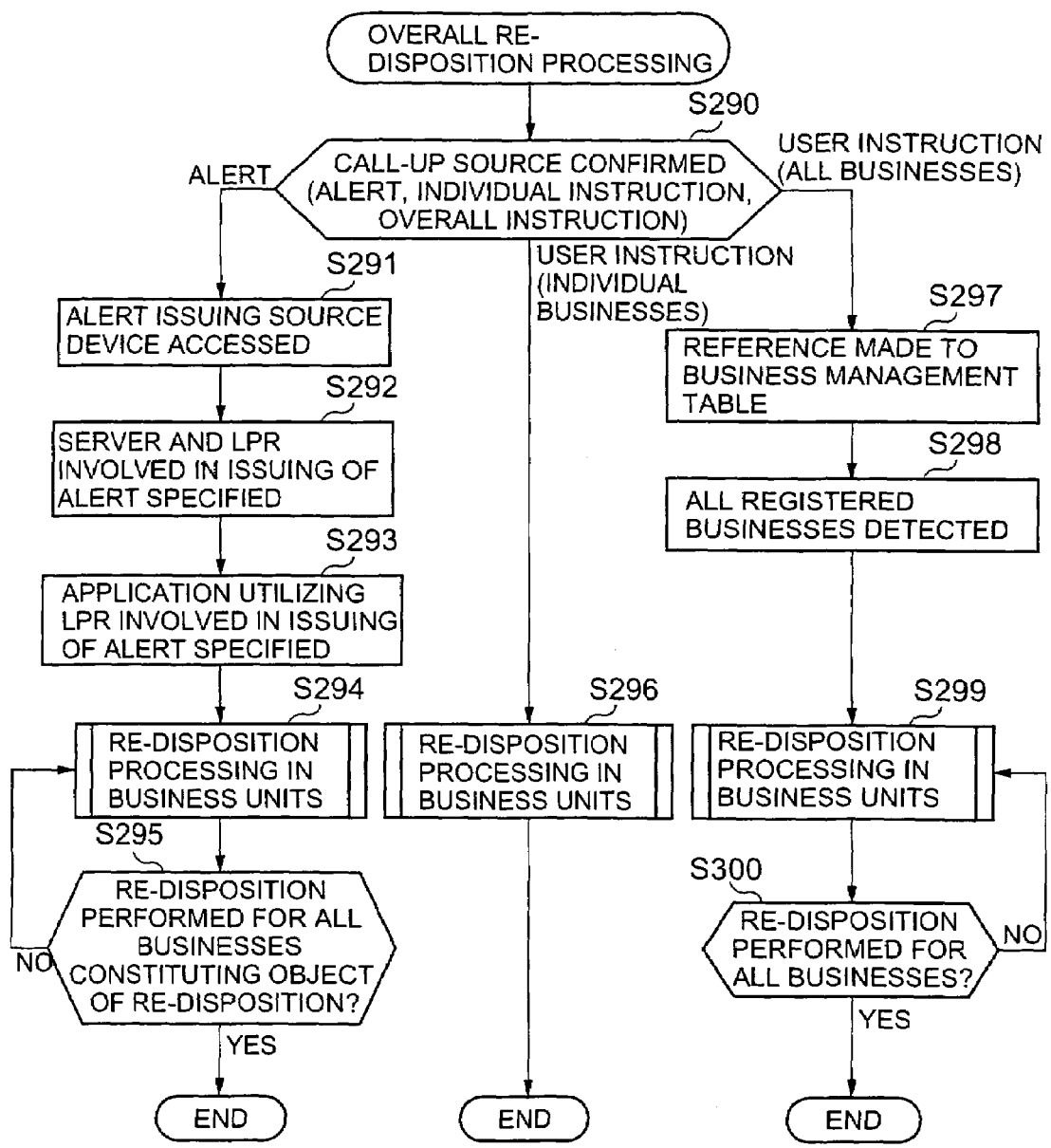
FIG. 55 is a flow chart showing an overall outline of the processing that re-disposes the resources.

Next, the resource re-disposition method used by the comprehensive managing module 411 will be described. FIG. 55 is a flow chart showing an overall outline of the resource re-disposition processing. Instructions for the execution of re-disposition can be given automatically or by a manual operation.

The comprehensive managing module 411 ascertains the source that has called up the re-disposition processing (S290). In cases where the initiation of re-disposition processing is requested on the basis of an alert from a device that is the object of management, the comprehensive managing module 411 accesses the device constituting the object of management that is the issuing source of the alert (S291), and respectively specifies the server 10 and LPR (logically divide server 11) that are involved in this alert (S292). The comprehensive managing module 411 specifies the application program executed on the logically divided server 11 that is involved in the issuing of this alert (S293), and executes re-disposition processing in business units (S294). This processing will be further described later. Then, for all of the businesses that are the object of re-disposition, the comprehensive managing module 411 ascertains whether or not the re-disposition of resources has been completed (S295). S294 is repeatedly executed until resources have been re-disposed for all of the application programs operating on the logically divide server 11 that is associated with the issuing of the alert.

Cases where re-disposition processing is initiated by instructions from the user can be further divided into two types of cases. One type consists of cases in which resources are re-disposed only for one or a plurality of businesses (application programs) specified by instructions from the user. The other type consists of cases in which the user gives instructions for re-disposition of the resources of all of the businesses. Thus, the user can select either an individual-business mode or an all-business mode.

In cases where the user gives such instructions for specified businesses, resource re-disposition processing is performed for the designated businesses (S296). On the other hand, in cases where the re-disposition of resources is instructed for all businesses, the comprehensive managing module 411 refers to the business management table D42 (S297), and respectively detects all of the businesses registered here (S298). Then, the comprehensive managing module 411 re-disposes the respective resources for all of the businesses in the storage system (S299, S300).

Figure 56:
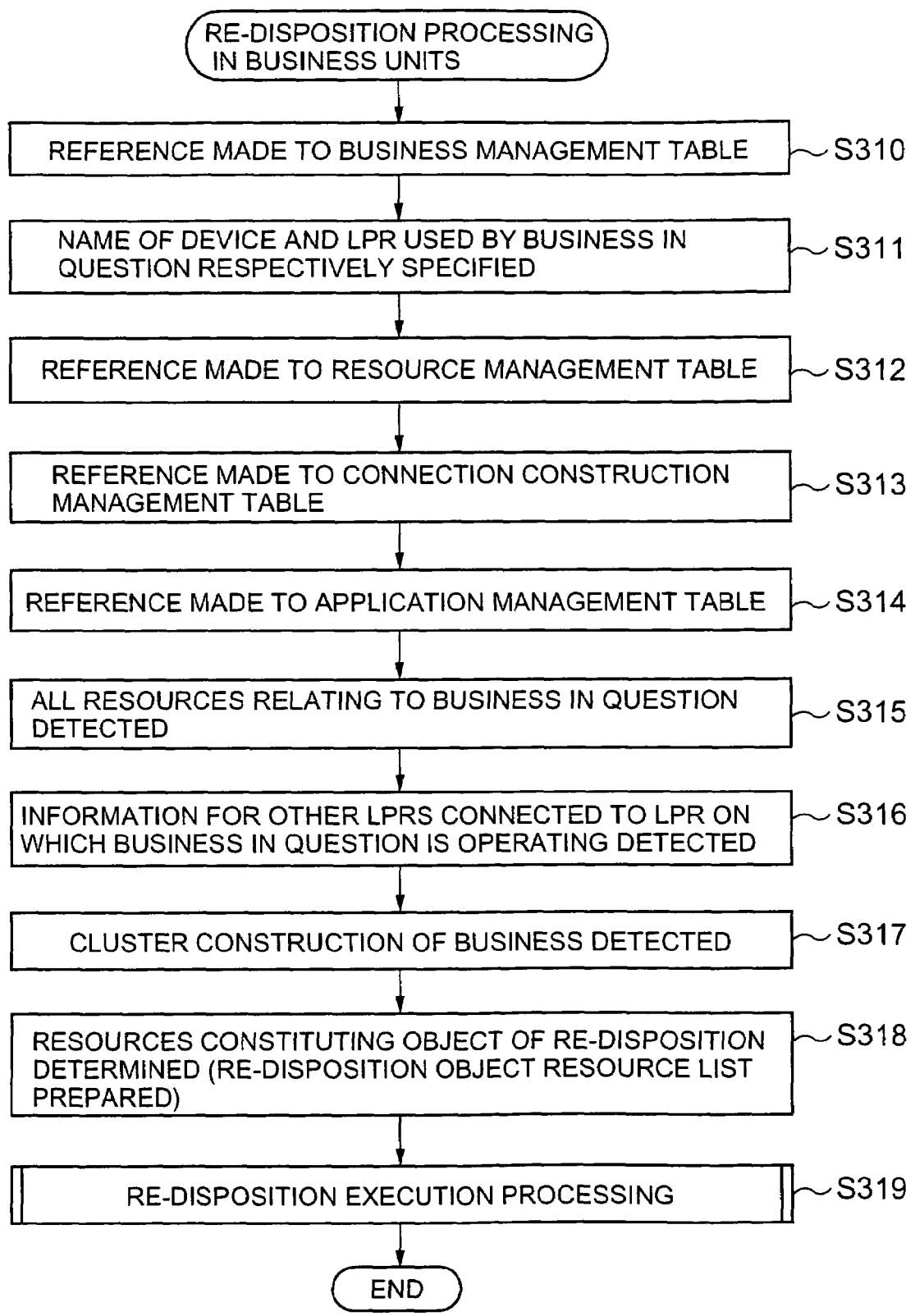
FIG. 56 is a flow chart showing the processing that re-disposes the resources in business units.

FIG. 56 is a low chart showing the processing used to re-dispose resources in business units. The comprehensive managing module 411 refers to the business management table D42 (S310), and respectively specifies the names of the devices and LPRs used by these businesses (S311). The comprehensive managing module 411 respectively refers to the resource management table D45 (S312), connection construction management table D47 (S313), an application management table D46 (S314), and detects all of the resources relating to these businesses (S315).

Furthermore, the comprehensive managing module 411 detects information relating to other LPRs connected to the LPRs on which these businesses are performed (S316); as a result, cluster constructions relating to these businesses are detected (S317). In other words, the comprehensive managing module 411 detects in advance the existence of other businesses associated with the businesses for which resources are re-disposed. Resource re-disposition that is cognizant of cluster constructions will be further described later.

Then, the comprehensive managing module 411 determines all of the resources that are the object of re-disposition, prepares a list of resources that are the object of re-disposition (S318), and performs re-disposition execution processing (S319). This processing will be described later.

Figure 57:
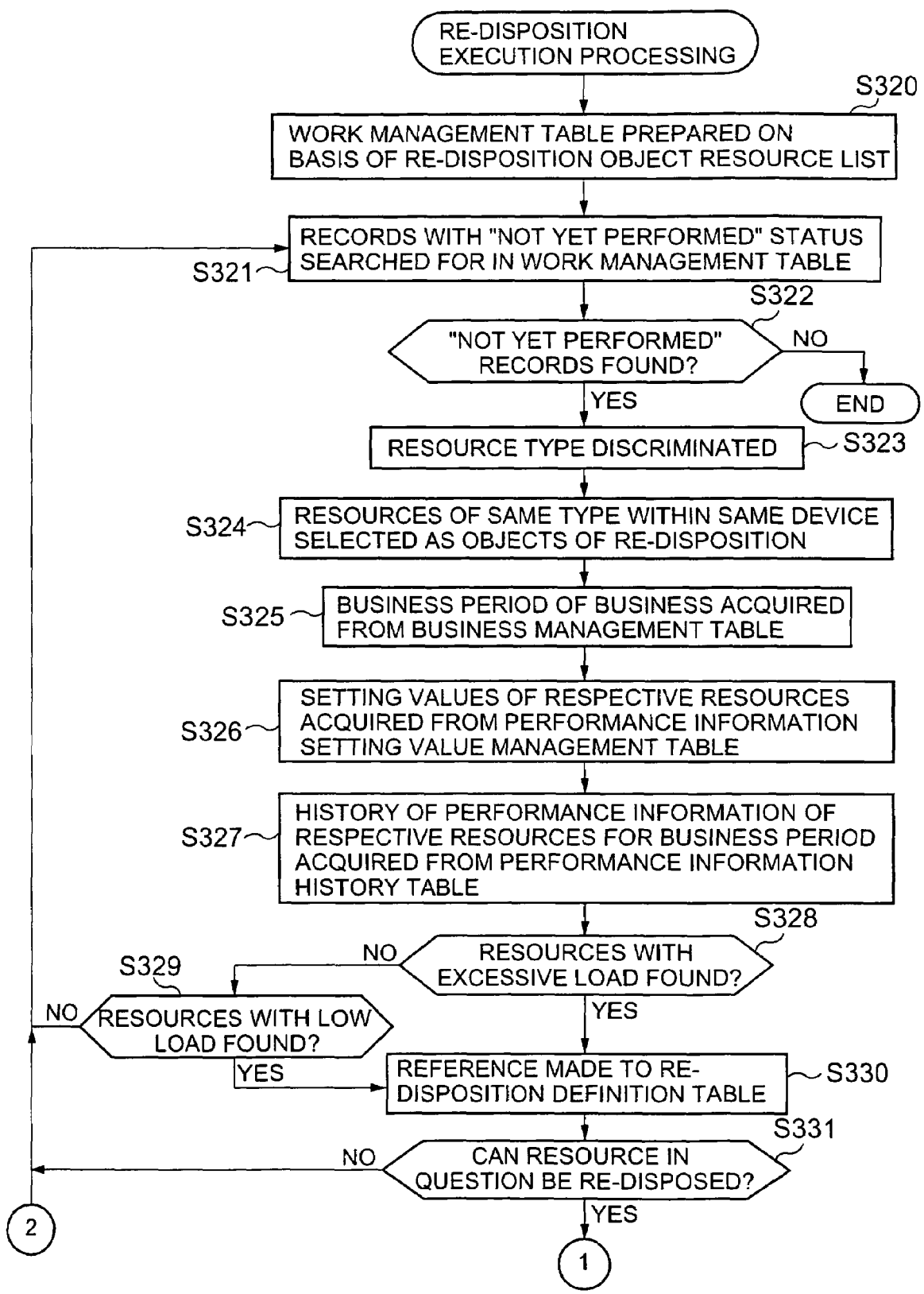
FIG. 57 is a flow chart showing the details of S319 in FIG. 56.

FIG. 57 is a flow chart showing the re-disposition execution processing. First, on the basis of the list of resources that are the object of re-disposition, the comprehensive managing module 411 prepares a work management table D50 (S320). One example of such a work management table D50 is shown in FIG. 59. For example, the work management table D50 can be constructed by establishing a correspondence among the names of devices to which resources are to be assigned, the names of resources, the types of these resources and the re-disposition status. Examples of this re-disposition status include "re-disposition completed" and "not yet performed". The "re-disposition completed" status indicates that the re-disposition of the resource has been completed. The "not yet performed" status indicates that the re-disposition of the resource has not been performed. Furthermore, other status designations may also be used.

The description now returns to FIG. 57. The comprehensive managing module 411 refers to the work management table D50, and detects records that have a "not yet performed" status (S321). In cases where not even a single record having this "not yet performed" status is discovered (S322: NO), the comprehensive managing module 411 ends this processing.

In cases where a record having the "not yet performed" status is detected (S322: YES), the comprehensive managing module 411 discriminates the type of resource registered in this record (S323), and selects resources of the same type present in the same device as this resource as the resources that are the object of re-disposition (S324). Specifically, in cases where a certain processor is registered in the work management table D50, and the status of this processor is "not yet performed", all of the other processors that are present in the same device as this processor are selected as objects of re-disposition.

The comprehensive managing module 411 refers to the business management table D42, and acquires the business period set for the business involved in the resource re-disposition (S325). The comprehensive managing module 411 refers to the setting value management table D43, and respectively acquires the setting values of the respective resources selected as objects of re-disposition in S324 (S326). Then, the comprehensive managing module 411 refers to the performance information history table D44, and respectively acquires the changes in the performance information of the respective resources for the business period only (S327).

On the basis of the changes in the performance information of the respective resources in the business period, the comprehensive managing module 411 respectively ascertains whether or not resources with a specified excessive load are present (S328), and whether or not resources with a specified low load are present (S329). Resources with an excessive load are resources in which the value of the performance information is equal to or greater than the upper limit threshold value. Resources with a low load are resources in which the value of the performance information is equal to or less than the lower limit threshold value.

In cases where a resource with an excessive load or a resource with a low load is discovered (S328: YES, S329: YES), the comprehensive managing module 411 refers to the re-disposition definition table D41 (S330), and ascertains whether or not this resource can be re-disposed (S331). As was already described above, the user can set permission for or prohibition of re-disposition in advance for specified resources or groups of resources.

In cases where re-disposition is prohibited for the abovementioned resource with an excessive load or resource with a low load (S331: NO), the comprehensive managing module 411 returns to S321, and detects the next record having a "not yet performed" status. On the other hand, in cases where re-disposition is permitted for the abovementioned resource with an excessive load or resource with a low load (S331: YES), the processing shifts to the flow chart shown in FIG. 58 via the connector 1.

Figure 58:
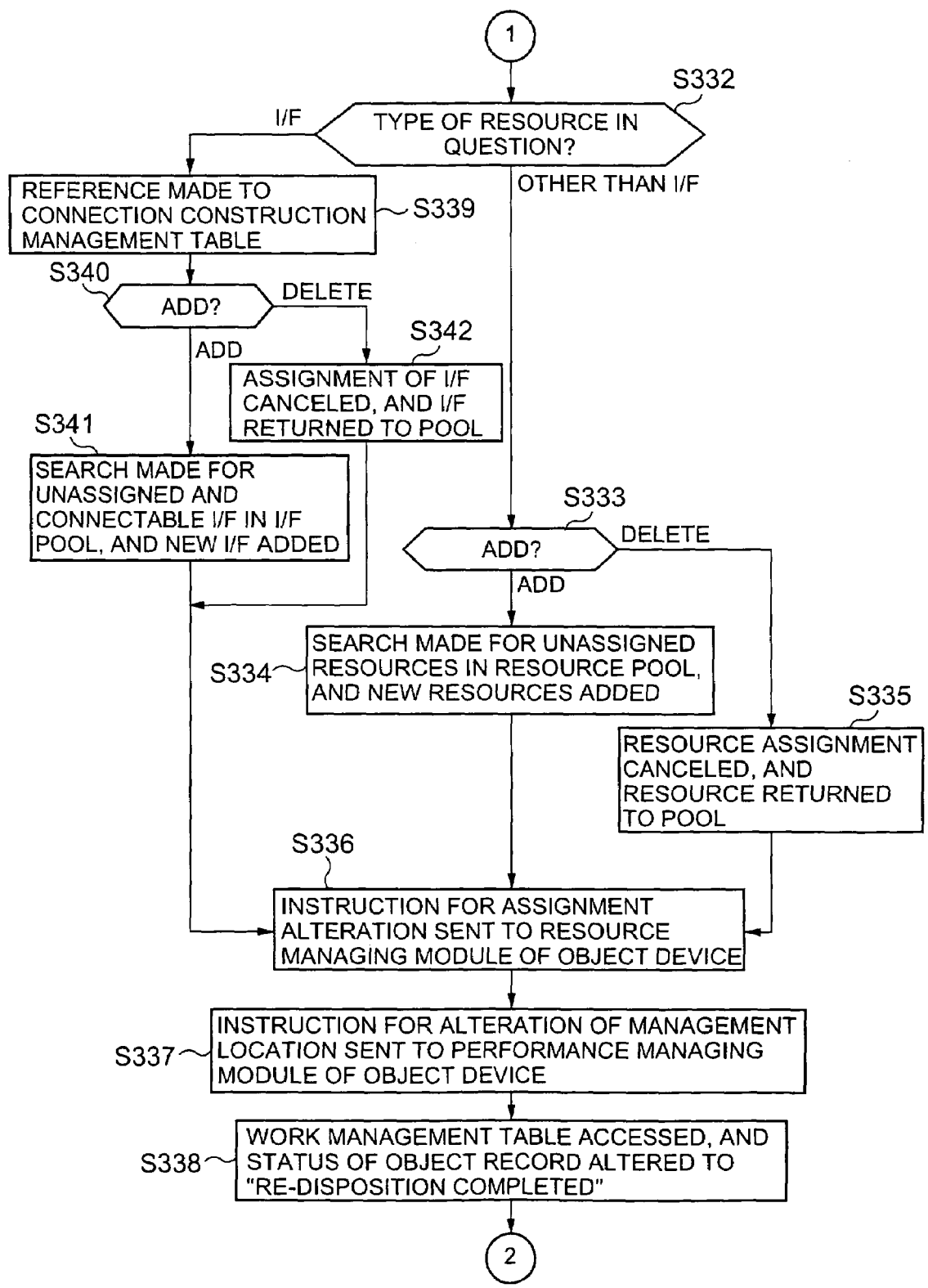
FIG. 58 is a flow chart constituting a continuation of FIG. 57.

FIG. 58 shows a flow chart that is a continuation of FIG. 57. The comprehensive managing module 411 ascertains whether or not the resource is an interface (S332). In cases where the resource is a resource other than an interface, the comprehensive managing module 411 ascertains whether or not a resource is to be added (S333). In cases where a resource of the same type as the resource with an excessive load is to be added, the comprehensive managing module 411 searches the resource pool for an unused resource that has not yet been assigned anywhere, and newly assigns this unused resource (S334). In cases where the assignment of a resource with a low load is to be canceled, the comprehensive managing module 411 releases the assignment of this resource with a low load, and returns this resource to the pool (S335). The status of resources returned to the pool is "unused".

The comprehensive managing module 411 sends requests for alteration of the assignment of resources (addition or deletion) to the resource managing module of the device that is the object of management via the resource managing module 414 (S336). Furthermore, the comprehensive managing module 411 sends requests for alteration of the management location (addition or deletion) to the performance managing module of the device that is the object of management via the performance managing module 412 (S337). Then, the comprehensive managing module 411 accesses the work management table D50, and alters the status of the record for which re-disposition has been completed from "not yet performed" to "re-disposition completed" (S338).

On the other hand, in cases where the resource that is the object of re-disposition is an interface, i.e., in cases where the construction of a path is changed, the comprehensive managing module 411 refers to the connection construction management table D47 via the connection managing module 415 (S339). The comprehensive managing module 411 judges whether an interface is to be added or deleted (S341). In cases where an interface is to be added, the comprehensive managing module 411 selects an interface that is unused and that can be connected from the interface pool, and newly assigns this interface (S341). In cases where the assignment of an interface is to be canceled, the comprehensive managing module 411 releases the assignment of this interface, and returns the interface to the pool. The status of interfaces returned to the pool is "unused".

Thus, in the present example, the distribution of the resources of the storage system as a whole can be managed in a unified manner by the managing terminal 40. Accordingly, a balanced resource disposition can be achieved in the system as a whole even in cases where the construction of the storage system is complicated.

In the present example, the resources utilized by the respective application programs can be re-disposed for each application program. Accordingly, even in cases where the construction of the second switching transistor is complicated, resources can be optimally disposed without causing any deterioration in the performance of the application programs.

In the present example, the logical construction of the storage system can be output to the user interface part. Accordingly, even in cases where the physical construction and logical construction of the storage system are complicated, the user can grasp the construction of the storage system relatively easily, so that the convenience of the system is improved.

In the present example, the history of the logical construction, load state and the like of the storage system can be managed. Accordingly, the user can confirm changes in the load state and changes in the construction of the storage system relatively easily, so that the convenience of the system is improved.

EXAMPLE 2

Next, a second example will be described with reference to FIGS. 60 and 61. The respective examples described below correspond to modifications of the first example. In the present example, resources are distributed in logical units rather than in physical units.

FIG. 60 is an explanatory diagram showing the performance management information D11A that is held by each server 10. The performance management information D11A distributes the respective processors and memories according to the rate of usability. For example, in the case of "processor 1", 40% of this processor is assigned to one logically divided server 11, while the remaining 60% of this processor is assigned to the other logically divide server 11. Similarly, in the case of "memory 1", 40% of this memory is assigned to one logically divided server 11, while the remaining 60% of this memory is assigned to the other logically divided server 11.

FIG. 61 is an explanatory diagram showing the resource management information D12A that is held by each server 10. In the case of "processor 1", 40% is assigned to one logically divided server 11 (LPR1), while the remaining 60% is assigned to the other logically divide server 11 (LPR2). Thus, respective resources are divided logically rather than in physical units, and can also be respectively assigned in respective logically divided units. As a result, logical devices exceeding the number of physical resources can be constructed in virtual terms.

EXAMPLE 3

Figure 62:
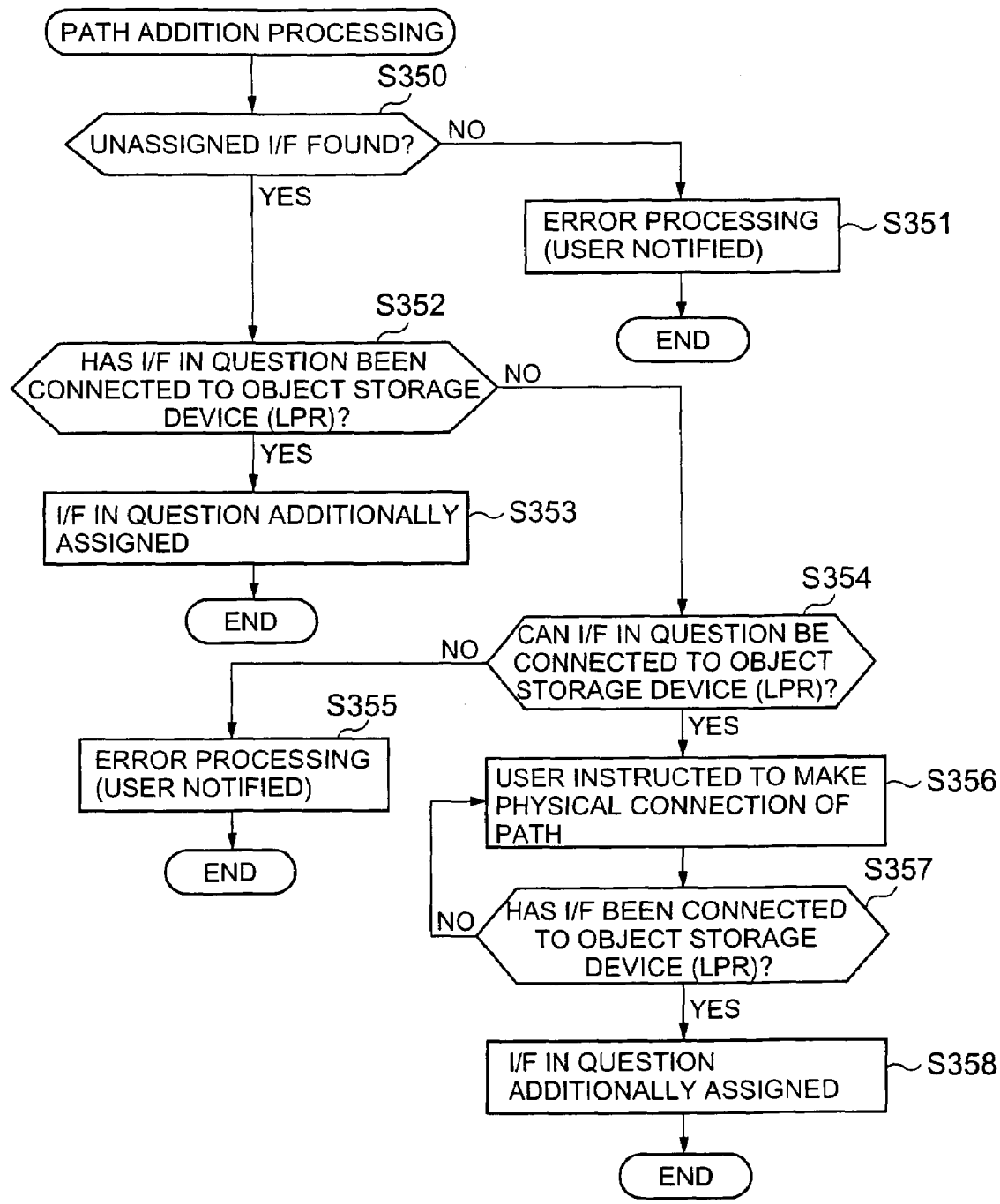
FIG. 62 is a flow chart showing path addition processing that is executed in a storage system constituting a third embodiment.

A third example will be described with reference to FIG. 62. In the present example, details of the processing used to select connectable interfaces are shown. FIG. 62 is a flow chart showing the processing used to add interfaces (paths), and corresponds to S341 in FIG. 58.

First, the comprehensive managing module 411 ascertains whether or not any unassigned interfaces are present (S350). If not even a single unassigned interface is present (S350: NO), interfaces cannot be added; accordingly, the comprehensive managing module 411 performs error processing (S351). For example, this error processing sends a specified error message to the user via the user output module 417.

In cases where an unassigned interface is present (S350: YES), the comprehensive managing module 411 ascertains whether or not this unassigned interface has already been connected to a logically divide storage device 31 of the target storage device 30 (S352). Specifically, in cases where the unused interface has already been connected to the target logically divided storage device 31 (S352: YES), the connection managing module 411 selects this unassigned interface, and newly assigns this interface (S353).

In cases where the unassigned interface has not been connected to the target logically divided storage device 31 (S352: NO), the comprehensive managing module 411 ascertains whether or not this unassigned interface can be connected to the target logically divided storage device 1. In cases where this unassigned interface cannot be connected to the logically divided storage device 31 (S354: NO), the comprehensive managing module 411 performs error processing (S355). In this error processing, as in the case of S351, for example, an error message such as "no utilizable interface (path) exists" or the like is sent to the user.

In cases where the unassigned interface can be connected to the target logically divided storage device 31 (S354: YES), the comprehensive managing module 411 instructs the user to perform the physical connection of the path via the user output module 17 (S356). The user receives this notification, and performs the necessary cable connection work. When the unassigned interface is connected to the target logically divided storage device 31 (S357: YES), the comprehensive managing module 411 newly assigns the connected interface (S358).

EXAMPLE 4

Figure 63:
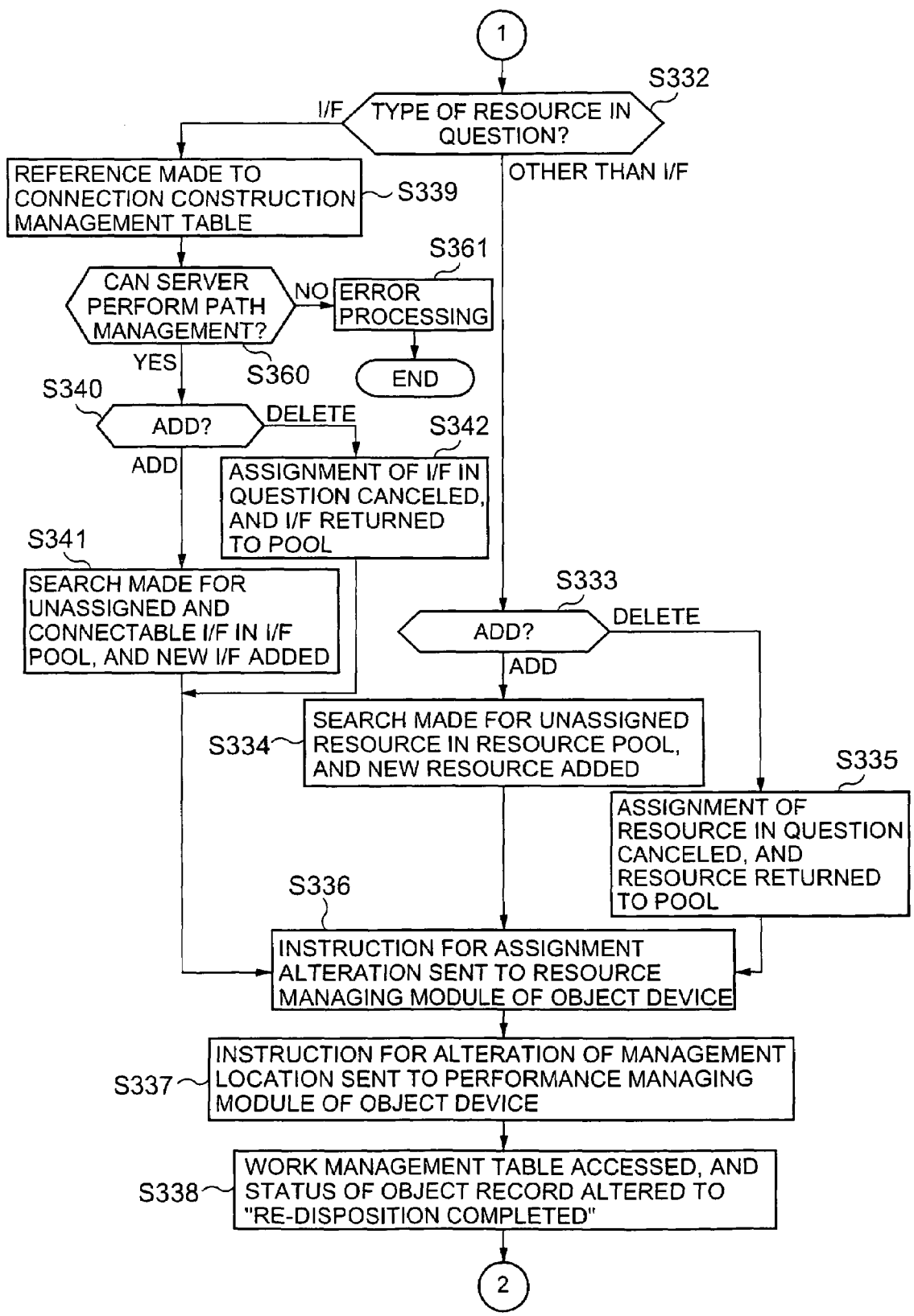
FIG. 63 is a flow chart showing re-disposition execution processing that is executed in a storage system constituting a fourth embodiment.
Figure 64:
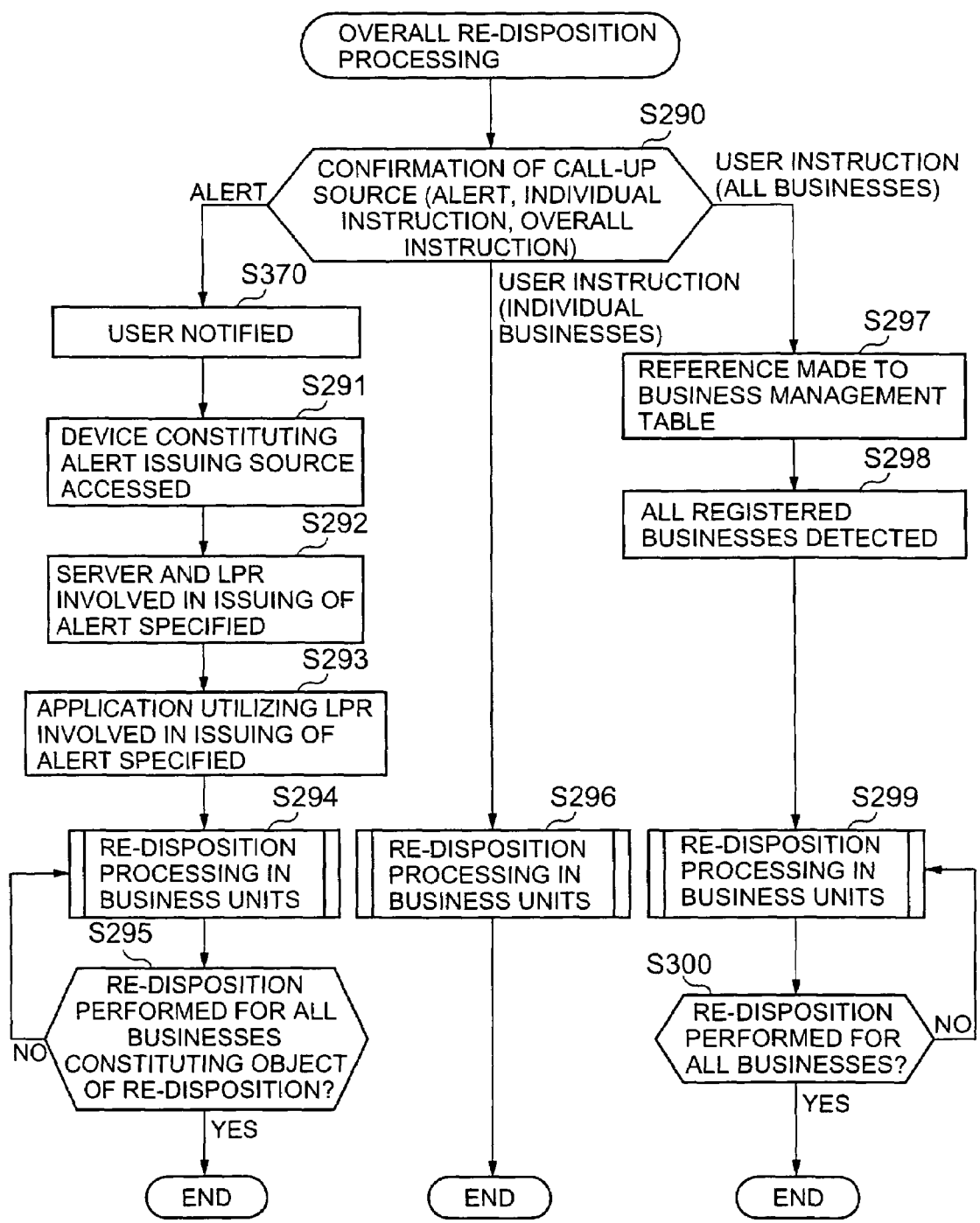
FIG. 64 is a flow chart showing an overall outline of re-disposition processing that is executed in a storage system constituting a fifth embodiment.

A fourth example will be described with reference to FIG. 63. FIG. 64 is a flow chart showing a modification of the processing shown in the abovementioned FIG. 58. In the present example, in cases where an interface is to be added, it is ascertained whether or not path management software is mounted in the server 10 (S360). In cases where no path management software is disposed in the server 10 (S360: NO), for example, path switching management and the like cannot easily be performed even if a path is physically added; accordingly, the comprehensive managing module 411 performs error processing (S361). In this error processing, for example, an error message such as "it is necessary to install path management software in the server 10" or the like is sent to the user. As a result, the addition or deletion of an interface can be performed only in cases where path management in the server 10 is possible, so that the convenience of the system is improved.

EXAMPLE 5

A fifth example will be described with reference to FIG. 64. FIG. 65 is a flow chart showing a modification of the processing shown in the abovementioned FIG. 58. In the present example, the comprehensive managing module 411 notifies the user in advance of the initiation of re-disposition processing before resources are automatically re-disposed on the basis of an alert from the device that is the object of management (S370). As a result, the automatic re-disposition of resources before the user is aware of this re-disposition can be prevented, so that the convenience of the system is improved.

EXAMPLE 6

A sixth example will be described with reference to FIGS. 65 and 66. In the present example, resource re-disposition is performed with cluster constructions being taken into account. FIG. 65 is an explanatory diagram showing the construction of the re-disposition policy table D411A. For example, the two policies of "automatic re-disposition performed, cluster cooperation mode provided" (type 5) and "no automatic re-disposition, cluster cooperation mode provided" can be newly added. The cluster cooperation mode is used in cases where one application program and another application program construct a cluster and are associated with each other, as in failover clusters or load dispersion clusters.

FIG. 66 is a flow chart showing a modification of the processing in the abovementioned FIG. 55. In cases where the cluster cooperation mode is selected in advance (S380: YES), the comprehensive managing module 411 executes the resource re-disposition that is executed for one application program in the same manner for another application program that forms a cluster with this first application program (S381). As a result, the constructions of the resources respectively utilized by application programs that form a cluster are equal to each other.

In the present example, since resources can be re-disposed with cluster constructions taken into account, the convenience of the system is improved. For example, in cases where resources are newly added in currently used application programs used in operating systems, resources are also similarly added to application programs that are on standby as backup. Accordingly, even in cases where failover is executed from the operating system to the standby system, data processing services can be continued with a resource disposition similar to that in place prior to switching. On the other hand, in cases where the resource disposition is not adjusted in such a cluster, since resources relating to the application programs of the standby system are hardly used, resources are not added, and the difference from the disposition of resources relating to the operating system application programs gradually increases.

EXAMPLE 7

Figure 67:
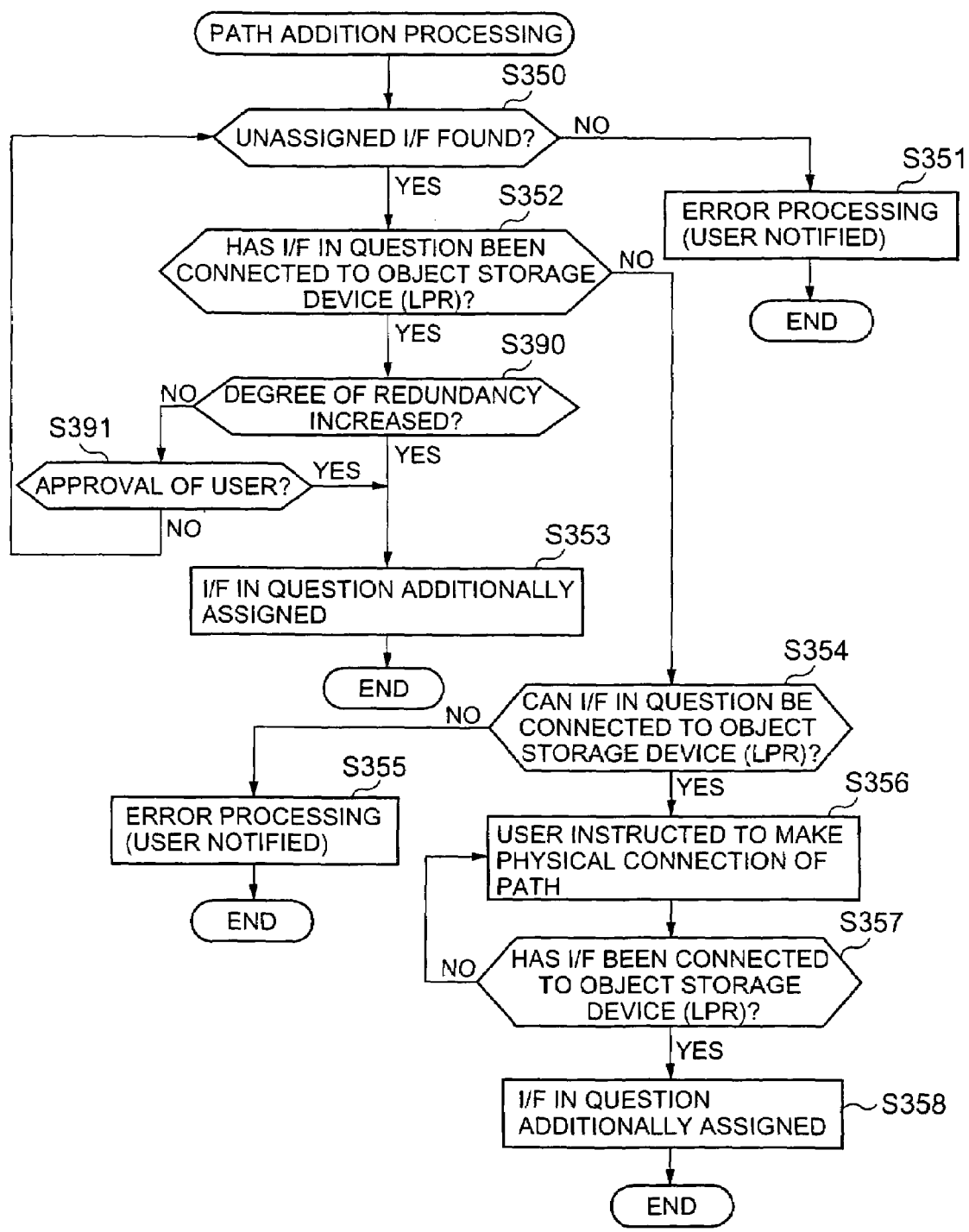
FIG. 67 is a flow chart showing path addition processing that is executed in a storage system constituting a seventh embodiment.

A seventh example will be described with reference to FIG. 67. FIG. 67 is a flow chart showing a modification of the processing in the abovementioned FIG. 62. In this example, in cases where an interface is added, the comprehensive managing module 411 ascertains whether or not the degree of redundancy is increased (S390). In cases where the degree of redundancy is increased (S390: YES), the comprehensive managing module 411 selects an unused interface, and newly adds this interface (S353). Cases where the degree of redundancy is increased are cases in which the path formed by the added interface uses devices (host interfaces, switches or the like) that are physically different from those of existing paths, so that the resistance to trouble is improved.

On the other hand, in cases where the degree of redundancy is not increased even if such an unused interface is selected (S390: NO), the comprehensive managing module 411 seeks the approval of the user (S391), and selects and adds such an unused interface only in cases where the approval of the user is obtained (S391: YES). As a result, resources can be re-disposed while improving the redundancy of storage system, so that the reliability of the storage system can be improved.

EXAMPLE 8

Figure 68:
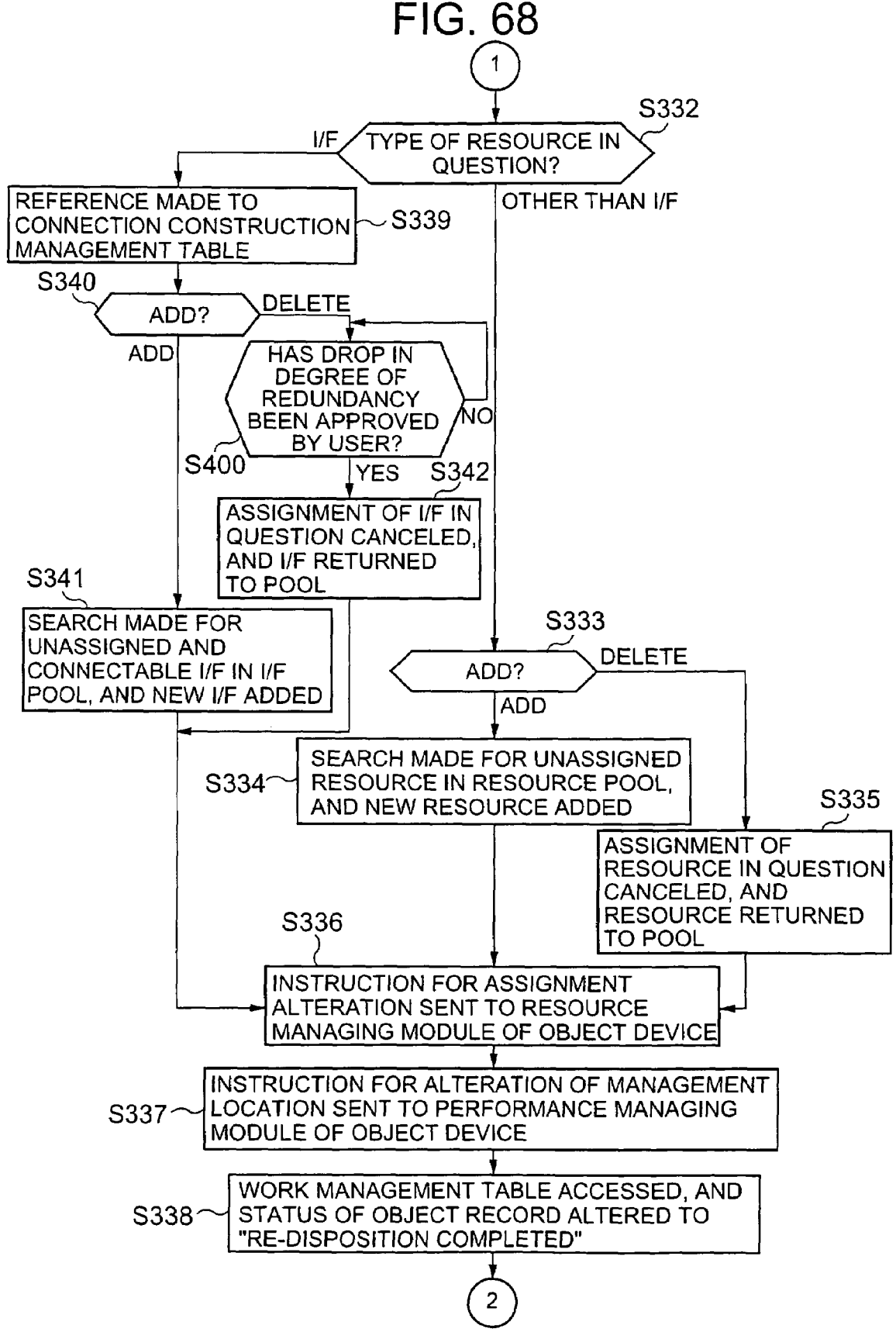
FIG. 68 is a flow chart showing re-disposition execution processing that is executed in a storage system constituting an eighth embodiment.

An eighth example will be described with reference to FIG. 68. FIG. 68 is a flow chart showing a modification of the processing in the abovementioned FIG. 58. In the present example, in cases where an interface is to be deleted, the comprehensive managing module 411 seeks the approval of the user for a lowering of redundancy (S400). The comprehensive managing module 411 cancels the assignment of the interface, and returns this interface to the unused pool (S342) only in cases where the approval of the user is obtained (S400: YES). As a result, the user can operate the storage system while taking into account the resistance to trouble, so that the convenience of the system is improved.

EXAMPLE 9

Figure 69:
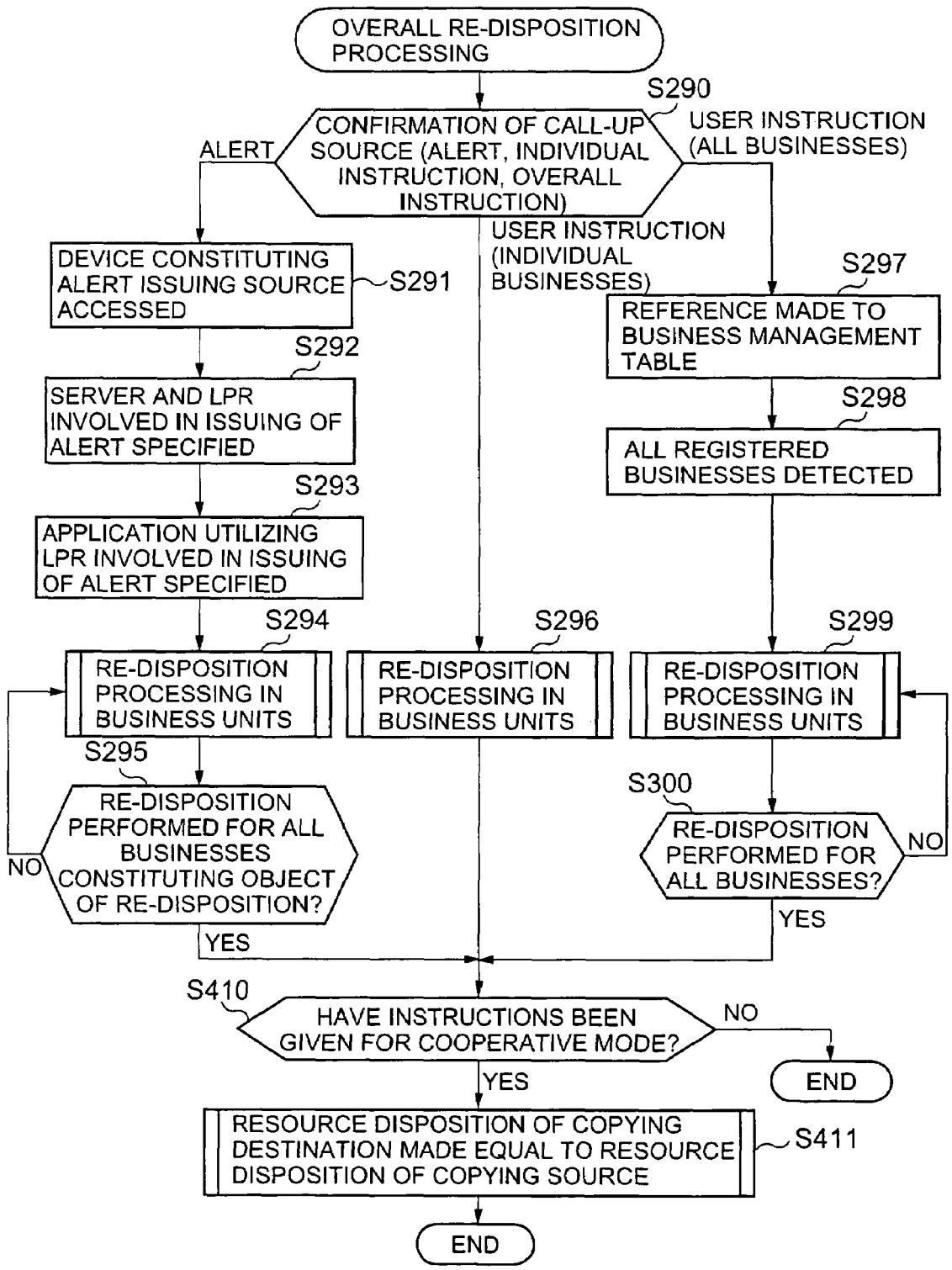
FIG. 69 is a flow chart showing an overall outline of re-disposition processing executed in a storage system constituting a ninth embodiment.

A ninth example will be described with reference to FIG. 69. FIG. 69 is a flow chart showing a modification of the processing in the abovementioned FIG. 55. In the present example, a copying cooperation mode is used. Like the cluster cooperation mode, this copying cooperation mode is a mode which synchronizes the resource disposition relating to the application program that is the source of copying and the resource disposition relating to the application program that is the destination of copying.

In cases where the copying cooperation mode has been selected beforehand (S410: YES), the comprehensive managing module 411 causes the resource disposition relating to the application program that is the copying destination to coincide with the resource distribution relating to the application program that is the copying source (S411). As in the cluster cooperation mode, the resource disposition in the application program that is the copying source is automatically reflected regardless of the load state of the resources relating to the application program that is the copying destination. As a result, the convenience of the system is improved.

Furthermore, the present invention is not limited to the abovementioned embodiments. Various additions, alterations and the like may be made within the scope of the present invention by a person skilled in the art. For example, in cases where a plurality of paths with a sufficient data transfer capacity are present, there is spare capacity in other resources (memory and the like) within the switches, so that paths that tend not to form bottlenecks can be preferentially selected.

What is claimed is:

1. A storage system construction managing device which manages the construction of a storage system comprising a host device and a storage device that provides a storage region to the host device, comprising:

a first managing part which divides the host device into a plurality of logical host devices, and which respectively distributes specified resources from among the resources possessed by the host device to the respective logical host devices;

a second managing part which divides the storage device into a plurality of logical storage devices, and which respectively distributes specified resources from among the resources possessed by the storage device to the respective logical storage devices;

a third managing part which divides a relay device for connecting the host device and the storage device into a plurality of logical relay devices, and which respectively distributes specified resources from among the resources possessed by the relay device to the respective logical relay devices;

an information collecting part which respectively acquires specified information relating to the respective logical host devices and the respective logical storage devices via the first managing part and the second managing part;

a disposition managing part which respectively judges, on the basis of the respective collected sets of specified information, whether or not an excess or insufficiency has occurred in the specified resources used by respective application programs that are executed by the respective logical host devices, and which, in cases where it is judged that the excess or insufficiency has occurred, re-disposes the specified resources by issuing a construction alteration request to the managing part from among the respective managing parts that manages the specified resources involved in the excess or insufficiency, so that the excess or insufficiency is eliminated;

a history managing part which respectively stores and manages the histories of the respective sets of specified information; and a user interface part which outputs the histories of the respective sets of specified information that are managed by the history managing part, wherein specified information relating to the respective logical relay devices is also included in the specified information that is collected by the information collecting part.

2. The storage system construction managing device according to claim 1, wherein the user interface part can output the logical connection construction of the respective logical host devices and the respective logical storage devices.

3. The storage system construction managing device according to claim 1, wherein in cases where the disposition of the specified resources relating to one of the application programs is altered, the disposition managing part re-disposes the specified resources relating to other application programs corresponding to the one application program to have the construction the same as that of the resource disposition for the one application program.

4. The storage system construction managing device according to claim 1, wherein the disposition managing part re-disposes specified resources in which the excess or insufficiency has occurred, while taking into account the redundancy of the storage system.

5. The storage system construction managing device according to claim 1, further comprising a resource pool for managing the specified resources that are unused, wherein the disposition managing part returns specified resources that have a utilization rate that is equal to or less than a specified lower limit value among the specified resources to the resource pool, and in the case of resources that have a utilization rate that is equal to or greater than a specified upper limit value among the specified resources, the disposition managing part selects resources of the same type from the resource pool, and adds the resources.

6. The storage system construction managing device according to claim 1, wherein the history managing part manages the histories of the respective sets of specified information in specified period units that are set beforehand.

7. A storage system construction managing device which manages the construction of a storage system comprising a host device and a storage device that provides a storage region to the host device, comprising:

a first managing part which divides the host device into a plurality of logical host devices, and which respectively distributes specified resources from among the resources possessed by the host device to the respective logical host devices;

a second managing part which divides the storage device into a plurality of logical storage devices, and which respectively distributes specified resources from among the resources possessed by the storage device to the respective logical storage devices;

an information collecting part which respectively acquires specified information relating to the respective logical host devices and the respective logical storage devices via the first managing part and the second managing part;

a disposition managing part which respectively judges, on the basis of the respective collected sets of specified information, whether or not an excess or insufficiency has occurred in the specified resources used by respective application programs that are executed by the respective logical host devices, and which, in cases where it is judged that the excess or insufficiency has occurred, re-disposes the specified resources by issuing a construction alteration request to the managing part from among the respective managing parts that manages the specified resources involved in the excess or insufficiency, so that the excess or insufficiency is eliminated;

a history managing part which respectively stores and manages the histories of the respective sets of specified information; and a user interface part which outputs the histories of the respective sets of specified information that are managed by the history managing part, wherein in cases where the disposition of the specified resources relating to one of the application programs is altered, the disposition managing part re-disposes the specified resources relating to other application programs corresponding to the one application program to have the construction the same as that of the resource disposition for the one application program.

8. The storage system construction managing device according to claim 7, wherein the user interface part can output the logical connection construction of the respective logical host devices and the respective logical storage devices.

9. The storage system construction managing device according to claim 7, wherein the disposition managing part re-disposes specified resources in which the excess or insufficiency has occurred, while taking into account the redundancy of the storage system.

10. The storage system construction managing device according to claim 7, further comprising a resource pool for managing the specified resources that are unused, wherein the disposition managing part returns specified resources that have a utilization rate that is equal to or less than a specified lower limit value among the specified resources to the resource pool, and in the case of resources that have a utilization rate that is equal to or greater than a specified upper limit value among the specified resources, the disposition managing part selects resources of the same type from the resource pool, and adds the resources.

11. The storage system construction managing device according to claim 7, wherein the history managing part manages the histories of the respective sets of specified information in specified period units that are set beforehand.

12. A storage system construction managing device which manages the construction of a storage system comprising a host device and a storage device that provides a storage region to the host device, comprising:
   a first managing part which divides the host device into a plurality of logical host devices, and which respectively distributes specified resources from among the resources possessed by the host device to the respective logical host devices;
   a second managing part which divides the storage device into a plurality of logical storage devices, and which respectively distributes specified resources from among the resources possessed by the storage device to the respective logical storage devices;
   an information collecting part which respectively acquires specified information relating to the respective logical host devices and the respective logical storage devices via the first managing part and the second managing part;
   a disposition managing part which respectively judges, on the basis of the respective collected sets of specified information, whether or not an excess or insufficiency has occurred in the specified resources used by respective application programs that are executed by the respective logical host devices, and which, in cases where it is judged that the excess or insufficiency has occurred, re-disposes the specified resources by issuing a construction alteration request to the managing part from among the respective managing parts that manages the specified resources involved in the excess or insufficiency, so that the excess or insufficiency is eliminated;
   a history managing part which respectively stores and manages the histories of the respective sets of specified information;
   a user interface part which outputs the histories of the respective sets of specified information that are managed by the history managing part; and
   a resource pool for managing the specified resources that are unused,
   wherein the disposition managing part returns specified resources that have a utilization rate that is equal to or less than a specified lower limit value among the specified resources to the resource pool, and in the case of resources that have a utilization rate that is equal to or greater than a specified upper limit value among the specified resources, the disposition managing part selects resources of the same type from the resource pool, and adds the resources.

13. The storage system construction managing device according to claim 12, wherein the user interface part can output the logical connection construction of the respective logical host devices and the respective logical storage devices.

14. The storage system construction managing device according to claim 12, wherein the disposition managing part re-disposes specified resources in which the excess or insufficiency has occurred, while taking into account the redundancy of the storage system.

15. The storage system construction managing device according to claim 12, wherein the history managing part manages the histories of the respective sets of specified information in specified period units that are set beforehand.

* * * * *